US012685912B1

(12) United States Patent
Meetin

(10) Patent No.: US 12,685,912 B1
(45) Date of Patent: Jul. 21, 2026

(54) MOVEMENT-EXAMINATION SYSTEM USING BODY SIMULATION PERFORMED WITH SHAPE-EXAMINATION PROCEDURE

(71) Applicant: Ronald J. Meetin, Mountain View, CA (US)

(72) Inventor: Ronald J. Meetin, Mountain View, CA (US)

( * ) Notice: Subject to any disclaimer, the term of this patent is extended or adjusted under 35 U.S.C. 154(b) by 453 days.

(21) Appl. No.: 18/082,289

(22) Filed: Dec. 15, 2022

(51) Int. Cl.
| | |
|---|---|
| A63B 69/00 | (2006.01) |
| G06T 7/11 | (2017.01) |
| G06T 7/292 | (2017.01) |

(52) U.S. Cl.
CPC ............ *A63B 69/0002* (2013.01); *G06T 7/11* (2017.01); *G06T 7/292* (2017.01); *G06T 2207/10016* (2013.01); *G06T 2207/30221* (2013.01)

(58) Field of Classification Search
None
See application file for complete search history.

(56) References Cited

U.S. PATENT DOCUMENTS

| | | | |
|---|---|---|---|
| 5,401,016 A | 3/1995 | Heglund et al. | |
| 6,358,164 B1* | 3/2002 | Bracewell .......... | A63B 71/0605 |
| | | | 473/454 |
| 6,634,967 B2 | 10/2003 | Daniel | |
| 7,341,530 B2 | 3/2008 | Cavallaro et al. | |
| 9,352,208 B2 | 5/2016 | Davis et al. | |
| 10,894,198 B1 | 1/2021 | Teeger et al. | |

| | | | |
|---|---|---|---|
| 2014/0206480 A1 | 7/2014 | Davis et al. | |
| 2015/0317801 A1* | 11/2015 | Bentley ................ | G08B 21/043 |
| | | | 382/107 |
| 2015/0321062 A1 | 11/2015 | Tyndall | |
| 2016/0307335 A1* | 10/2016 | Perry ...................... | G06T 7/292 |
| 2017/0080315 A1 | 3/2017 | Anglin | |
| 2017/0100658 A1 | 4/2017 | Tally | |
| 2017/0200277 A1 | 7/2017 | Keat et al. | |
| 2017/0361165 A1* | 12/2017 | Miller ................ | A63B 21/4047 |
| 2018/0001179 A1 | 1/2018 | Larson et al. | |

(Continued)

OTHER PUBLICATIONS

Dachman, "ESPN Commits to K-Zone Live on Every Pitch for MLB Coverage", www.sportsvideo.org/2015/04/03/espn-commits-to-k-zone-live-on-every-pitch-for-mlb-coverage/, Apr. 3, 2015, 3 pp.

(Continued)

*Primary Examiner* — Soo Shin
(74) *Attorney, Agent, or Firm* — Ronald J. Meetin

(57) ABSTRACT

At least one designated physical body feature (150) of a variable-shape zone-control body (110) situated near a three-dimensional variable-shape spatial zone (108) is timewise variably spaced apart from a reference situs (152) in a direction generally perpendicular to opposite boundaries (120 and 122) of the zone. A body simulation has a simulated feature for each body feature. A boundary determiner (160) determines one of multiple potential body shapes (198) as most closely matching imagery of the body in shape and then determines the locations of the zonal boundaries as a function of the distance of each simulated feature of the closest body shape from a simulation of the reference situs. A movement analyzer (162 or 222) responds to the boundary-location determinations by electronically determining whether at least part of an object (104) moving toward the zone entered it.

18 Claims, 12 Drawing Sheets

(56)                References Cited

U.S. PATENT DOCUMENTS

| | | | |
|---|---|---|---|
| 2018/0021653 A1* | 1/2018 | Thornbrue | A63B 69/3685 |
| | | | 473/453 |
| 2018/0052228 A1 | 2/2018 | Markison et al. | |
| 2018/0207508 A1 | 7/2018 | Lee et al. | |
| 2018/0272224 A1 | 9/2018 | Chen et al. | |
| 2020/0246675 A1 | 8/2020 | Spivak et al. | |
| 2021/0319618 A1* | 10/2021 | Lee | H04N 13/117 |
| 2024/0173608 A1 | 5/2024 | Schembs et al. | |

OTHER PUBLICATIONS

Dachman, "MLB 2019 Preview: ESPN Continues To Up Its Virtual Game With More K-Zone 3D, Statcast Graphics", www.sportsvideo. org/2019/03/28/mlb-2019-preview-espn-continues-to-up-its-virtual-game-with-more-k-zone-3d-statcast-graphics/, Mar. 28, 2019, 5 pp.
Davis, "Robot umps, electronic zone wouldn't be saviors on balls and strikes", www.sportingnews.com/mlb/news/robot-umpires-electronic-strike-zone-in-mlb-1 pitchfx-balls-and-strikes/ ggv80p4qmsu31d72sohrmbcnj, Aug. 2, 2017, 5 pp.
Friend, "Baseball's Check Swing Heard Round the World May Lead to an MLB Rule Change if Hawk-Eye Innovations Can Fine-Tune the Science", www.sporttechie.com/baseballs-check-swing-heard-round-the-world-may-lead-to-an-mlb-rule-change-if-hawk-eye-innovations-can-fine-tune-the-science, Oct. 27, 2021, 6 pp.
Golden, "The Atlantic League, pioneer of the robo umps, will return to human umps in 2022", *The Washington Post*, www.washingtonpost. com/sports/2022/01/14/atlantic-league-robot-umpires, Jan. 14, 2022, 3 pp.
Lebreton, "Umps get 1 in 3 close pitches wrong, HBO story shows", *Star-Telegram*, www.star-telegram.com/sports/spt-columns-blogs/ gil-lebreton/article105378146.html, Oct. 1, 2016, 6 pp.
*NCAA Baseball 2021 and 2022 Rules Book*, Rule 2, Definitions, sects. 39 and 75, and Rule 7, Batting, sect. 5(a), https://unitedumpires. org/pdf/2021-22-ncaa-baseball-rules.pdf, 2021, pp. 28, 32, and 65.
*NCAA Softball 2020 and 2021 Rules Book*, Rule 11.3.2.1, http://fs. ncaa.org/Docs/stats/Stats_Manuals/Softball/Softball_Rules.pdf, 2020, pp. 91 and 92.
Nelson, "What Is a Swing in Baseball", *Baseball Training World*, https://baseballtrainingworld.com/what-is-a-swing-in-baseball/, 2022, 13 pp.
*Official Baseball Rules*, 2022 ed., Rule 5.05(a)(3) and "Definition of Terms, Strike Zone", https://baseball.ca/uploads/files/2022% 20Official%20Baseball%20Rules(1).pdf, 2022, pp. 22, 23, 152, and 153.
Pierce et al., "Developing MLB's Automated Ball/Strike System (ABS)", https://technology.mlblogs.com/developing-mlbs-automated-ball-strike-system-abs-d4f499deff31, May 13, 2021, 9 pp.
"PITCHf/x", Wikipedia, http://en.wikipedia.org/wiki/PITCHf/x, May 1, 2022, 2 pp.
Randhawa, "Automatic strike zone coming to AAA in '22", www. mlb.com/news/triple-a-to-have-automated-ball-and-strike-system, Jan. 21, 2022, 2 pp.
Tittrington, "Bunt, Slap and Checked-Swing Quandaries", *Referee*, www.referee.com/bunt-slap-and-checked-swing-quandaries/, Nov. 24, 2020, 4 pp.
"When Is a Bunt a Swing", https://community.hsbaseballweb.com/ topic/when-is-a-bunt-a-swing, Oct. 7, 2013, 8 pp.

\* cited by examiner

MOVEMENT-EXAMINATION SYSTEM

MOVEMENT-EXAMINATION SYSTEM

MOVEMENT EXAMINATION SYSTEM 202 EXCEPT VIDEO CAMERAS

*300*

MOVEMENT-EXAMINATION SYSTEM USING BODY SIMULATION PERFORMED WITH SHAPE-EXAMINATION PROCEDURE

CROSS-REFERENCE TO RELATED APPLICATIONS

This application is related to the following U.S. patent applications all filed the same date as this application on inventions of Ronald J. Meetin: U.S. patent application Ser. No. 18/082,282; U.S. patent application Ser. No. 18/082, 292, now U.S. Pat. No. 12,582,892 B1; U.S. patent application Ser. No. 18/082,354; and U.S. patent application Ser. No. 18/082,304, now allowed. To the extent not repeated herein, the contents of these other applications are incorporated by reference herein.

FIELD OF USE

This invention relates to examining movement of an object especially for determining whether at least part of the object passed through a three-dimensional spatial zone including calling "balls" and "strikes" in baseball or softball.

BACKGROUND

FIG. 1 illustrates generally diamond-shaped area 20 of a conventional field for the sport of baseball or softball ("BB/SB"). Diamond area 20 consists of fair-territory infield 22 and foul territory 24. Infield 22 extends between the outside edges of perpendicular left and right foul lines 26L and 26R (collectively "26"). Although not shown in FIG. 1, foul lines 26 extend beyond infield 22 to and up an outfield barrier. Foul territory 24 adjoins infield 22 along lines 26.

Infield 22 consists of circular dirt pitcher's mound 28, grass infield area 30 surrounding mound 28, and dirt infield area 32 surrounding grass infield area 30 and extending to the outside edges of foul lines 26. Dirt infield area 32 includes home plate 34 where lines 26 effectively meet, first base 36 along right foul line 26R, second base 38 opposite home plate 34, and third base 40 along left foul line 26L. The rough square of area 30 is circularly truncated inwardly near plate 34 and bases 36, 38, and 40. Pitcher's mound 28 is slightly closer to plate 34 than to second base 38.

Foul territory 24 includes dirt foul area 42 and grass foul area 44. Dirt foul area 42 extends along foul lines 26 and circularly around home plate 34. Left and right batter's boxes 46L and 46R (collectively "46") are situated respectively to the left and right of plate 34 partly in dirt infield area 32 and partly in dirt foul area 42. Catcher's box 48 lies in foul area 42 behind plate 34 and adjoins batter's boxes 46. Grass foul area 44 extends from dirt foul area 42 farther away from infield 22 than area 42. Left and right coach's boxes 50L and 50R are surrounded by grass foul area 44 respectively close to third base 40 and first base 36.

Pitcher P standing on pitcher's mound 28 pitches ball 52, a baseball or softball, toward home plate 34. Batter B standing in batter's box 46L or 46R and controlling a BB/SB bat (not shown in FIG. 1) is permitted to swing at pitched ball 52 as it approaches plate 34. Catcher C in catcher's box 48 attempts to catch ball 52 if it goes beyond plate 34. Home-plate umpire U behind catcher C calls "balls" and "strikes".

Ball 52 is a "strike" if batter B swung at pitched ball 52 or if at least part of ball 52 passed through the strike zone without batter B swinging at ball 52 and without ball 52 previously hitting infield 22 including home plate 34. Ball 52 is a "ball" if, without batter B swinging at it, ball 52 passed by (outside) the zone or if ball 52 hit infield 22 before at least part of ball 52 passed through the zone. For each instance in which batter B does not swing at ball 52, home-plate umpire U determines whether ball 52 is a "ball" or "strike".

FIG. 2 illustrates the home-plate region of diamond area 20 with batter B standing in a crouched stance in right batter's box 46R and controlling BB/SB bat 54 at a position ready to swing at ball 52 as part of ball 52 is entering strike zone 56. Home plate 34 has a thin largely flat isosceles pentagonal upper surface extending horizontally and having a pentagonal upper edge 58 formed with upper front edge 58F, upper left and right side edges 58L and 58R perpendicular to front edge 58F, and upper left and right back edges 58BL and 58BR respectively in line with the outside edges of foul lines 26L and 26R.

Strike zone 56 is a three-dimensional ("3D") heptahedral spatial zone situated directly above, and vertically spaced apart from, home plate 34. Zone 56 has planar horizontal lower boundary 60, planar horizontal upper boundary 62, and pentagonal lateral boundary 64 extending perpendicular to parallel lower/upper zonal boundaries 60 and 62. Strikezone boundaries 60, 62, and 64 are imaginary surfaces in that they are not directly visible to any person. Lateral zonal boundary 64 consists of front zonal boundary 64F, left and right side zonal boundaries 64L and 64R, and left and right back zonal boundaries 64BL and 64BR situated respectively above upper edges 58F, 58L, 58R, 58BL, and 58BR of plate 34.

Lower/upper zonal boundaries 60 and 62 are defined relative to certain physical characteristics of batter B and thus vary from player to player acting as batter B. The boundary definitions also depend on whether the sport is baseball or softball and on the type of baseball, such as Major League Baseball ("MLB") and baseball governed by the National Collegiate Athletic Association ("NCAA"), or softball, such as fastpitch and slowpitch variously governed by the NCAA and the U.S. National Softball Association ("NSA"). FIG. 2 presents the current MLB definitions in which (a) lower boundary 60 lies in lower horizontal boundary-defining plane 66 extending through the hollow beneath the batter's kneecap and (b) upper boundary 62 lies in upper horizontal boundary-defining plane 68 situated midway between first horizontal boundary-defining plane 70 extending through the top of the batter's uniform pants and second horizontal boundary-defining plane 72 extending through the top of the batter's shoulders.

It is difficult for umpires to accurately call "balls" and "strikes" optically, i.e., only using their eyes and brain, especially when ball 52 passes close to the periphery of strike zone 56. Lebreton, "Umps get 1 in 3 close pitches wrong, HBO story shows", Star-Telegram, www.star-telegram.com/sports/spt-columns-blogs/gil-lebreton/article105378146.html, 1 Oct. 2016, 6 pp., reports a multiyear Home Box Office study showing that, according to the two-dimensional ("2D") PITCHf/x graphics, umpires optically called 12% of "balls" and "strikes" incorrect and 32% of pitched balls incorrect when they passed within 5 cm of the corners of zone 56.

The ESPN television network provides a live assessment of ball/strike call accuracy via ESPN's proprietary K-zone 3D system. See Dachman, "MLB 2019 Preview: ESPN Continues To Up Its Virtual Game With More K-Zone 3D, Statcast Graphics". wivw.sportsvideo.org/2019/03/28/mlb-2019-preview-espn-continues-to-up-its-virtual-game-with-more-k-zone-3d-statcast-graphics, 28 Mar. 2019, 5 pp.

K-zone 3D simulates strike zone 56 in three dimensions and presents rotatable imagery showing whether at least part of a sphere simulating ball 52 entered the strike-zone simulation. K-zone 3D adjusts the simulations of lower/upper zonal boundaries 60 and 62 for the batter's height. However, those adjustments remain constant during each pitch.

Consideration is being given to calling "balls" and "strikes" electronically. Bracewell et al., U.S. Pat. No. 6,358,164 B1, discloses an indicator that 3D electronically establishes strike zone 56. The locations of lower/upper boundaries 60 and 62 are determined by premeasuring each player at a convenient time, e.g., during the preseason, before a BB/SB game, while the player is in the on-deck (next-to-bat) area, or while the player is in batter's box 46L or 46R serving as batter B. The measurements are adjusted according to the batter's stance.

The Automated Ball/Strike ("ABS") system is currently used for electronically calling "balls" and "strikes" in some U.S. baseball leagues below MLB. See Randhawa, "Automatic strike zone coming to AAA in '22", www.mlb.com/news/triple-a-to-have-automated-ball-and-strike-system, 21 Jan. 2022, 2 pp. Similar to K-zone 3D, the ABS system 3D simulates strike zone 56 and determines whether at least part of a simulation of ball 52 enters the simulation of zone 56. The ABS system simulates the locations of lower/upper boundaries 60 and 62 with player-specific data for players who have appeared in MLB games but otherwise uses default data based on a player's height.

Some persons oppose electronically calling "balls" and "strikes". One example is Davis, "Robot umps, electronic zone wouldn't be saviors on balls and strikes", www.sportingnews.com/mlb/news/robot-umpires-electronic-strike-zone-in-mlb-1 pitchfx-balls-and-strikes/ggv80p4qmsu31d72sohrmbcnj, 2 Aug. 2017, 5 pp. Davis quotes a statement apparently from Harry Pavlidis, that the strike "zone wouldn't expand and contract during at-bats". Davis or/and Pavlidis apparently mean that the locations of lower/upper boundaries 60 and 62 would be fixed when a player is at bat, as arises in Bracewell et al, and the ABS system, and thus wouldn't change during an at bat. Despite such opposition, electronic calling of "balls" and "strikes" appears likely to reach MLB in the near future.

What constitutes a "swinging strike", i.e., ball 52 swung at without bat-to-ball contact sometimes termed a "swing and miss", is a controversy. MLB rules don't define what constitutes a "swing" and therefore what constitutes a "swinging strike". Nelson. "What is a Swing in Baseball", *Baseball Training World*, https://baseballtrainingworld.com/what-is-a-swing-in-baseball, 2022, 13 pp., cites the following three common definitions of a "swinging strike": (i) the batter's wrists roll over, (ii) bat 54 clears home plate 34, and (iii) the barrel of bat 54 passes the front of the batter's body. Unfortunately, it is difficult to apply any of these definitions, especially for home-plate umpire U.

Friend, "Baseball's Check Swing Heard 'Round the World May Lead to an MLB Rule Change if Hawk-Eye Innovations Can Fine-Tune the Science", www.sporttechie-.com/baseballs-check-swing-heard-round-the-world-may-lead-to-an-mlb-rule-change-if-hawk-eye-innovations-can-fine-tune- the-science, 27 Oct. 2021, 6 pp., indicates that the plate-clearing definition of a "swinging strike" commonly means that the barrel of bat 54 clears home plate 34. Both Nelson and Friend mention that an advanced form of the electronic technology used by MLB to track pitches could be used to refine swing and strike decisions.

Referring again to FIG. 2, the plate-clearing "swinging strike" definition specifically means that at least a full cross-sectional part of the barrel of bat 54 crossed vertical front plate-clearing area 74 in the direction from strike zone 56 to pitcher P where plate-clearing area 74 consists of front zonal boundary 64F, lower front area 76 extending fully from the lower front edge of boundary 64F vertically down to upper front plate edge 58F, and upper front area 78 extending fully from the upper front edge of boundary 64F vertically upward. The lateral boundaries of front areas 76 and 78 are indicated by dotted lines in FIG. 2. Area 78, although theoretically extending upward indefinitely, actually extends to the highest vertical reach of bat 54 as controlled by batter B, usually no more than 2 m above boundary 64F. MLB seem generally to utilize the plate-clearing definition.

Bat 54 sometimes contacts ball 52 in front of strike zone 56 on a full swing. This situation is accommodated by defining a "swinging strike" as occurring when the barrel of bat 54 passes the front of the batter's body. 2021-2022 NCAA Baseball Rule 2, Definitions, sect. 39, clarifies the body-passing definition for NCAA by stating that a "swinging strike" occurs when "the barrel head of the bat passes the batter's front hip". Nevertheless, NCAA umpires sometimes seem to deem a "swinging strike" to occur when bat 54 clears home plate 34. It is desirable to have a better, more consistent way to determine when a "swinging strike" occurs.

GENERAL DISCLOSURE OF THE INVENTION

The present invention furnishes a movement-examination ("movement-exam") system for electronically determining whether at least part of a principal object moving toward a 3D variable-shape spatial zone entered the zone. In a first aspect of the invention, one or more physical features of a variable-shape zone-control body situated near the zone are timewise variably spaced apart from a body reference situs in a boundary-determination direction generally perpendicular to opposite first and second boundaries of the zone. The first and second zonal boundaries are at respective temporary first and second boundary locations dependent on how far each body feature is spaced apart from the situs in the boundary-determination direction.

A boundary determiner employs a variable-shape spatial-zone simulation of the spatial zone, a reference-situs simulation of the situs, and a variable-shape simulation of the zone-control body. The spatial-zone simulation has first and second simulated spatial boundaries that respectively simulate the first and second zonal boundaries. The body simulation has (i) a simulated feature for each body feature and (ii) a plurality of potential body shapes for the body. The simulated feature for each body feature for each potential body shape is simulated at a specified distance from the reference-situs simulation in the boundary-determination direction.

The boundary determiner collects whole-body data of imagery of substantially all the zone-control body while the body is near the spatial zone. The determiner then (i) compares the imagery of the body in the whole-body data to the potential body shapes to determine a particular one of the potential body shapes as largely most closely matching the imagery of the zone-control body in shape and (ii) determines the locations of the lower and upper zonal boundaries as a function of the specified distance of each simulated feature of that particular closest body shape from the reference-situs simulation. A movement analyzer responds to the boundary-location determinations by electronically determining whether at least part of the object entered the spatial zone.

The spatial zone is preferably spaced vertically apart from the situs. In that case, the two zonal boundaries are lower and upper boundaries of the zone. The simulated feature for each body feature for each potential body shape is then simulated at a specified vertical distance from the reference-situs simulation.

The movement-exam system usually employs a network of video cameras including an above-surface video camera situated above the surface of the object region approximately opposite the zone-control body relative to the spatial zone so as to be farther from the body than from the zone. The camera captures the zone, the body, and the object when it is unobstructedly within the camera's field of view. An additional video camera is situated at least partly below the region's surface. The additional camera's field of view originates below the region's surface and is directed upward such that the additional camera captures the zone and the object when it is unobstructedly within the additional camera's field of view.

A movement-exam system in a second aspect of the invention electronically determines whether the principal object passed through or/and by the spatial zone as as at least part of an additional object entered the zone or/and adjoining space over or under the zone and exited the zone or/and that adjoining space at a selected exit location laterally dependent on the zone without the additional object contacting the principal object. The zone has a front boundary closest to an object-movement origin from where the principal object starts moving toward the zone. The selected exit location is preferably constituted with the front boundary, a lower front area extending fully from the front boundary downward, and an upper area extending fully from the front boundary upward. The system usually employs a video camera network having video cameras largely as described above.

A movement-exam system in a third aspect of the invention electronically determines whether the principal object passed through or/and by the spatial zone as at least part of the additional object passed a specified location on the body in a specified lateral direction without the additional object contacting the principal object. This preferably first entails establishing an imaginary spatial-relationship plane extending perpendicular to the specified direction through a potentially variable leading site of the specified location. The leading site is closer to a reference location beyond the zone and the body in the specified direction than any other site of the specified location. The system then determines whether at least part of the additional object passed the spatial-relationship plane in the specified direction. The system usually employs a video camera network having the above-described cameras.

Briefly stated, the present movement-exam system uses a simulation technique to electronically determine the locations of the two boundaries of the spatial zone. The system also electronically determines whether the principal object passed through or/and by the zone without being contacted by the additional object as at least part of the additional object (a) entered the zone or/and adjoining space over or under the zone and exited the zone or/and that adjoining space at the selected exit location dependent on the zone or (b) passed the specified location on the zone-control body in the specified lateral direction. The electronic boundary-location and entry/non-entry determinations are highly accurate, much more accurate than could be made by the eyes and brain of virtually any person. Usage of the invention to provide improved decision making in baseball or/and softball, including highly accurate ball/strike calling, is claimed in related U.S. patent application Ser. Nos. 18/082,292, 18/082,354, and 18/082,304 for which the spatial zone is the strike zone. The invention provides a significant advance over the prior art.

BRIEF DESCRIPTION OF THE DRAWINGS

FIGS. 3a and 3b respectively present two different shapes for a variable-shape zone-control body in the object-movement region.

FIGS. 9a and 9b respectively are top and side views of a version of the object-movement region suitable for employing an enhanced version of the movement-exam system in accordance with the invention for electronically determining whether at least part of the principal object entered the spatial zone preferably based on the zone's shape as the object moved toward the zone and for providing other capabilities. The top view of FIG. 9a is taken through plane 9a-9a in FIG. 9b. The side view of FIG. 9b is taken through plane 9b-9b in FIG. 9a.

FIGS. 13a and 13b respectively are top and side views of the embodiment of the object-movement region and movement-exam system of FIGS. 11 and 12. The top view of FIG. 13a is taken through plane 13a-13a in FIG. 13b. The side view of FIG. 13b is taken through plane 13b-13b in FIG. 13a. Only the VC network of the movement-exam system appears in FIGS. 13a and 13b.

Figures 1, 2:
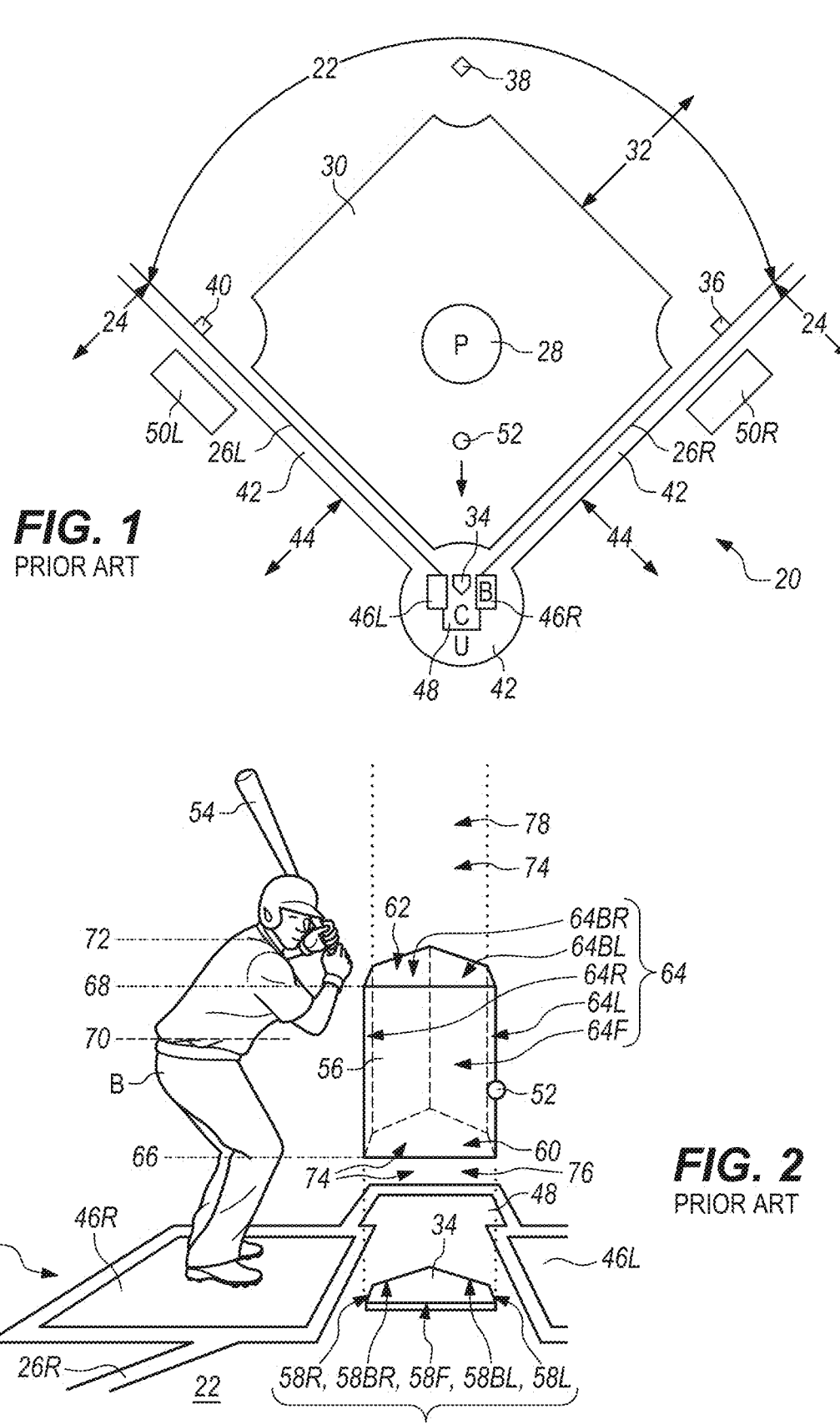
FIG. 1 is a plan view of the diamond area of a conventional BB/SB field as a baseball or softball moves toward the strike zone.
FIG. 2 is a perspective view of the home-plate region of the conventional field of FIG. 1 showing the boundaries of the strike zone.

Like reference symbols are employed in the drawings and in the description of the preferred embodiments to represent the same, or very similar, item or items. A slash (/) through an arrow representing a signal or data in the drawings indicates that the signal or data may, or does, consist of multiple signals or data components transmissible in parallel even if not expressly so stated in the description of the preferred embodiments.

DESCRIPTION OF THE PREFERRED EMBODIMENTS

Preliminary Information

The following terms herein have the specified meanings except as otherwise indicated.

The term "or/and" or "and/or" between a pair of items means either or both items. Similarly. "or/and" or "and/or" before the next-to-last item of three or more items means any one or more, up to all, of the items. Two adjectives separated by a slash (/) generally means both adjectives. For example, "lower/upper" means lower and upper.

Use of multiple groups of items in a sentence where each group of items has an "or" before the last item in that group means, except as the context otherwise indicates, that the first items in the groups are associated with each other, that the second items in the groups are associated with each other, and so on. For instance, a recitation of the form "Item J1, J2, or J3 is connected to item K1, K2, or K3" means that item J1 is connected to item K1, item J2 is connected to item K2, and item J3 is connected to item K3.

A region whose boundary, along the region's inside and outside, lies at least partially in space, including air, is an imaginary region. Consequently, the spatial and strike zones and spatial-zone availability space dealt with below are imaginary regions. The boundary of an imaginary region is often simulated in an image. All planes are imaginary except as otherwise indicated.

An expression that an article, such as either object (104 or 214) described below, "passes through or/and by" a 3D region, where "passes" can be in the past tense, includes the situation in which one part of the article passes "through" the region and another part of the article passes "by" the region. Similarly, an expression that an article "passes through or/and over or under" a 3D region, where "passes" can again be in the past tense, includes the situation in which one part of the article passes "through" the region and another part of the article passes "over or under" the region.

The words "over", "overlying", "above", "under", "underlying", and "below" apply to the orientations of items shown in the drawings. These six words are to be interpreted to mean corresponding other directional-sense words for items configured identical to, but oriented differently than, those shown in the drawings.

The terms "horizontal" and "vertical" as used in describing an item respectively mean horizontal and vertical relative to the Earth's surface at the item's location. If the item is part of a larger item which can be rotated so that the larger item's vertical direction is not aligned to the vertical direction of the Earth's surface at the location of the larger item, "vertical" means the vertical direction of the larger item while "horizontal" means perpendicular to the vertical direction of the larger item.

The term "lateral" means horizontal except as otherwise indicated. For instance, a "lateral" direction is a horizontal direction. Similarly, a "lateral" side or surface is a side or surface whose direction vector perpendicular to the side or surface points horizontally.

The term "imagery" means still images or/and "moving imagery" which, in turn, means a sequence of images capable of presenting motion. All recitations of collecting or otherwise gathering imagery include collecting or otherwise gathering data of the imagery if not explicitly indicated. If not explicitly indicated, all recitations of processing, examining, or comparing imagery or performing other actions on imagery similarly include processing, examining, or comparing data of the imagery or performing other actions on the imagery data.

A recitation that imagery captures an item when it is "unobstructedly" within a field of view means that the imagery captures the item when it is within the field of view and nothing obstructs the imagery from capturing the item.

Material is "transparent" if the shape of a body separated from the material only by air or vacuum can be clearly and accurately seen through the material. The material is transparent even if the body's shape is magnified or shrunk as seen through the material. The term "semitransparent" means partially transparent.

The term "encompasses" means is common to (or includes). A first item partly encompasses a second item when part of the second item is common to the first item.

The terminology "roughly perpendicular" means no more than 20°, preferably no more than 10° more preferably no more than 50, from fully perpendicular. The terminology "roughly in line with" means no more than 20°, preferably no more than 10°, more preferably no more than 5°", from fully in line with.

All recitations of perpendicular, horizontal, lateral, vertical, opposite, simultaneous, and grammatical variations thereof ending in "ly" respectively include largely perpendicular, largely horizontal, largely lateral, largely vertical, largely opposite, largely simultaneous, and "largely" followed by the variations ending in "ly" except as otherwise indicated. Each recitation providing that later textual material is the same as earlier textual material means that the earlier material is incorporated by reference into the later material.

All the data processors described below normally use suitable data-processing software.

All recitations of actions within the purview of a data collector mean (i) within the purview of a boundary determiner if the data collector is part of the boundary determiner and (ii) within the purview of a movement analyzer if the data collector is part of the movement analyzer. All recitations of actions within the purview of a boundary determiner or a movement analyzer mean within the purview of a movement-examination system containing the boundary determiner or movement analyzer.

The "barrel" of a bat for BB/SB means the widest bat portion extending roughly one third of the bat's length. The barrel is often of roughly constant (maximum) diameter.

The following acronyms are used below to shorten the description. "BB/SB" means the sport of baseball or softball. "FOV" means field of view. "IR" means infrared. "MLB" means Major League Baseball. "NCAA" means National Collegiate Athletic Association. "NSA" means U.S. National Softball Association. "UV" means ultraviolet. "VC" means video camera. "2D" means two-dimensional. "3D" means three-dimensional.

The reference symbols for items in FIGS. 1 and 2 are used below for corresponding items. Upper left and right back edges 58BL and 58BR of home plate 34 together form its upper back (or rear) edge 58B. Left and right back boundaries 64BL and 64BR of strike zone 56 together form its back (or rear) zonal boundary 64B. Reference symbols 58B and 64B do not appear in the drawings.

Basic Movement-Examination System

Figure 3A:
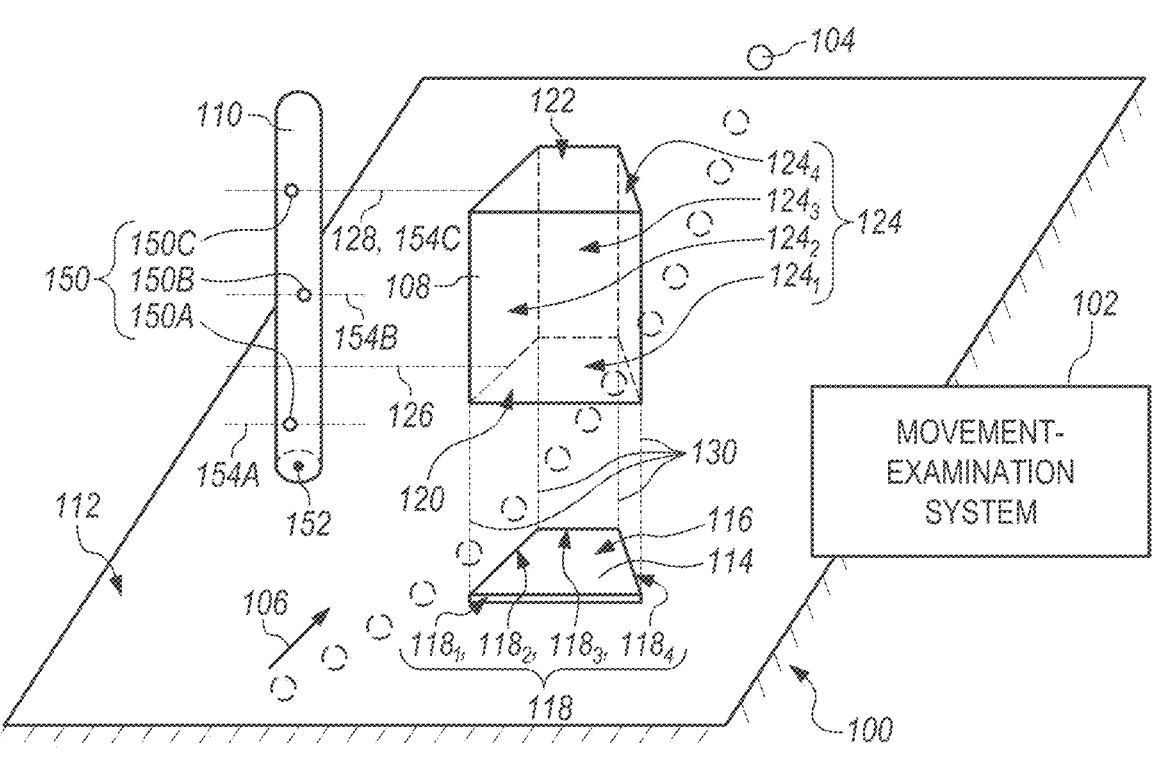
FIGS. 3a and 3b are diagrammatic views of an object-movement region and a movement-exam system in accordance with the invention for electronically determining whether at least part of a principal object moving toward a 3D variable-shape spatial zone of the object-movement region entered the zone preferably based on the zone's shape as the object moved toward the zone.
Figure 3B:
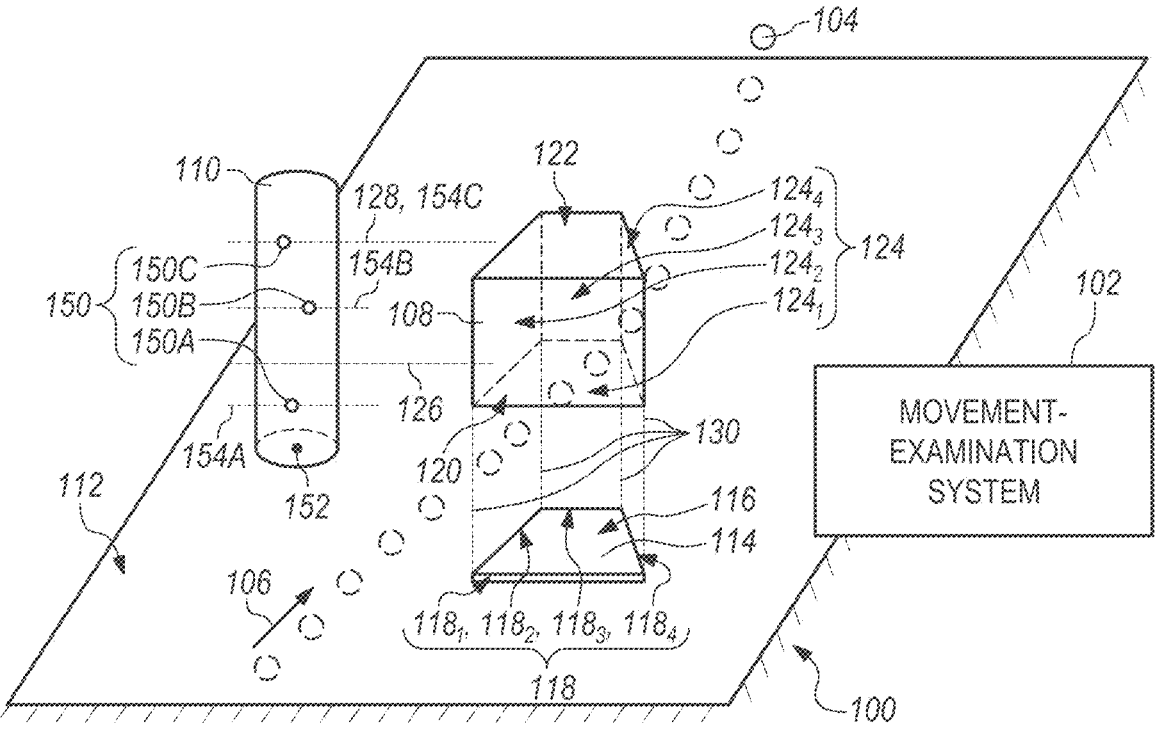

FIGS. 3a and 3b (collectively "FIG. 3") illustrate an object-movement region 100 and a basic movement-examination (again, "movement-exam") system 102 configured according to the invention for electronically determining whether at least part of a principal object 104, usually inanimate, moving along a trajectory 106 toward an imaginary 3D timewise variable-shape cylindrical spatial zone 108 of object-movement region 100 entered spatial zone 108, preferably based on its shape during the time period $t_m$ in which principal object 104 moved toward zone 108. Movement-exam system 102 usually makes its electronic determinations by collecting imagery, more specifically data of the imagery, of object 104, the space occupied by zone 108, and adjoining space within the system's purview and then processing the imagery, likewise more specifically data of the imagery, to determine whether object 104 entered zone 108.

The shape of spatial zone 108 during object-movement time period $t_m$ depends on certain characteristics of a 3D timewise variable-shape zone-control body 110 situated over a principal surface 112 of object-movement region 100. Two different shapes for zone-control body 110 are presented in FIGS. 3a and 3b. Body 110, which usually contacts regional surface 112, can be largely organic such as a human including clothing, mixed organic/inorganic, or largely inorganic. Surface 112 is usually roughly flat and extends approximately horizontal.

If at least part of object 104 entered zone 108, movement-exam system 102 also preferably determines where at least part of object 104 entered zone 108. System 102 then preferably determines whether at least part of object 104 passed through zone 108 and, if so, more preferably where at least part of object 104 passed through zone 108. System 102 may provide (i) a still image showing the quasi-cylindrical (volume of) space occupied by object 104 as it passed through or/and by zone 108 or/and (ii) a video clip simulating how object 104 went through that space in passing through or/and by zone 108.

Object 104 is represented here as generally spherical in shape suitable for a baseball or softball but can be of other shape. With object 104 appearing near the top of each of FIGS. 3a and 3b after having gone beyond zone 108, typical earlier positions of object 104 along trajectory 106 are indicated in dashed line. The movement of object 104 toward zone 108 originates from an object-movement origin (not shown in FIG. 3) of a movement-originating body (also not shown in FIG. 3) which likewise can be largely organic, mixed organic/inorganic, or largely inorganic.

Object 104 can be powered or unpowered and can rotate, i.e., spin, as it moves toward zone 108. When object 104 is unpowered, its movement is controlled largely by gravitational force and air friction. For the unpowered situation, gravity causes object trajectory 106 to curve downward as object 104 approaches zone 108 while air friction can cause trajectory 106 to curve laterally (horizontally) or/and downward, especially if object 104 is rotating. If object 104 is powered, its movement can be controlled, usually remotely. The volume occupied by object 104 as it moves along trajectory 106 is quasi-cylindrical.

For the sport of baseball or softball (again, "BB/SB") using the reference symbols of FIGS. 1 and 2, object 104 is pitched ball 52, spatial zone 108 is strike zone 56, and zone-control body 110 is batter B. The shape of zone 56, specifically the locations of its lower/upper boundaries 60 and 62, depends on the batter's physical zone-control characteristics, primarily height and stance. System 102 electronically determines the appropriate shape for zone 56 preferably soon after, usually no more than 0.1 s after, ball 52 has left the pitcher's pitching hand. This complies with 2022 MLB "Definition of Terms, STRIKE ZONE" and 2021-2022 NCAA Baseball Rule 2, "Definitions, Strike Zone", that zone 56 "shall be determined from the batter's stance as the batter is prepared to swing at a pitched ball".

The batter's stance usually changes little from immediately before, e.g., no more than 0.1 s before, ball 52 leaves the pitcher's pitching hand to immediately after, e.g., no more than 0.1 s after, ball 52 has left the pitching hand. Consequently, pitcher P is typically able to adjust the ball's intended destination according to the batter's zone-control characteristics. System 102 may alternatively compliantly determine the appropriate strike-zone shape at a later point up to the instant at which ball 52 reaches a vertical plane extending through front boundary 64F of strike zone 56.

The movement-originating body for object 104 can be situated laterally at any location in object-movement region 100 relative to spatial zone 108 and control body 110 except at a location in which body 110 lies between the movement-originating body and zone 108 because body 110 could then impede the movement of object 104 toward zone 108. Zone 108 can even lie between the movement-originating body and body 110. If so, object 104 will sometimes impact body 110. FIG. 3 presents a typical example in which a vertical plane (not shown) extending through the movement-originating body and zone 108 is roughly perpendicular to a vertical plane (likewise not shown) extending through body 110 and zone 108.

Zone 108 is situated identically above, and vertically spaced apart from, a boundary-defining fixture 114 lying over surface 112 of region 100 at a fixed location in region 100. Boundary-defining fixture 114 has (a) a largely flat upper surface 116 and (b) a lateral (or side) surface meeting upper fixture surface 116 along a full upper fixture edge 118 constituting a closed curve. The bottom of fixture 114 adjoins regional surface 112 and is usually approximately coplanar with it. Fixture 114 may, however, be recessed into the material of region 100. If so, fixture surface 116 is usually no lower than the portion of regional surface 112 adjoining the fixture's lateral surface.

Full upper fixture edge 118, and thus fixture surface 116 as viewed vertically, can be of various shapes. For instance, edge 118 can be (shaped as) an inflectionless cuspless curve such as a circle or ellipse. Referring to the example of FIG. 3, edge 118 typically consists of n distinct partial upper fixture edges $118_1$, $118_2$, . . . and $118_n$, where n is a selected integer of 2 or more. Letting i be an integer running from 1 to n−1, each partial edge $118_i$ meets partial edge $118_{i+1}$. Partial edge $118_n$ meets partial edge $118_1$. Each of partial edges $118_1$-$118_n$ is a straight or curved line segment.

FIG. 3 presents an example in which fixture surface 116 is of polygonal shape. Fixture edge 118 is thereby a polygon for which each of partial upper fixture edges $118_1$-$118_n$ is a straight line segment with selected integer n being at least 3. Surface 116 in FIG. 3 is specifically a tetragon, integer n being 4, so that surface 116 has four partial edges $118_1$-$118_4$. Edges $118_1$-$118_4$ are numbered clockwise as viewed from above the tetragon with edge $118_1$ being nearest the front of FIG. 3. The tetragon is a trapezoid in this example.

Spatial zone 108 has a planar first zonal boundary 120, a planar second zonal boundary 122 extending parallel to first zonal boundary 120, and a lateral zonal boundary 124 extending fully between first/second zonal boundaries 120 and 122 perpendicular to them so as to form a semiclosed surface. Zonal (or spatial-zone) boundaries 120, 122, and 124 are imaginary surfaces not directly visible to any person. However, those imaginary surfaces may be simulated in 2D and 3D images.

Opposite first/second zonal boundaries 120 and 122 extend parallel to fixture surface 116 and are spaced apart from each other and from fixture 114 in a boundary-determination direction generally perpendicular to boundaries 120 and 122. Second boundary 122 is farther from fixture 114 than first boundary 120. Boundaries 120 and 122 and surface 116 all usually extend horizontally so that the boundary-determination direction is usually the vertical direction, specifically the upward vertical direction. Boundaries 120 and 122 are then vertically spaced apart from each other and from fixture 114 and respectively constitute the lower and upper boundaries of zone 108. Lower and upper zonal boundaries 120 and 122 extend respectively through a lower horizontal boundary-defining plane 126 and an upper horizontal boundary-defining plane 128 both indicated by horizontal dashed lines in FIG. 3.

Lower/upper zonal boundaries 120 and 122 are of the same horizontal shape and size as fixture surface 116 because zone 108 is situated identically above fixture 114. Lateral zonal boundary 124 thereby identically matches fixture edge 118 in horizontal size and shape. If edge 118 were an inflectionless cuspless curve such as a circle or an ellipse, boundary 124 would be a continuously laterally curving semiclosed surface such as the side surface of a circular or elliptical cylinder. Zone 108 would then be such a cylinder.

In the typical example of FIG. 3, lateral zonal boundary 124 consists of n distinct side zonal boundaries $124_1$, $124_2$, . . . and $124_n$. Each side zonal boundary $124_i$ laterally meets side zonal boundary $124_{i+1}$ along an imaginary vertical line 130 where integer i again runs from 1 to n−1. Side zonal boundary $124_n$ laterally meets side zonal boundary $124_1$ along another imaginary vertical line 130. Side zonal boundaries $124_1$-$124_n$ respectively situated directly above partial upper fixture edges $118_1$-$118_n$ can be planar or curved.

For the example of FIG. 3 in which fixture surface 116 is of polygonal shape so that fixture edge 118 is a polygon, zone 108 is a polyhedron, specifically a polygonal cylinder. Each of side boundaries $124_1$-$124_n$ is planar. With selected integer n being 4 in FIG. 3, boundary 124 consists of four side zonal boundaries $124_1$-$124_4$. Hence, zone 108 is a tetragonal cylinder, more particularly, a trapezoidal cylinder in this example.

Side zonal boundaries $124_1$ and $124_3$ respectively closest to and farthest from the object-movement origin are respectively termed the front and rear boundaries of zone 108. Side zonal boundaries $124_2$ and $124_4$ then respectively are the left and right boundaries of zone 108. Fixture edges $118_1$ and $118_3$ respectively closest to and farthest from the object-movement origin are similarly respectively termed the upper front and rear edges of fixture 114. Fixtures $118_2$ and $118_4$ are then respectively the upper left and right edges of fixture 114. Using this terminology, front, left, rear, and right zonal boundaries $124_1$-$124_4$ respectively identically overlie front, left, rear, and right fixture edges $118_1$-$118_4$.

Imaginary lines 130, shown in dashed form where visible, extend vertically upward from the corners (four in the example of FIG. 3) of fixture edge 118 respectively through the corners of lower zonal boundary 120, through the vertical edges of lateral zonal boundary 124, and up at least to the corners of upper zonal boundary 122. Upper fixture edges $118_1$-$118_4$ thereby have imaginary planar extensions respectively extending from edges $118_1$-$118_4$ upward through side boundaries $124_1$-$124_4$ of zone 108.

Figure 4:
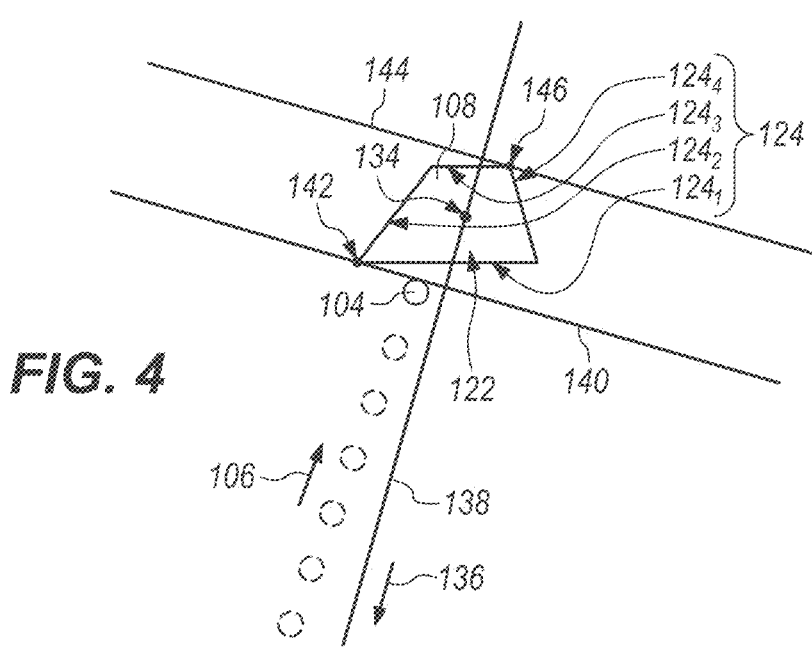
FIG. 4 is a top-down view depicting exemplary movement of the principal object toward the spatial zone in the object-movement region of FIGS. 3a and 3b.

FIG. 4 presents a top-down view of an example of an article moving toward spatial zone 108 in object-movement region 100 for assistance in understanding what is meant by at least part of the article "entering", passing "through", passing "partway through", and passing "by" zone 108. Although the explanation of FIG. 4 applies to any article moving toward zone 108, the explanation is directed toward the article being principal object 104 whose object-movement origin is shown in later FIGS. 9a and 9b.

Item 134 in FIG. 4 is a vertical zonal reference line extending approximately through the volumetric center (point) of zone 108. Item 136 in FIG. 4 indicates the lateral direction, termed the zone-to-origin direction, from zone 108 to the movement-originating body lying below the material depicted in FIG. 4. The movement-originating body and zonal reference line 134 lie approximately in a vertical zone-to-origin plane 138 extending laterally in zone-to-origin direction 136. For object 104, trajectory 106 usually extends roughly parallel to plane 138 depending on the trajectory's lateral curvature.

A vertical front zone-meeting plane 140 extending perpendicular to zone-to-origin plane 138 meets zone 108 at a frontmost site 142 on front zonal boundary $124_1$. Frontmost site 142 is closer to the movement-originating body than any other site on zone 108. A vertical rear zone-meeting plane 144 likewise extending perpendicular to plane 138 and thus parallel to front plane 140 meets zone 108 at a rearmost site 146 on rear zonal boundary $124_3$. Rearmost site 146 is farther from the movement-originating body than any other site on zone 108. Each site 142 or 146 is usually a vertical line or a portion of a vertical line but can be as little as a single point. For exemplary purposes, FIG. 4 depicts each plane 140 or 144 as being at a significant solid angle to boundary $124_1$ or $124_3$.

At least part of the moving article "enters" zone 108 when at least part of the article passes through zone-meeting plane 140 or 144 and subsequently enters zone 108 in some way. If that plane is front plane 140 as indicated for object 104 in the example of FIG. 4, entry typically occurs at front zonal boundary $124_1$ but can occur at left zonal boundary $124_2$, right zonal boundary $124_4$, upper zonal boundary 122, lower zonal boundary 120, or any feasible combination of boundaries $124_1$, $124_2$, $124_4$, 122, and 120, i.e., usually any combination except one including both of left/right boundaries $124_2$ and $124_4$ or both of lower/upper boundaries 120 and 122. These are the particular places where at least part of object 104 enters zone 108. Partial or full entry at lower zonal boundary 120 is rare.

The article can approach zone 108 from generally the opposite direction shown for object 104 in FIG. 4 so that at least part of the article passes through rear plane 144 during entry. In that case, entry typically occurs at rear zonal boundary 124₃ but can occur at any of zonal boundaries 124₂, 124₄, 122, or 120 or any feasible combination of boundaries 124₃, 124₂, 124₄, 122, and 120.

At least part of the article passes "through" zone 108 when at least part of the article passes through one of zone-meeting planes 140 and 144, enters and leaves zone 108, and passes through the other of planes 140 and 144. At least part of the article passes "partway through" zone 108 when at least part of the article passes through one of planes 140 and 144, enters zone 108, and leaves it without passing the other of planes 140 and 144. The article passes "by" zone 108 when at least part of the article passes through one of planes 140 and 144, none of the article enters zone 108, and at least part of the article passes through the other of planes 140 and 144. For object 104, passage "through" and "by" zone 108 further requires that all of object 104 pass through both planes 140 and 144 starting with passage through front plane 140 while passage "partway through" zone 108 further requires that all of object 104 pass through front plane 140.

Returning to FIG. 3, control body 110 has a set of designated physical features 150 timewise variably spaced apart from a body reference situs 152 in the boundary-determination direction from body reference situs 152 toward lower/upper zonal boundaries 120 and 122 perpendicular to them. Inasmuch as the boundary-determination direction is usually the upward vertical direction, designated physical body features 150 are usually vertically spaced apart from situs 152 exemplified here as a location in the area where body 110 overlies regional surface 112. FIG. 3 presents an example in which features 150 consist of three physical body features 150A, 150B, and 150C whose vertical spacings from situs 152 progressively increase.

Each body feature 150 is defined by one or more points, usually multiple points, on body 110. The number of features 150 is usually at least two but can be as little as one. For the typical situation in which there are multiple features 150, each one is vertically spaced apart from each other one. Features 150 can be situated at various lateral locations relative to reference situs 152.

A set of lateral feature planes, collectively identified by reference symbol 154, respectively extend horizontally through body features 150. Lateral feature planes 154 specifically extend respectively through selected points of features 150 so as to establish a way for precisely determining how far each plane 154 is above reference situs 152. For instance, a plane 154 can extend through the uppermost or lowermost point of a feature 150, through the centermost point of that feature 150, or through a point marking a certain characteristic of that feature 150. In the example of FIG. 3, planes 154 consist of three feature planes 154A, 154B, and 154C indicated by horizontal dashed lines and extending respectively through specified points of features 150A, 150B, and 150C. The vertical spacings of planes 154A, 154B, and 154C from situs 152 progressively increase.

Reference situs 152 can laterally change location between consecutive instances of object 104 leaving the object-movement origin. Such a lateral situs location change does not itself affect the vertical spacings of feature planes 154 from situs 152. Should situs 152 undergo a vertical location change in the course of laterally changing location, system 102 determines the magnitude of the situs's vertical location change and, as necessary, appropriately adjusts the vertical spacings of planes 154 from situs 152.

Using feature planes 154 to respectively characterize body features 150, one or more of features 150 define (or determine) the locations of each of lower/upper zonal boundaries 120 and 122 extending respectively through horizontal lower/upper boundary-defining planes 126 and 128. The locations of boundaries 120 and 122 are defined specifically relative to upper surface 116 of fixture 114. Importantly, the locations of boundaries 120 and 122 are temporary because they depend on the timewise-variable vertical distances of features 150 from situs 152.

FIG. 3 further presents an example in which a plurality of body features 150, namely features 150A and 150B so that the plurality is two, define the temporary location of lower zonal boundary 120 and in which one feature 150, namely feature 150C, defines the temporary location of upper zonal boundary 122. The location of lower boundary 120 in this example is defined by lower boundary-defining plane 126 situated partway between feature planes 154A and 154B extending respectively through features 150A and 150B such that lower plane 126, and thus boundary 120, is a specified portion of the vertical distance from lowermost plane 154A to intermediate-located plane 154B and therefore is that portion of the vertical distance from lowermost feature 150A to intermediate-located feature 150B. The location of upper boundary 122 in this example is defined by upper boundary-defining plane 128 extending through uppermost plane 154C and thus through uppermost feature 150C.

One or both of body features 150A and 150B, although used here in defining the location of lower zonal boundary 120, could also be used in defining the location of upper zonal boundary 122. Feature 150C could similarly also be used in defining the location of boundary 120. If there are more than three features 150, each additional feature 150 would be used in defining the location of at least one of boundaries 120 and 122.

Control body 110 can be of various shapes such that the vertical distance between each body feature 150 and reference situs 152 is variable. Since feature planes 154 respectively extend horizontally through features 150 and since the locations of lower/upper zonal boundaries 120 and 122 are defined by boundary-defining planes 126 and 128 respectively extending horizontally through boundaries 120 and 122, the vertical distance between each boundary 120 or 122 and fixture surface 116 is variable.

The two conditions of body 110 in FIGS. 3a and 3b are generally conditions in which at least one body feature 150 in FIG. 3b is at a different vertical distance above reference situs 152 than that feature 150 in FIG. 3a such that at least one lower/upper zonal boundary 120 or 122 in FIG. 3b is at a different vertical distance above fixture surface 116 than that boundary 120 or 122 in FIG. 3a. FIG. 3 presents the exemplary situation in which all features 150 in FIG. 3 are respectively at different distances above situs 152 than all features 150 in FIG. 3a such that boundaries 120 and 122 in FIG. 3b are respectively at different vertical distances above surface 116 than boundaries 120 and 122 in FIG. 3a.

The different feature conditions of body 110 in FIGS. 3a and 3b can arise in various ways. For instance, the two different feature conditions in FIGS. 3a and 3b can arise because body 110 is a different actual body in FIG. 3b than in FIG. 3a. Body 110 can be the same actual body in FIG. 3b as in FIG. 3a. In that case, the two different feature conditions in FIGS. 3a and 3b arise because body 110 changes shape with time in going from FIG. 3*a* to FIG. 3*b*. The shape change can occur as object 104 moves toward spatial zone 108.

With reference to the items shown in FIGS. 1 and 2 and with later-defined reference symbols indicated in parentheses, the following applies to each BB/SB situation described below in which system 102 electronically calls determines whether at least part of ball 52 entered strike zone 56:

a. Object-movement region 100 is a ball-movement region (304) formed with a BB/SB field.

b. Regional surface 112 is the field's upper surface variously defined with grass and dirt, each of which can be natural or/and artificial.

c. Boundary-defining fixture 114 is home plate 34, upper fixture edge 118 being upper plate edge 58.

d. Spatial zone 108 is strike zone 56. Lower and upper zonal boundaries 120 and 122 respectively are lower and upper boundaries 60 and 62 of zone 56. Lateral zonal boundary 124 is lateral boundary 64 of zone 56 extending fully between boundaries 60 and 62 perpendicular to them.

e. Side zonal boundaries 124₁, 124₂, and 124₄ respectively are front boundary 64F, left boundary 64L, and right boundary 64R of zone 56. Side zonal boundary 124₃ is equivalent to back boundary 64B formed with left and right back boundaries 64BL and 64BR of zone 56.

f. Front zone-meeting plane 140 is a vertical plane passing through front zonal boundary 64F. Rear zone-meeting plane 144 is a vertical plane passing through the vertical line where left and right back zonal boundaries 64BL and 64BR meet and extending parallel to boundary 64F.

g. Lower and upper boundary-defining planes 126 and 128 respectively are lower and upper boundary-defining planes 66 and 68 respectively extending through zonal boundaries 60 and 62.

h. The reference symbol (108M) for the below-described spatial-zone availability space applicable to spatial zone 108 also applies to the strike-zone availability space applicable to strike zone 56.

i. The below-described movement-originating body (204) is pitcher P, the object-movement origin (206) being the pitcher's pitching hand.

j. Zone-to-origin direction 136 is the zone-to-pitcher direction. Zone-to-origin plane 138 is the zone-to-pitcher plane.

k. Principal object 104 is pitched ball 52, specifically a baseball or softball. Object trajectory 106 is the trajectory of ball 52 as it moves from the pitcher's pitching hand toward zone 56.

l. Zone-control body 110 is batter B.

m. Physical body features 150 are features of batter B.

n. Body reference situs 152 is located on the field's upper surface below, or nearly below, batter B.

o. Feature planes 154 are horizontal planes extending respectively through selected points of features 150 of batter B for precisely determining how far each feature 150 is situated above situs 152.

p. The incoming body-image data (166), described below, is incoming body-image data of imagery of largely all batter B. The incoming feature data (166A), described below, is incoming feature data of imagery of at least each body feature 150 of batter B. The incoming whole-body data (166B), described below, is incoming whole-body data of imagery of substantially all batter B.

q. The incoming zone-vicinity article-location data (170), described below, is incoming zone-vicinity article-location data of imagery of ball 52. The incoming tracking article-location data (226), described below, is incoming article-location data of imagery of ball 52 and bat 54.

r. The solid or/and liquid matter, described below, that materially affects movement of object 104 as it moves from the object-movement origin (206) toward spatial zone 108 is infield 22, including plate 34, as ball 52 moves from the pitcher's pitching hand toward strike zone 56.

s. The additional object (214), described below, is bat 54 controlled by batter B.

t. The selected exit location, described below, by which the additional object (214) exits zone 108 is plate-clearing area 74.

u. The movement of ball 52 is usually terminated by catcher C in the rear-side constituent (216), described below, if ball 52 goes beyond zone 56.

Figure 5:
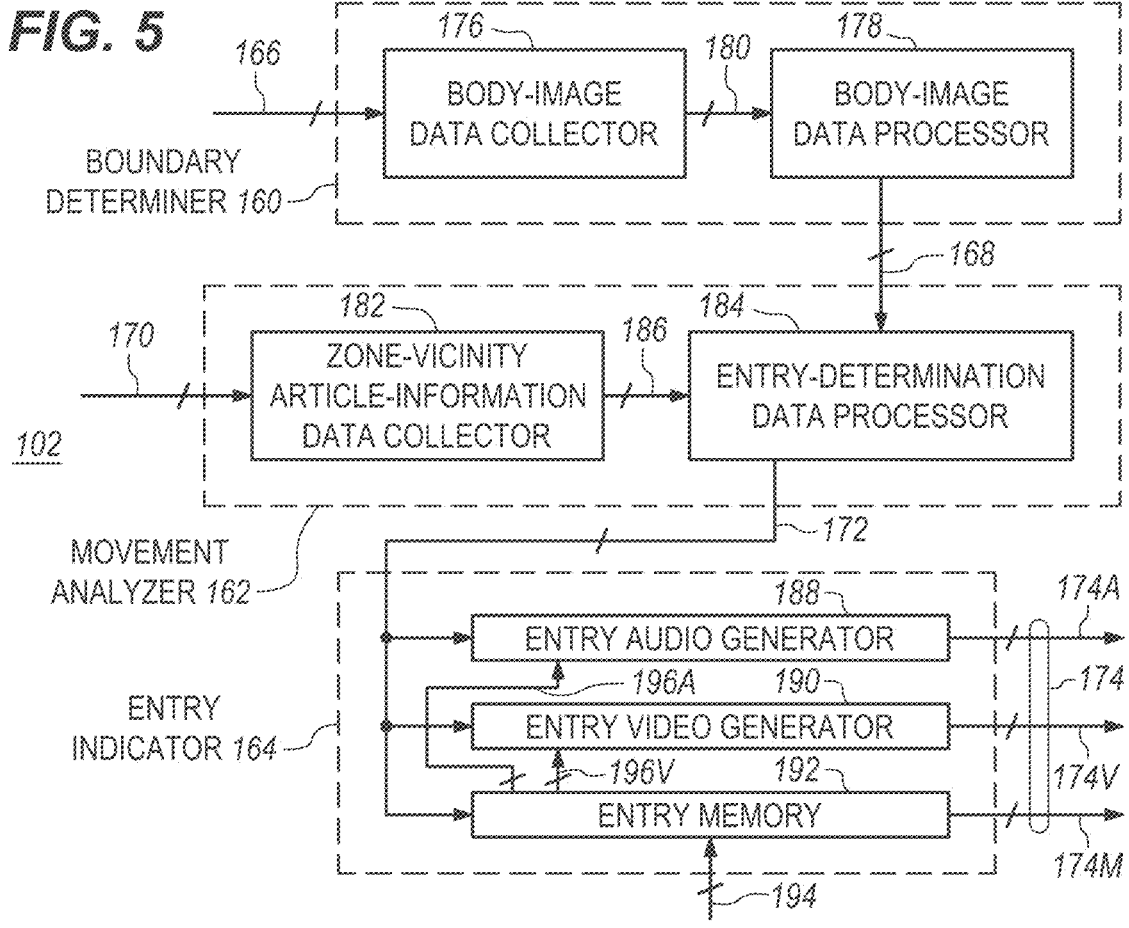
FIG. 5 is a block diagram of an embodiment of the movement-exam system in FIGS. 3a and 3b.

FIG. 5 illustrates an embodiment of movement-exam system 102 formed with a boundary determiner 160, a movement analyzer 162, and an entry indicator 164. Boundary determiner 160 provides a boundary-determination capability for electronically determining the temporary locations of lower/upper zonal boundaries 120 and 122 preferably as principal object 104 moves toward spatial zone 108. Determiner 160 first collects incoming body-image data 166 of imagery of largely all zone-control body 110 within the determiner's purview while body 110 is near zone 108 preferably at least as object 104 is moving toward zone 108. Largely all body 110 here means at least the body portion encompassing all designated physical body features 150. Incoming body-image data 166 thereby includes data of imagery of each feature 150.

Boundary determiner 160 processes incoming body-image data 166 to determine the locations of boundaries 120 and 122 and provides those location determinations as lower/upper boundary-location data 168. In so doing, determiner 160 electronically determines within its purview how far each body feature 150 is spaced apart from reference situs 152, FIG. 3, in the boundary-determination direction. An electronic record of the locations of features 150, specifically the points defining them, on control body 110 is usually maintained in determiner 160, e.g., in a computer memory, to assist in generating this distance information.

Determiner 160 employs the distance information to determine the locations of lower/upper zonal boundaries 120 and 122 as a function of how far each body feature 150 is spaced apart from situs 152 in the boundary-determination direction. Since the boundary-determination direction is usually the vertical direction, determiner 160 usually electronically determines how far each feature 150 is vertically spaced apart from situs 152 and employs the vertical distance information to determine the locations of boundaries 120 and 122 as a function of how far each feature 150 is vertically spaced apart from situs 152.

Determiner 160 preferably provides the lower/upper boundary location determinations of lower/upper boundary-location data 168 soon after, more preferably no more than 0.2 s after, even more preferably no more than 0.1 s after, object 104 has left the object-movement origin and started moving toward spatial zone 108. For BB/SB, determiner 160 preferably provides data 168 no more than 0.1 s after ball 52 has left the pitcher's pitching hand and started moving toward strike zone 56.

Movement analyzer 162 furnishes a principal-entry capability that first entails collecting incoming zone-vicinity article-location data 170 of imagery of any article within the analyzer's purview while control body 110 is near zone 108 at least while the article is moving toward zone 108. Analyzer 162 continues the principal-entry capability by determining whether the moving article is highly likely to be object 104 and, if so, treating the article as object 104. Analyzer 162 then responds to incoming zone-vicinity article-location data 170 and to the determinations of the temporary locations of lower/upper zonal boundaries 120 and 122 provided in lower/upper boundary-location data 168 by electronically determining whether at least part of object 104 entered zone 108.

If at least part of object 104 entered zone 108, analyzer 162 preferably determines where at least part of object 104 entered zone 108. Analyzer 162 also determines preferably whether and, if so, more preferably where at least part of object 104 passed through zone 108. If object 104 passed by zone 108, analyzer 162 may determine where object 104 most closely approached zone 108. Analyzer 162 provides these determinations on entry or non-entry of least part of object 104 into zone 108 and passage or non-passage of at least part of object 104 through zone 108 in the form of an electronic entry-determination signal 172. These actions are all parts of the principal-entry capability.

Entry indicator 164 provides an entry-indication capability in which indicator 164 responds to entry-determination signal 172 by providing a human-comprehensible entry indication signal 174 at either a spatial-zone entry indication value (or condition) if at least part of object 104 entered spatial zone 108 or at a spatial-zone non-entry indication value if object 104 passed by zone 108, i.e., none (no part) of object 104 entered zone 108. If at least part of object 104 entered zone 108, entry indication signal 174 preferably indicates where at least part of object 104 entered zone 108. Signal 174 also then preferably indicates whether at least part of object 104 passed through zone 108 and, if so, more preferably where at least part of object 104 passed through zone 108. Signal 174 is usually provided to at least one human. As explained below, signal 174 is typically provided in multiple forms.

Boundary determiner 160 contains a body-image data collector 176 and a body-image data processor 178. Body-image data collector 176 examines control body 110 in order to collect incoming body-image data 166 of imagery of largely all body 110 including imagery of each body feature 150. This imagery may be solely in electronic form and thus not human visible. In any event, collector 176 provides data 166 in electronic form as outgoing body-image data 180.

Body-image data processor 178 processes outgoing body-image data 180 to electronically determine the temporary locations of lower/upper zonal boundaries 120 and 122 while body 110 is near zone 108 preferably as object 104 is moving toward zone 108. As output of determiner 160, processor 178 provides the determinations of the locations of boundaries 120 and 122 as lower/upper boundary-location data 168.

Movement analyzer 162 contains a zone-vicinity article-information ("article-info") data collector 182 and an entry-determination data processor 184. Collectors 176 and 182 are usually at least partially merged for sharing data collection capability. Processors 178 and 184 are likewise usually at least partially merged for sharing data processing capability.

Zone-vicinity article-info data collector 182 collects incoming zone-vicinity article-location data 170 of imagery of the space occupied by zone 108 and any article within the collector's and analyzer's purview while body 110 is near zone 108 preferably at least as the article is moving toward zone 108. This imagery, which usually include an image of fixture 114, may be solely in electronic form and therefore not human visible. Collector 182 provides data 170 of the imagery as principal outgoing article-location data 186.

Collectors 176 and 182 generate their imagery using electromagnetic radiation normally in the visible, infrared ("IR"), or/and ultraviolet ("UV") wavelength ranges. For instance, collectors 176 and 182 can employ a video camera network for generating their imagery with radiation extending across largely the entire visible wavelength range or/and across considerable bands of the IR or UV wavelength ranges. Collectors 176 and 182 can also employ laser or holographic sensors that generate imagery using radiation at one or more relatively narrow bands, nearly distinct points, in the visible, IR, or/and UV wavelength ranges. Collectors 176 and 182 can further employ electromagnetic pulse-distance measurement, photoelectric proximity sensing especially diffuse (reflective), through-beam (opposed), and retroreflective sensing, and combinations of all these techniques. The apparatus used in collectors 176 and 182 and the further data collector (232) described below can be physically located at various places.

Analyzer 162, specifically zone-vicinity article-info collector 182 or entry-determination data processor 184, is programmed with, or can otherwise immediately access, the size and shape characteristics of object 104 and compares the size and shape of any moving article within the analyzer's purview to the size and shape characteristics of object 104. If the comparison indicates a match sufficiently close that the article is highly likely to be object 104, analyzer 162 treats the article as object 104. Principal outgoing article-location data 186 then includes data on object 104.

Entry-determination processor 184 responds to the determinations of the temporary locations of zonal boundaries 120 and 122 provided in lower/upper boundary-location data 168 by processing outgoing article-location data 186 on object 104 to determine whether and, if so, preferably where at least part of object 104 entered zone 108. Processor 184 also determines preferably whether and, if so, more preferably where at least part of object 104 passed through zone 108. If object 104 passed by zone 108, processor 184 may determine where object 104 most closely approached zone 108. Processor 184 then provides these entry/passage determinations as entry-determination signal 172.

Processor 184 may also generate principal object-path data for (i) a still image showing the principal (volume of) space occupied by object 104 as object 104 was about to enter or/and pass by zone 108, was passing at least partway through or/and by it, or had just exited or/and passed by it or/and (ii) a video clip simulating how object 104 occupied that space. If so, the principal object-path data is included in entry-determination signal 172.

Entry indicator 164 contains an entry audio generator 188, an entry video generator 190, and an entry memory 192. Entry audio generator 188 responds to entry-determination signal 172 by providing entry indication signal 174 as an audible entry indication sound 174A that implements the entry or non-entry indication value of signal 174. Entry indication sound 174A is sometimes provided to a person who audibly repeats sound 174A or otherwise audibly voices the meaning of sound 174A.

Entry video generator 190 responds to entry-determination signal 172 by providing indication signal 174 as video entry indication imaging 174V that likewise implements the entry or non-entry indication value of signal 174. Video entry indication imaging 174V, supplied on one or more displays nearby or/and remote, visually indicates the meaning of each value of signal 174 in some way, e.g., by one or more visible words, characters, or/and graphical designs that suitably differ depending on the signal's value. If signal 172 includes the principal object-path data, imaging 174V presents (i) a still image showing the space occupied by object 104 as object 104 was about to enter or/and pass by zone 108, was passing through or/and by it, or had just exited or/and passed by it or/and (ii) a video clip simulating how object 104 occupied that space. See FIG. 15a below for a BB/SB example of this imagery.

Entry memory 192 stores the information in the entry/passage determinations, including object-path data, of entry-determination signal 172. Memory 192 may also store, and thus be programmed with, the size and shape characteristics of object 104. If so, the size and shape information on object 104 is immediately available to analyzer 162 for determining whether any moving article within the analyzer's purview is object 104.

Responsive to instruction 194, memory 192 provides indication signal 174 as entry indication information 174M of selected entry/passage determinations of signal 172. Often human originated but providable from another part of system 102, instruction 194 can be supplied to memory 192 in various ways. Instruction 194 can be supplied via a human-to-memory interface having instruction-input elements such as keys, mice, mousepads, switches, sliders, and buttons. The interface can be connected wirelessly or via wires to memory 192.

A human can manually touch a touch-sensitive area of memory 192 with an instructing article to provide it with instruction 194. The instructing article can be a finger or other part of the human or an electronic instructing article. A human can generate instruction 194 using a radiation-emitting element to direct radiation such as visible-light or IR radiation onto a radiation-sensitive area of memory 192.

Instruction 194 can be provided to memory 192 by human voice. Memory 192 can be coded to respond (i) only to the voice of a selected human or any human in a selected group of humans and thus not interpret any other such voice or sound as instruction 194 or/and (ii) only to selected words and therefore not interpret any other word(s) as instruction 194. Memory 192 can receive instruction 194 via human voice provided to a remote device in communication with memory 192 wirelessly or via wires.

Memory 192 also responds to instruction 194 by supplying a video entry input signal 196V containing selected entry/passage information stored in memory 192. Video generator 190 responds to entry input signal 196V by providing video entry indication imaging 174V of the selected entry/passage information. Memory 192 optionally responds to instruction 194 by supplying an audio entry input signal 196A containing selected entry/passage information stored in memory 192. Audio generator 188 responds to entry input signal 196A by providing audible entry indication sound 174A of the selected entry/passage information. If audio entry input signal 196A is generated, input signals 196A and 196V are generated in synchronism for the same entry/passage information so as to present synchronized sound and imaging.

Indicator 164 may include an entry motion generator (not shown) that responds to entry-determination signal 172 by additionally furnishing indication signal 174 as an entry indication motion signal consisting of certain physical motion, such as physical vibration, that implements the entry/passage information of signal 174. A person senses the motion, e.g., by contacting the motion generator, and can then audibly voice the meaning of the entry indication motion signal.

Except for entry indication information 174M, indication signal 174 is provided in its various forms quickly after object 104 reaches the immediate vicinity of spatial zone 108. Returning briefly to FIG. 4, the portion of front zone-meeting plane 140 suitably close to the volumetric center of zone 108 constitutes its immediate vicinity at least in connection with signal 174. For BB/SB, plane 140 passes through front boundary 64F of strike zone 56.

Object 104 reaches front plane 140, and thus the immediate vicinity of zone 108, at a vicinity-reaching time $t_{vr}$. Except for entry indication information 174M, indication signal 174 is usually provided in its various forms at an entry-signal time delay $\Delta t_d$ of no more than 1 s after vicinity-reaching time $t_{vr}$. Entry-signal delay $\Delta t_d$ is typically considerably less than 1 s, e.g., no more 0.6 s, no more 0.4 s, no more 0.2 s, or no more 0.1 s. Delay $\Delta t_d$ can, however, be greater than 1 s, e.g., at least 1.5 s, at least 2 s, at least 2.5 s, at least 3 s, or at least 3.5 s but is rarely greater than 4 s.

Collector 176 of determiner 160 may collect incoming image data of material other than that of control body 110. The other-material image data is included in incoming body-image data 166 gathered by collector 176 and, in electronic form, is included in outgoing body-image data 180 provided to processor 178 of determiner 160. Processor 178 suitably processes the electronic form of the other-material image data. Processor 178 may also process data received from other sources such as memory 192.

Collector 182 of analyzer 162 may similarly collect incoming image data of material other than articles moving toward zone 108 while control body 110 is near zone 108. This other-material image data is included in incoming zone-vicinity article-location data 170 gathered by collector 182 and, in electronic form, is included in outgoing article-location data 186 provided to processor 184 in analyzer 162. Processor 184 suitably processes the electronic form of the other-material image data. Processor 184 may also process data received from other sources again such as memory 192.

Collection and Processing

Figure 6:
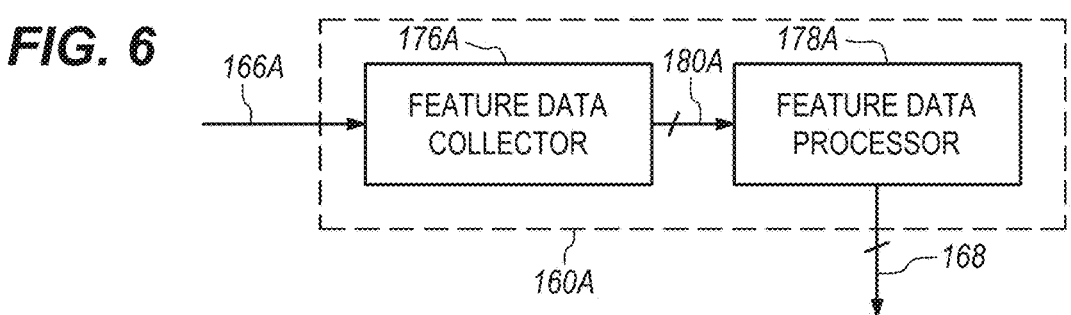
FIGS. 6 and 7 are block diagrams of two respective implementations of the boundary determiner in the movement-exam system of FIG. 5.

FIG. 6 illustrates a feature-data implementation 160A of boundary determiner 160 in movement-exam system 102 of FIG. 5. Feature-data boundary determiner 160A implements the boundary-determining capability with a feature-data-collection capability. Body-image collector 176 and body-image processor 178 of FIG. 5 are respectively implemented in determiner 160A with a feature data collector 176A and a feature data processor 178A.

Feature data collector 176A collects incoming feature data 166A that implements incoming body-image data 166 except that incoming feature data 166A may be more limited than body-image data 166. In particular, data 166A includes data of imagery of each body feature 150 within the collector's and determiner's purview while zone-control body 110 is near spatial zone 108 preferably at least as principal object 104 is moving toward zone 108. Since there can be as little as one feature 150, collector 176A specifically collects data 166A of imagery of at least one feature 150. Data 166A may not include data of imagery of portions of body 110 not relevant to the locations of feature 150.

Collector 176A typically collects data 166A by generating imagery of at least the portion of body 110 having body features 150. This imagery may be solely in electronic form and therefore not human visible. Collector 176A provides data 166A in electronic form as outgoing feature data 180A that implements outgoing body-image data 180 except that outgoing feature data 180A may likewise not include data of imagery of portions of body 110 not relevant to the locations of features 150.

Feature data processor 178A processes outgoing feature data 180A to determine the temporary locations of lower/upper zonal boundaries 120 and 122 while body 110 is near zone 108 preferably at least as object 104 is moving toward zone 108. The processing entails determining how far body features 150 are respectively situated vertically above reference situs 152. Except for the situation in which features 150 consist of two physical features respectively vertically situated the same distances above situs 152 as boundaries 120 and 122, the processing further entails mathematically calculating the locations of boundaries 120 and 122 from the distances of features 150 to situs 152. As output of determiner 160A, processor 178A provides the determinations of the locations of boundaries 120 and 122 as lower/upper boundary-location data 168.

Whole-Body Simulation

Figure 7:
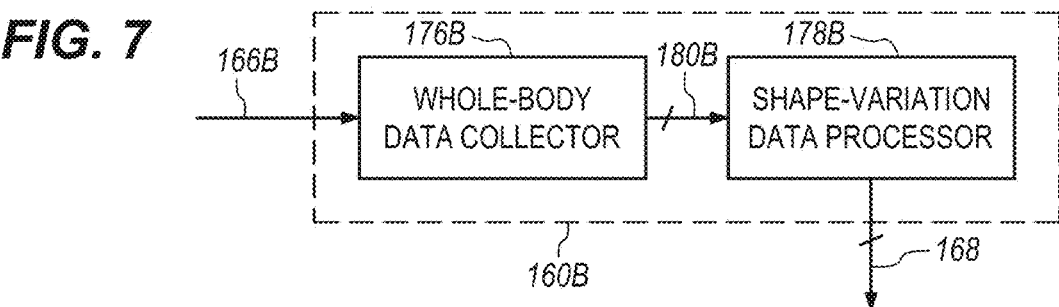

FIG. 7 illustrates a whole-body implementation 160B of boundary determiner 160 in movement-exam system 102 of FIG. 5. Whole-body boundary determiner 160B implements the boundary-determining capability with a whole-body shape-examination capability. Body-image collector 176 and body-image processor 178 of FIG. 5 are respectively implemented in determiner 160B with a whole-body data collector 176B and a shape-variation (or modeling) data processor 178B.

Whole-body data collector 176B collects incoming whole-body data 166B that implements incoming body-image data 166. Incoming whole-body data 166B includes data of imagery of substantially all zone-control body 110 within the collector's and determiner's purview while body 110 is near spatial zone 108 preferably at least as principal object 104 is moving toward zone 108. Substantially all body 110 here means substantially the full 3D extent of body 110 except where body 110 contacts regional surface 112. Data 166B thus includes data of imagery of each designated physical body feature 150. Collector 176B provides data 166B in electronic form as outgoing whole-body data 180B that implements outgoing body-image data 180.

Shape-variation data processor 178B processes outgoing whole-body data 180B to determine the temporary locations of lower/upper zonal boundaries 120 and 122 preferably as object 104 is moving toward zone 108. More particularly, processor 178B employs a variable-shape spatial-zone simulation (or model) of zone 108, a reference-situs simulation of reference situs 152, and a variable-shape body simulation of control body 110. The spatial-zone simulation has first and second simulated spatial boundaries that respectively simulate (or model) parallel spaced-apart first and second boundaries 120 and 122 of zone 108, usually its respective lower and upper zonal boundaries 120 and 122. The body simulation has (a) a simulated feature for each body feature 150 and (b), referring to FIG. 8, a plurality of potential body shapes 198 for body 110.

Figure 8:
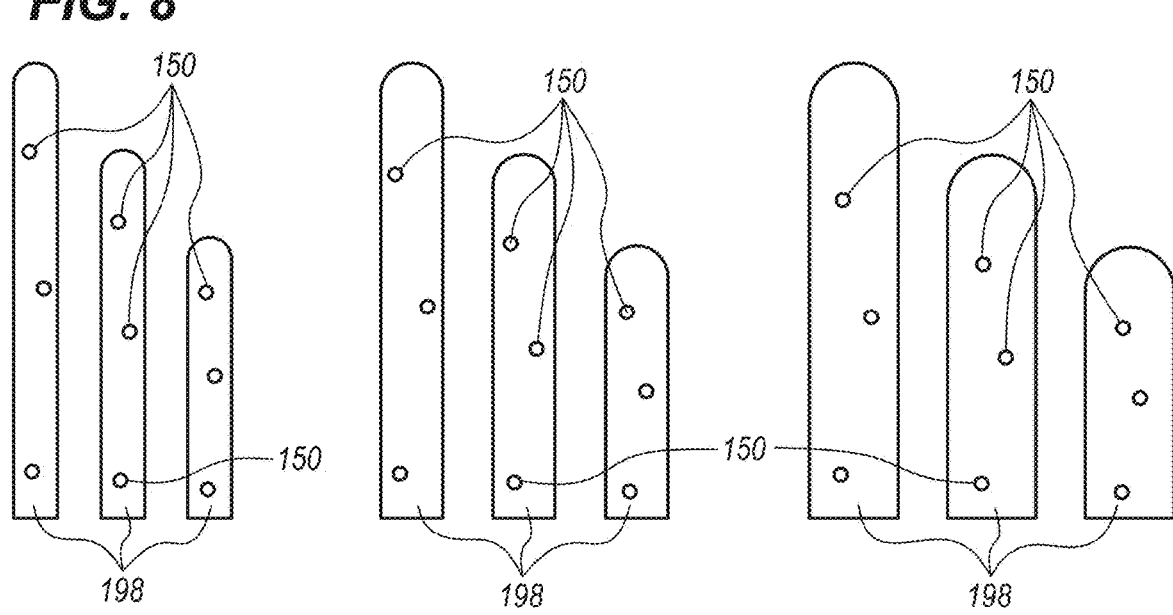
FIG. 8 is a schematic view of potential body shapes of a body simulation used in the boundary determiner of FIG. 7.

FIG. 8 illustrates multiple examples of potential body shapes 198, nine examples here. Shapes 198 may exist solely in electronic form. If so, FIG. 8 depicts examples of how shapes 198 would appear if they were converted to human-visible form.

Zone-control body 110 can change shape in all three dimensions. FIG. 8 only illustrates shape changes in the vertical and horizontal directions in the plane of the figure. However, body 110 can also change shape in the horizontal direction perpendicular to the plane of FIG. 8. If body 110 is implemented with one physical body, the nine potential-shape examples in FIG. 8 represent nine typical shapes of that body implementation. If body 110 is implemented with each of multiple, e.g., three, different physical bodies over different periods of time, the first three potential-shape examples in FIG. 8 can represent three typical shapes of the first body implementation, the second three potential-shape examples in FIG. 8 can represent three typical shapes of the second body implementation, and the last three potential-shape examples in FIG. 8 can represent three typical shapes of the third body implementation.

The specific shapes of potential body shapes 198 typically change progressively. Should only a comparatively small number of shapes 198 be initially created, additional shapes 198 can often be created by interpolating between pairs of shapes 198 most similar to each other. Extrapolations of most extreme shapes 198 can also sometimes be performed to create even more extreme shapes 198.

The simulated feature for each body feature 150 for each potential body shape 198 is simulated at a specified (known) distance from the reference-situs simulation in the boundary-determination direction. When the first and second simulated spatial boundaries respectively simulate lower and upper zonal boundaries 120 and 122, the simulated feature for each feature 150 for each shape 198 is simulated at a specified vertical distance from the reference-situs simulation. Collector 176B collects incoming whole-body data 166B of imagery of substantially all control body 110 within the collector's and determiner's purview while body 110 is near zone 108 preferably at least as object 104 is moving toward zone 108, and provides that whole-body imagery to processor 178B in the form of outgoing whole-body data 180B.

Processor 178B processes outgoing whole-body data 180B by a shape-examination procedure that entails (i) comparing the imagery of body 110 in data 180B to potential body shapes 198 in order to determine a particular one of shapes 198 as largely most closely matching the imagery of body 110 in shape and (ii) determining the locations of first/second zonal boundaries 120 and 122, usually lower/upper boundaries 120 and 122, as a function of the specified distance of each simulated feature of that particular closest shape 198 from the reference-situs simulation preferably as object 104 is moving toward zone 108. Certain of shapes 198 so shape-wise distant from body 110 as to be incapable of being particular closest shape 198 may be preliminarily eliminated from the comparison operation. Processor 178B then performs the comparison operation with remaining shapes 198.

Processor 178B can compare the physical form of the imagery of body 110 to the physical forms of potential body shapes 198. However, processor 178B usually compares the electronic form of the imagery of body 110 to the electronic forms of shapes 198.

Enhanced Movement-Examination System

Figures 9A, 9B:
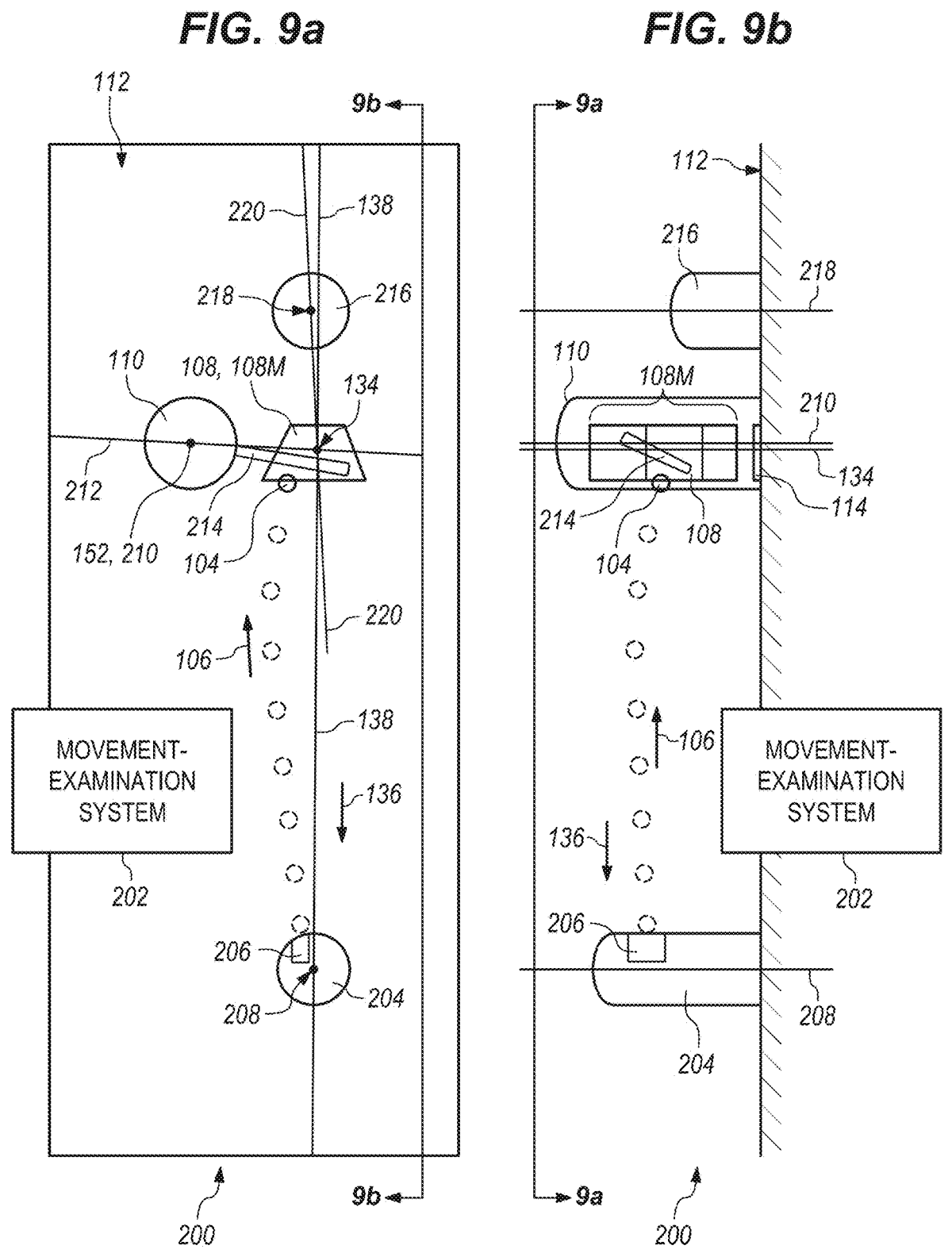

FIGS. 9a and 9b (collectively "FIG. 9") illustrate a version 200 of object-movement region 100 suitable for an enhanced version 202 of movement-exam system 102 configured according to the invention for providing examination capabilities in addition to the boundary-determination, principal-entry, and entry-indication capabilities of system 102. The additional capabilities provided by movement-exam system 202 include a tracking capability for tracking principal object 104 as it moves from the object-movement origin toward and possibly beyond spatial zone 108, an other-entry capability for variously determining whether at least part of another article entered zone 108 or/and adjoining space over or under or/and to the front or rear of zone 108 as object 104 was about to enter or/and pass by zone 108, was passing through or/and by it, or had just exited or/and passed by it and whether the other article contacted object 104, and a results-indication capability that expands on the entry-indication capability of system 102.

Item 204 in FIG. 9 is the movement-originating body having object-movement origin 206. The front of spatial zone 108 means the side closest to movement-originating body 204. Hence, body 204 is situated in front of zone 108. Zone-control body 110 is situated to one lateral side of zone 108. Body 110 may move somewhat during each instance of object 104 leaving object-movement origin 206 and may change its location somewhat from instance to instance of object 104 leaving origin 206.

Movement-originating body 204 may move, and thereby change location, somewhat during each instance of object 104 leaving object-movement origin 206 and from instance to instance of object 104 leaving origin 206. Accordingly, origin 206 itself may move and change location somewhat during and between such instances. Also, origin 206 may change its location relative to body 204 during and between such instances. In BB/SB, body 204 and origin 206 respectively are pitcher P and the pitcher's pitching hand, both of which undergo such movement and location change during pitching.

Item 208 in FIG. 9 is a vertical origin reference line characterizing the location of movement origin 206. Origin reference line 208 is close to origin 206 and may, at least sometimes, pass through it depending on changes in the locations of originating body 204 and origin 206 from instance to instance of object 104 leaving origin 206. In general, line 208 is located close to an average of the locations of vertical lines passing through origin 206 for a substantial number of instances of object 104 leaving origin 206. Line 208 is usually fixed but may laterally change location between consecutive instances of object 104 leaving origin 206 if body 204 undergoes large movement between such consecutive instances. In BB/SB, line 208 passes approximately through the center of pitcher's mound 28 so that right-handed and left-handed pitchers are treated the same.

Vertical zone-to-origin plane 138 passes through origin reference line 208 and zonal reference line 134. Consequently, the centers of pitcher's mound 28 and strike zone 56 in BB/SB pass approximately through plane 138.

Zone-control body 110 is situated to one lateral side of zone 108. Body 110 may move somewhat during each instance of object 104 leaving movement origin 206 and may change its location somewhat from instance to instance of object 104 leaving origin 206.

Item 210 in FIG. 9 is a vertical control reference line characterizing the location of control body 110. Control reference line 210, which extends through body reference situs 152, is close to body 110 and may, at least sometimes, pass through it. Line 210 is generally located close to an average of the locations of vertical lines passing through body 110 for a substantial number of instances of object 104 leaving movement origin 206. Although line 210 may be fixed, line 210 may laterally change location between consecutive instances of object 104 leaving origin 206 if body 110 makes large movement between such consecutive instances or if different implementations of body 110 necessitate changes in the lateral location of line 210. Line 210 passes approximately through the center of batter's box 46L or 46R in BB/SB.

A vertical control-to-zone plane 212 extends through control reference line 210 and zonal reference line 134. In the example of FIG. 9, control-to-zone plane 212 is roughly perpendicular to zone-to-origin plane 138. Planes 138 and 212 can, however, be at a solid angle considerably different from 90°.

Item 214 in FIG. 9 is an additional object, usually inanimate, often controlled by body 110. At least part of additional object 214 may enter zone 108 and, if so, sometimes passes through it. Object 214 may pass by zone 108, including over or under it, and thus totally avoid having any part of object 214 pass through zone 108. Object 214 can move in various ways relative to principal object 104, including generally opposite to object 104.

Additional object 214 often attempts to contact, and sometimes does contact, principal object 104. Object 214 can also contact object 104 incidentally. i.e., without attempting to contact object 104. In such attempted-contact and contact situations, object 214 typically moves generally opposite to object 104 as object-to-object contact occurs. Objects 104 and 214 can, however, move in roughly the same direction so that one of them catches up to the other. In BB/SB, object 214 is bat 54 controlled by batter B.

An optional rear-side constituent 216 is situated on or above regional surface 112 to the rear of zone 108. The rear of zone 108 means the side farthest from originating body 204. Hence, zone 108 is situated laterally between rear-side constituent 216 and body 204. Constituent 216 consists of one or more rear-side bodies, each of which may be largely organic, mixed organic/inorganic, or largely inorganic.

Rear constituent 216 typically terminates the movement of object 104 if it does not terminate on surface 112 or elsewhere. During a pitch in a BB/SB game, constituent 216 is usually formed with two rear-side bodies, namely catcher C for terminating (catching) pitched ball 52 and home-plate umpire U situated largely behind catcher C. Should system 202 do away with the need for umpire U, constituent 216 is formed solely with catcher C during a pitch. In BB/SB practice not using umpire U, constituent 216 consists of catcher C or a non-human backstop for terminating movement of ball 52.

Item 218 in FIG. 9 is a vertical constituent reference line characterizing the location of rear constituent 216. Constituent 216 may move somewhat during each instance of object 104 leaving movement origin 206 and may change location somewhat from instance to instance of object 104 leaving origin 206. Constituent reference line 218 is close to constituent 216 and may, at least sometimes, pass through it. In general, line 218 is located close to an average of the locations of vertical lines passing through constituent 216 for a substantial number of instances of object 104 leaving origin 206. Line 218 may be fixed or may change location between consecutive instances of object 104 leaving origin 206. In BB/SB, line 218 passes approximately through the center of catcher's box 48.

A vertical constituent-to-zone plane 220 extends through constituent reference line 218 and zonal reference line 134. In the example of FIG. 9, constituent-to-zone plane 220 is roughly in line with zone-to-origin plane 138. However, planes 138 and 220 can be at a significant solid angle to each other.

Figure 10:
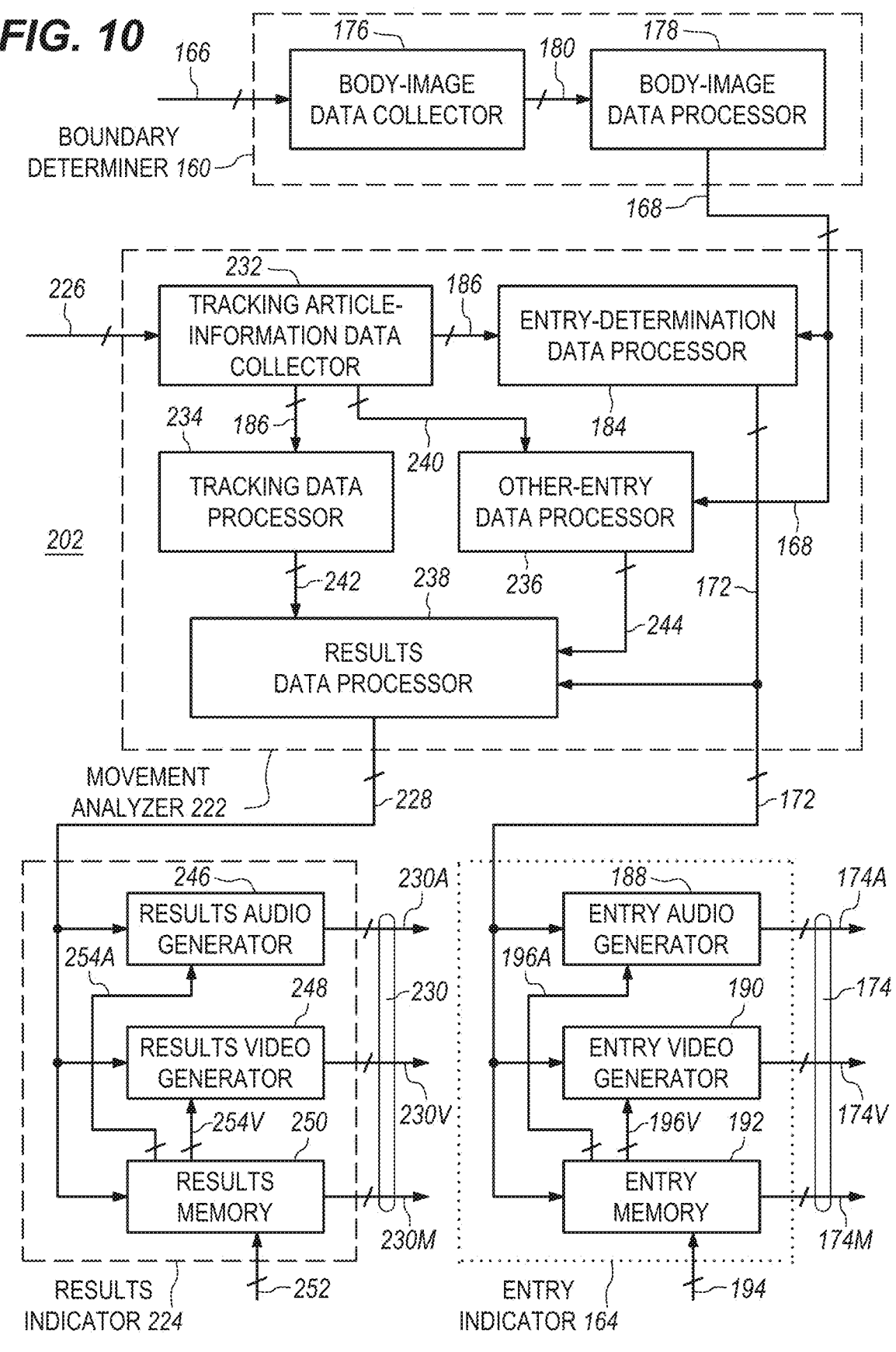
FIG. 10 is a block diagram of a general embodiment of the movement-exam system in FIGS. 9a and 9b.

FIG. 10 illustrates a general embodiment of movement-exam system 202 formed with boundary determiner 160 configured and operable as described above for processing incoming body-image data 166 to produce lower/upper boundary-location data 168, a movement analyzer 222, and a results indicator 224. System 202 optionally includes entry indicator 164 configured and operable as described above. Indicator 164 is shown in dotted line in FIG. 10 because results indicator 224 often eliminates the need for indicator 164.

Movement analyzer 222 furnishes the principal-entry, tracking, and other-entry capabilities. In the tracking capability, analyzer 222 collects incoming tracking article-location data 226 of imagery of any article within the analyzer's purview while zone-control body 110 is near spatial zone 108. If any such article is moving from movement origin 206 toward zone 108, analyzer 222 tracks the article as it moves from origin 206 toward zone 108 and, as part of the principal-entry capability, determines whether the article is highly likely to be principal object 104. If so, analyzer 222 treats the article as object 104 and responds to the determinations of the temporary locations of lower/upper zonal boundaries 120 and 122 provided in lower/upper boundary-location data 168 by electronically determining whether at least part of object 104 entered zone 108. Incoming tracking article-location data 226 then includes data of imagery of object 104.

If at least part of object 104 entered zone 108, analyzer 222 preferably determines where at least part of object 104 entered zone 108. Analyzer 222 also determines preferably whether and, if so, more preferably where at least part of object 104 passed through zone 108. Should object 104 pass by zone 108, analyzer 222 may determine where object 104 most closely approached zone 108. If system 202 contains indicator 164, analyzer 222 provides these determinations on entry or non-entry of least part of object 104 into zone 108 and passage or non-passage of at least part of object 104 through zone 108 to indicator 164 as entry-determination signal 172. These actions are further parts of the principal-entry capability.

In tracking object 104 from movement origin 206 toward zone 108, analyzer 222 employs the tracking capability to determine whether object 104 impacted solid or/and liquid matter materially affecting the movement of object 104 toward zone 108. Such solid or/and liquid matter can be regional surface 112, specifically the material forming surface 112.

Should object 104 pass through or/and by zone 108, analyzer 222 tracks object 104 as it goes beyond zone 108 farther away from movement origin 206. In so doing, analyzer 222 may determine whether rear constituent 216, if present, terminated the movement of object 104. If constituent 216 did not terminate the movement of object 104, analyzer 222 may determine whether object 104 impacted surface 112 after impacting constituent 216 or whether object 104 moved past constituent 216 without impacting it and later impacted surface 112 or another surface.

Analyzer 222 further determines, as part of the other-entry capability, whether any article within the analyzer's purview while control body 110 is near zone 108 is highly likely to be additional object 214. If so, analyzer 222 treats the article as object 214. Incoming tracking article-location data 226 then includes data of imagery of object 214.

Responsive to the determinations of the temporary locations of zonal boundaries 120 and 122 provided in lower/upper boundary-location data 168, analyzer 222 uses the other-entry capability to electronically determine, as principal object 104 was about to enter or/and pass by zone 108, was passing through or/and by it, or had just exited or/and passed by it, whether at least part of additional object 214 entered zone 108 or/and space over or under or/and to the front or rear of zone 108, whether at least part of object 214 passed through or/and over or under or/and to the front or rear of zone 108, and substantially whether object 214 contacted object 104. If object 214 contacted object 104, analyzer 222 often determines the effect of that contact. Should object 214 pass by zone 108, analyzer 222 may determine where object 214 most closely approached zone 108.

Finally, analyzer 222 appropriately combines (or integrates) the determinations provided by lower/upper boundary-location data 168 and the determinations made with the tracking and other-entry capabilities to produce an electronic results code signal 228 at one of a plurality of at least three, usually at least four and often considerably more, result code values. Indicator 224 then provides the results-indication capability. This entails having indicator 224 respond to results code signal 228 by providing a human-comprehensible results indication signal 230 at one of an identical plurality of result indication values respectively corresponding to the code values of signal 228.

The consequence of certain values of results indication signal 230 may sometimes be the same. For instance, a "swinging strike", a "missed-bunt strike", and a "called strike" in BB/SB have the same consequence, namely a "strike". In such a situation, indicator 224 may additionally or alternatively provide signal 230 at a consequence indication value of a results indication value corresponding to a code value of code signal 228. Signal 230 is typically provided in multiple forms as explained below.

Values of Results Indication Signal

The values of results indication signal 230 depend on many determinations that movement analyzer 222 makes dependent on the lower/upper zonal boundary location determinations made by boundary determiner 160. One analyzer determination is whether at least part of additional object 214 entered spatial zone 108 or/and adjoining space over or under zone 108 and exited it, i.e., zone 108, or/and exited that adjoining space at a selected exit location laterally dependent on zone 108. The zone-dependent selected exit location can be an imaginary area extending vertically through one or more of side boundaries $124_1$-$124_4$ of zone 108, e.g., front zonal boundary $124_1$ if at least part of object 214 entered zone 108 or/and that adjoining space moving generally opposite to object 104 and therefore from space to the rear of zone 108 or/and adjoining space over or under that rear space. Another analyzer determination is whether object 214 contacted principal object 104.

For BB/SB, the zone-dependent selected exit location is usually vertical front plate-clearing area 74 formed with front boundary 64F of strike zone 56, directly lower front area 76, and directly upper front area 78 as shown in FIG. 2 and later in FIGS. 16a and 16b. The selected exit location can alternatively be a vertical plane extending through front zonal boundary 64F. In that case, bat 54 can cross that plane outside area 74 without any of bat 54 crossing area 74. Contact between objects 214 and 104 is implemented with bat 54 contacting ball 52 to produce bat-to-ball contact.

Analyzer 222 determines spatial relationships between various physical elements such as zone-control body 110 and additional object 214. In particular, analyzer 222 determines if at least part of object 214 passed a specified location on body 110 in a specified direction, especially if at least part of object 214 entered zone 108 or/and adjoining space over or under or/and in front of or in rear of zone 108 moving generally opposite to object 104. The specified direction is usually zone-to-origin direction 136 from zone 108 through zone-to-origin plane 138 to originating body 204. Direction 136 is typically perpendicular to front zonal boundary $124_1$ and, as a lateral direction, is approximately parallel to regional surface 112.

As applied to BB/SB for which control body 110 is batter B and for which originating body 204 is pitcher P, the specified location on body 110 is a specified location on batter B. The specified direction is zone-to-origin direction 136, termed the zone-to-pitcher direction, from strike zone 56 perpendicular to front boundary 64F of zone 56 to pitcher P. More specifically, zone-to-pitcher direction 136 is the lateral direction from the center of zone 56 perpendicular to boundary 64F to a vertical line extending through the center of pitcher's mound 28.

Full word descriptions of the values of results indication signal 230 are sometimes lengthy when converted to audio or/and video. Accordingly, each result indication value is often accompanied by a brief description, termed a capsule, of that value.

Here are descriptions of entry and non-entry indication values of indication signal 230, accompanied by BB/SB examples within the purview of analyzer 222, in which variously at least part, or none, of principal object 104 entered or was about to enter spatial zone 108 and in which variously (i) at least part, or none, of additional object 214 entered zone 108 or/and adjoining space over or under zone 108 and exited it or/and that adjoining space at the selected exit location laterally dependent on zone 108, (ii) object 214 contacted, or did not contact, object 104, (iii) object 214 attempted, or did not attempt, to contact object 104, and (iv) at least part, or none, of object 214 passed the specified location on body 110 in the specified direction:

A. a first entry result indication value if at least part of object 104 passed through zone 108 as at least part of object 214 entered zone 108 or/and adjoining space over or under zone 108 and exited it or/and that adjoining space at the selected exit location without object 214 contacting object 104, e.g., a "swinging strike" capsule for ball 52 at least partly in strike zone 56 and swung at without bat-to-ball contact;

B. a first non-entry result indication value if object 104 passed by zone 108 as at least part of object 214 entered zone 108 or/and adjoining space over or under zone 108 and exited it or/and that adjoining space at the selected exit location without object 214 contacting object 104, e.g., a "swinging strike" capsule for ball 52 outside strike zone 56 and swung at without bat-to-ball contact;

C. a second entry result indication value if object 214 attempted to contact object 104 without actually contacting it as at least part of object 104 passed through zone 108, e.g., a "missed-bunt strike" capsule for ball 52 at least partly in strike zone 56 and bunted at without bat-to-ball contact;

D. a second non-entry result indication value if object 214 attempted to contact object 104 without actually contacting it as object 104 passed by zone 108 e.g., a "missed-bunt strike" capsule for ball 52 outside strike zone 56 and bunted at without bat-to-ball contact;

E. a third entry result indication value if object 214 contacted object 104 causing it to travel away from zone 108 as at least part of object 104 was about to enter zone 108, was passing partway through it, or had just exited it, e.g., a "hit-ball strike" capsule for a fair or foul ball on ball 52 at least partly in, or about to enter, strike zone 56 and contacted by bat 54 causing ball 52 to travel away from zone 56;

F. a third non-entry result indication value if object 214 contacted object 14 causing it to travel away from zone 108 as object 104 was about to pass by zone 108, was passing partway by it, or had just passed by it, e.g., a "hit-ball strike" capsule for a fair or foul ball on ball 52 outside, or about to be outside, strike zone 56 and contacted by bat 54 causing ball 52 to travel away from zone 56;

G. a fourth entry result indication value if at least part of object 104 passed through zone 108 without object 214 contacting or attempting to contact object 104, without any part of object 214 simultaneously entering zone 108 or/and adjoining space over or under zone 108 and exiting it or/and that adjoining space at the selected exit location, and without object 104 previously impacting solid or/and liquid matter materially affecting movement of object 104 toward zone 108, e.g., a "called strike" capsule for ball 52 at least partly in strike zone 56, not contacted by bat 54, not swung or bunted at, and not previously hitting infield 22;

H. a fourth non-entry result indication value if object 104 passed by zone 108 without object 214 contacting or attempting to contact object 104, without any part of object 214 simultaneously entering zone 108 or/and adjoining space over or under zone 108 and exiting it or/and that adjoining space at the selected exit location, and without object 104 previously impacting solid or/and liquid matter materially affecting movement of object 104 toward zone 108, e.g., a basic "ball" capsule for ball 52 outside strike zone 56, not contacted by bat 54, not swung or bunted at, and not previously hitting infield 22;

I. a fifth entry result indication value if object 104 impacted solid or/and liquid matter materially affecting movement of object 104 toward zone 108 and at least part of object 104 subsequently passed through zone 108 without object 214 contacting or attempting to contact object 104 and without any part of object 214 simultaneously entering zone 108 or/and adjoining space over or under zone 108 and exiting it or/and that adjoining space at the selected exit location, e.g., a "hit-infield ball" capsule for ball 52 hitting infield 22, subsequently at least partly in strike zone 56, and not swung or bunted at;

J. a fifth non-entry result indication value if object 104 impacted solid or/and liquid matter materially affecting movement of object 104 toward zone 108 and object 104 subsequently passed by zone 108 without object 214 contacting or attempting to contact object 104 and without any part of object 214 simultaneously entering zone 108 or/and adjoining space over or under zone 108 and exiting it or/and that adjoining space at the selected exit location, e.g., a "hit-infield ball" capsule for ball 52 hitting infield 22, subsequently passing outside strike zone 56, and not swung or bunted at;

K. a sixth entry result indication value if at least part of object 104 passed through zone 108 as at least part of object 214 passed the specified body location in the specified direction without contacting object 104, e.g., a "swinging strike" capsule for ball 52 at least partly in strike zone 56 and swung at without bat-to-ball contact;

L. a sixth non-entry result indication value if object 104 passed by zone 108 as at least part of object 214 passed the specified body location in the specified direction without contacting object 104, e.g., a "swinging strike" capsule for ball 52 outside strike zone 56 and swung at without bat-to-ball contact;

M. a seventh entry result indication value if at least part of object 104 passed through zone 108 without object 214 contacting or attempting to contact object 104, without any part of object 214 simultaneously passing the specified body location in the specified direction, and without object 104 previously impacting solid or/and liquid matter materially affecting movement of object 104 toward zone 108, e.g., a "called strike" capsule for ball 52 at least partly in strike zone 56, not swung or bunted at, and not previously hitting infield 22;

N. a seventh non-entry result indication value if object 104 passed by zone 108 without object 214 contacting or attempting to contact object 104, without any part of object 214 simultaneously passing the specified body location in the specified direction, and without object 104 previously impacting solid or/and liquid matter materially affecting movement of object 104 toward zone 108, e.g., a basic "ball" capsule for ball 52 outside strike zone 56, not swung or bunted at, and not previously hitting infield 22;

O. an eighth entry result indication value if object 104 impacted solid or/and liquid matter materially affecting movement of object 104 toward zone 108 and at least part of object 104 subsequently passed through zone 108 without object 214 contacting or attempting to contact object 104 and without any part of object 214 simultaneously passing the specified body location in the specified direction, e.g., a "hit-infield ball" capsule for ball 52 hitting infield 22, subsequently passing at least partly through strike zone 56, and not swung or bunted at; and P. an eighth non-entry result indication value if object 104 impacted solid or/and liquid matter materially affecting movement of object 104 toward zone 108 and object 104 subsequently passed by zone 108 without object 214 contacting or attempting to contact object 104 and without any part of object 214 simultaneously passing the specified body location in the specified direction, e.g., a "hit-infield ball" capsule for ball 52 hitting infield 22, subsequently passing outside strike zone 56, and not swung or bunted at.

Certain of the values or capsules of indication signal 230 may have the same consequence. For example, the BB/SB consequences of the "swinging strike" of values A, B, K, and L, the "missed-bunt strike" of values C and D, the "hit-ball strike" of values E and F, and the "called strike" of values G and M are the same, a "strike". The BB/SB consequences of the basic "ball" of values H and N and the "hit-infield ball" of values I, J, O, and P are the same, a "ball".

There is sometimes a virtually continuous transition from one value of indication signal 230 to another value. For instance, if batter B slaps bat 54 at pitched ball 52 in BB/SB, especially softball, without bat-to-ball contact, the slap is often deemed a "swinging strike" but can be deemed a "missed-bunt strike" if bat 54 moved a comparatively small distance during the slap. In such situations, analyzer 222 presents the result indication value most closely approximating the action. This is acceptable, especially when both result indication values have the same consequence.

Some of the values of indication signal 230 may have consequences not overtly presented except possibly in statistics. For example, the "strike" consequences of the "hit-ball strikes" of values E and F for fair balls in BB/SB are typically not overtly presented to observers and, if recorded, are often recorded only in statistics.

The selected exit location in the following BB/SB applications of result indication values A, B, and G-J is front plate-clearing area 74. Values A. B, and G-J then employ the plate-clearing "swinging strike" definition in which a "swinging strike" arises when at least part of bat 54, usually at least the barrel, crossed area 74 in zone-to-pitcher direction 136.

Result indication values A and B together cover situations in which principal object 104 passed through or/and by zone 108 as at least part of additional object 214 entered zone 108 or/and adjoining space over or under zone 108 and exited it or/and that adjoining space at the selected exit location without object 214 contacting object 104. In the situation where front zone-meeting plane 140 passes through front zonal boundary $124_1$, the selected exit location typically consists of boundary $124_1$, a lower front area extending fully from the lower front edge of boundary $124_1$ down to upper front edge $118_1$ of fixture 114, and an upper area extending fully from the upper front edge of boundary $124_1$ upward.

Values A and B, as applied to BB/SB, are directed to "swinging strike" situations in which batter B swung bat 54 at ball 52 such that at least part of bat 54 crossed front plate-clearing area 74 in zone-to-pitcher direction 136 without bat-to-ball contact as ball 52 passed through or/and by strike zone 56. If a "swinging strike" requires that a specific segment of bat 54, e.g., the barrel, cross area 74 in direction 136, values A and B are modified to meet this requirement. Analyzer 222 thus determines whether a "swinging strike" occurred for the condition that at least part of bat 54, or at least the specific bat segment, crossed area 74 in direction 136.

Result indication values C and D together cover situations in which additional object 214 attempted to contact principal object 104 without actually contacting it as object 104 passed through or/and by zone 108.

A "missed-bunt strike" occurs in BB/SB when batter B bunted bat 54 at ball 52 without bat-to-ball contact as ball 52 passed through or/and by strike zone 56. In bunting, it's immaterial whether any part of bat 54 crossed, or did not cross, front plate-clearing area 74 in zone-to-pitcher direction 136. It's also immaterial whether any part of bat 54 passed any location on batter B in direction 136. Hence, analyzer 222 determines whether a "missed-bunt strike" occurred via values C and D.

Result indication values E and F together cover situations in which additional object 214 contacted principal object 104 causing it to travel away from zone 108 as object 104 was about to enter or/and pass by zone 108, was passing partway through or/and by it, or had just passed through or/and by it. If object 104 was about to enter or/and pass by zone 108, analyzer 222 is generally unable to determine whether object 104 was about to enter zone 108 or to pass by it. In that event, analyzer 222 replaces values E and F with a composite result indication value EF that object 214 contacted object 104 causing it to travel away from zone 108 as object 104 was about to enter or/and pass by zone 108.

A "hit-ball strike" for a fair or foul ball in BB/SB occurs when bat-to-ball contact occurred causing ball 52 to travel away from strike zone 56 as ball 52 was about to enter or/and pass by zone 56, was passing partway through or/and by it, or had just passed through or/and by it. The bat-to-ball contact can arise from batter B swinging or bunting bat 54 at ball 52 or from bat 54 otherwise contacting ball 52, e.g., accidentally. In any event, analyzer 222 determines whether a "hit-ball strike" occurred via values E and F including value EF.

Using the tracking capability, analyzer 222 also determines whether rear constituent 216 terminated the movement of principal object 104 or whether it impacted regional surface 112 after reaching constituent 216. Each indication value E or F is then divided into (i) a result indication value in which constituent 216 immediately terminated the movement of object 104 after it was contacted by additional object 214 and (ii) a result indication value in which constituent 216 did not immediately terminate the movement of object 104 after it was contacted by object 214. In particular, value E is divided into:

E1. an entry result indication value if object 214 contacted object 104 as at least part of object 104 was about to enter zone 108, was passing partway through it, or had just exited it such that at least part of object 104 subsequently completed passage through zone 108 and constituent 216 immediately terminated the movement of object 104, e.g., a "foul-tip strike" capsule for ball 52 at least partly in, or about to enter, strike zone 56, swung or bunted at with slight bat-to-ball contact, and immediately caught by catcher C; and E2. an entry result indication value if object 214 contacted object 104 causing it to travel away from zone 108 as at least part of object 104 was about to enter zone 108, was passing partway through it, or had just exited it without constituent 216 immediately terminating the movement of object 104, e.g., a "fair/foul hit-ball strike" capsule for a fair ball or a foul ball other than a foul tip on ball 52 at least partly in, or about to enter, strike zone 56 and swung or bunted at with bat-to-ball contact causing ball 52 to travel away from zone 56 without immediately being caught by catcher C.

Indication value F is similarly divided into:

F1. a non-entry result indication value if object 214 contacted object 104 as it was about to pass by zone 108 or/and was passing partway by it or/and had just passed by it such that object 104 subsequently completed passage by zone 108 and constituent 216 immediately terminated the movement of object 104, e.g., a "foul-tip strike" capsule for ball 52 outside, or about to be outside, strike zone 56, swung or bunted at with slight bat-to-ball contact, and immediately caught by catcher C; and F2. a non-entry result indication value if object 214 contacted object 104 causing it to travel away from zone 108 as object 104 was about to pass by zone 108, was passing partway by it, or had just passed by it without constituent 216 immediately terminating the movement of object 104, e.g., a "fair/foul hit-ball strike" capsule for a fair ball or a foul ball other than a foul tip on ball 52 outside, or about to be outside, strike zone 56 and swung or bunted at with bat-to-ball contact causing ball 52 to travel away from zone 56 without immediately being caught by catcher C.

Result indication values E1 and F1 together cover situations in which additional object 214 contacted principal object 104 as it was about to enter or/and pass by zone 108, was passing partway through or/and by it, or had just passed through or/and by it and rear constituent 216 immediately terminated the movement of object 104. If object 104 was about to enter or/and pass by zone 108, analyzer 222 is once again generally unable to determine whether object 104 was about to enter zone 108 or to pass by it. Analyzer 222 then replaces values E and F with a composite result indication value E1F1 that object 214 contacted object 104 as it was about to enter or/and pass by zone 108 and constituent 216 immediately terminated the movement of object 104.

A "foul-tip strike" occurs in BB/SB when batter B swung or bunted bat 54 at ball 52 with slight bat-to-ball contact as ball 52 was about to enter or/and pass by strike zone 56, was passing partway through or/and by it, or had just passed through or/and by it and was immediately caught by catcher C. Consequently, analyzer 222 determines whether a "foul-tip strike" occurred via values E1 and F1.

Result indication values E2 and F2 together cover situations in which additional object 214 contacted principal object 104 causing it to travel away from zone 108 as object 104 was about to enter or/and pass by zone 108, was passing partway through or/and by it, or had just passed through or/and by it without ear constituent 216 immediately terminating the movement of object 104. If object 104 was about to enter or/and pass by zone 108, analyzer 222 is once more generally unable to determine whether object 104 was about to enter zone 108 or to pass by it. In that event, analyzer 222 replaces values E2 and F2 with a composite result indication value E2F2 that object 214 contacted object 104 causing it to travel away from zone 108 as object 104 was about to enter or/and pass by zone 108 without constituent 216 immediately terminating the movement of object 104.

A "fair/foul hit-ball strike", i.e., a "hit-ball strike" other than a "foul-tip strike", occurs in BB//SB when batter B swung or bunted bat 54 at ball 52 with bat-to-ball contact causing ball 52 to travel away from strike zone 56 as ball 52 was about to enter or/and pass by zone 56, was passing partway through or/and by it, or had just passed through or/and by it without immediately being caught by catcher C. Accordingly, analyzer 222 determines whether a "fair/foul hit-ball strike" occurred via values E2 and F2.

Result indication value G, as applied to BB/SB, is directed to "called strike" situations in which at least part of ball 52 passed through strike zone 56 without bat-to-ball contact, without batter B simultaneously bunting bat 54 at ball 52, without any part of bat 54 simultaneously crossing front plate-clearing area 74 in zone-to-pitcher direction 136, and without ball 52 previously hitting infield 22. Result indication value H, essentially the converse of value G applied to BB/SB, is directed to basic "ball" situations in which ball 52 passed by zone 56 without bat-to-ball contact, without batter B simultaneously bunting bat 54 at ball 52, without any part of bat 54 simultaneously crossing area 74 in direction 136, and without ball 52 previously hitting infield 22.

A "called strike" and a basic "ball" may require that a specific segment (or amount) of bat 54, e.g., the barrel, not cross plate-clearing area 74 in direction 136. If so, values G and H are modified to meet this requirement. Analyzer 222 thereby determines whether a "called strike" or basic "ball" occurred for the condition in which area 74 was not crossed in direction 136 either by any of bat 54 or by the specific bat segment.

Result indication values I and J together cover situations in which principal object 104 impacted solid or/and liquid matter materially affecting movement of object 104 toward zone 108 and object 104 subsequently passed through or/and by zone 108 without additional object 214 contacting or attempting to contact object 104 and without any part of object 214 simultaneously entering zone 108 or/and adjoining space over or under zone 108 and exiting it or/and that adjoining space at the selected exit location.

Values I and J, as applied to BB/SB, are directed to "hit-infield ball" situations in which ball 52 hit infield 22 and subsequently passed through or/and by strike zone 56 without bat-to-ball contact, without batter B swinging or bunting bat 54 at ball 52, and without any part of bat 54 simultaneously crossing plate-clearing area 74 in zone-to-pitcher direction 136. If (as with indication values G and H) a "hit-infield ball" requires that a specific segment of bat 54, e.g., the barrel, not cross area 74 in direction 136, values I and J are modified to meet this requirement. Consequently, analyzer 222 determines whether a "hit-infield ball" occurred for the condition in which area 74 was not crossed in direction 136 either by any of bat 54 or by the specific bat segment.

Indication values A and B have been described for the condition in which at least part of additional object 214 entered zone 108 or/and adjoining space over or under zone 108 and exited it or/and that adjoining space at the selected exit location. That condition can be expanded to provide that at least part of object 214 entered zone 108 or/and adjoining space annularly surrounding zone 108 and exited it or/and that adjoining space at the selected exit location. The complementary condition in indication values G-J that none of object 214 entered zone 108 or/and adjoining space over or under zone 108 and exited it or/and that adjoining space at the selected exit location can likewise be expanded to provide that none of object 214 entered zone 108 or/and adjoining space annularly surrounding zone 108 and exited it or/and that adjoining space at the selected exit location. The annular space covered in the expanded versions of values A, B. and G-J has an axis extending through zone-to-origin plane 138 approximately parallel to regional surface 112.

The following BB/SB applications of result indication values K-P employ a "swinging strike" definition in which at least part of bat 54 passed the specified location on batter B in zone-to-pitcher direction 136.

Result indication values K and L together cover situations in which principal object 104 passed through or/and by zone 108 as at least part of additional object 214 passed the specified body location in the specified direction without contacting object 104. Values K and L cover situations similar to those covered by indication values A and B and can respectively supplement or replace values A and B.

A "swinging strike" occurs with values K and L when batter B swung bat 54 at ball 52 such that at least part of bat 54 passed the specified location on batter B in zone-to-pitcher direction 136 without bat-to-ball contact as ball 52 passed through or/and by strike zone 56. Should a "swinging strike" here require that a specific segment of bat 54, e.g., the barrel, pass the specified location on batter B in direction 136, values K and L are modified to meet this requirement. Analyzer 222 thus determines whether a "swinging strike" occurred for the condition in which at least part of bat 54, or at least the specific bat segment, passed the specified location on batter B in direction 136.

Result indication values M and N cover situations similar to those covered by indication values G and H and can respectively supplement or replace values G and H.

A "called strike" occurs with indication value M when at least part of ball 52 passed through strike zone 56 without bat-to-ball contact, without batter B bunting bat 54 at ball 52, without any part of bat 54 simultaneously passing the specified location on batter B in zone-to-pitcher direction 136, and without ball 52 previously hitting infield 22. A basic "ball" occurs with indication value N when ball 52 passed by zone 56 without bat-to-ball contact, without batter B bunting bat 54 at ball 52, without any part of bat 54 simultaneously passing the specified location on batter B in direction 136, and without ball 52 previously hitting infield 22.

Should a "called strike" and a basic "ball" here require that a specific segment of bat 54, e.g., the barrel, not cross the specified location on batter B in direction 136, values M and N are modified to meet this requirement. Hence, analyzer 222 determines whether a "called strike" or basic "ball" occurred for the condition in which the specified location on batter B was not passed in direction 136 either by any of bat 54 or by the specific bat segment.

Result indication values O and P together cover situations in which principal object 104 impacted solid or/and liquid matter materially affecting movement of object 104 toward zone 108 and object 104 subsequently passed through or/and by zone 108 without additional object 214 contacting or attempting to contact object 104 and without any part of object 214 simultaneously passing the specified body location in the specified direction. Values O and P cover situations similar to those covered by indication values I and J and can respectively supplement or replace values I and J.

A "hit-infield ball" occurs with values O and P when ball 52 hit infield 22 and subsequently passed through or/and by strike zone 56 without bat-to-ball contact, without batter B bunting bat 54 at ball 52, and without any part of bat 54 simultaneously passing the specified location on batter B in zone-to-pitcher direction 136. Should (as with indication values I and J) a "hit-infield ball" require that a specific segment of bat 54, e.g., the barrel, not cross the specified location on batter B in direction 136, values O and P are modified to meet this requirement. Analyzer 222 accordingly determines whether a "hit-infield ball" occurred for the condition in which the specified location on batter B was not passed in direction 136 either by any of bat 54 or by the specific bat segment.

If ball 52 hit infield 22 before passing through or/and by strike zone 56, the infield-hitting action is immaterial to indication values A, B, K, and L because batter B swung at ball 52, to indication values C and D because batter B bunted at ball 52, and to indication values E and F because bat 54 contacted ball 52.

Analyzer 222 typically automatically determines whether an other-object spatial relationship has, or has not, arisen between control body 110 and aditional object 214 using an object-passage procedure of the other-entry capability. The object-passage procedure entails having analyzer 222 first establish an imaginary movable vertical spatial-relationship plane extending perpendicular to the specified direction through a potentially variable leading site of the specified location on body 110. The leading site of the specified body location is closer to a reference location beyond zone 108 and body 110 in the specified direction than any other site on the specified location. When the specified direction is zone-to-origin direction 136, the reference location is typically movement origin 206. Should the specified body location move in the specified direction or the direction opposite the specified direction, the spatial-relationship plane moves correspondingly in the specified direction or the direction opposite the specified direction so as to continue extending through the leading site of the specified location.

The object-passage procedure then entails having analyzer 222 determine whether at least part of additional object 214 passed the spatial-relationship plane in the specified direction. In this regard, analyzer 222 collects incoming tracking article-location data 226 of imagery of at least object 214 and examines data 226 to determine whether at least part of object 214 passed the spatial-relationship plane in the specified direction. If the spatial relationship is directed to a certain segment of object 214, analyzer 222 determines whether that segment of object 214 reached or passed the spatial-relationship plane in the specified direction. An example of the object-passage procedure for BB/SB is described below in connection with FIGS. 18*a* and 18*b*. The object for the procedure can differ from object 214.

The other-entry capability is here tailored to BB/SB. However, the other-entry capability can be modified to accommodate other usages.

Action outside the purview of analyzer 222 may occasionally affect the consequence of a value of indication signal 230. If so, a human generally appropriately revises the consequence.

Components of Enhanced Movement-Examination System

Returning to FIG. 10, movement analyzer 222 in movement-exam system 202 consists of a tracking article-information (again, "article-info") data collector 232, entry-determination data processor 184 configured and operable as described above, a tracking data processor 234, an other-entry data processor 236, and a results data processor 238. Data collectors 176 and 232 are usually at least partially merged for sharing data collection capability. Data processors 178, 184, 234, 236, and 238 are usually at least partially merged for sharing data processing capability.

Tracking article-info data collector 232 collects incoming tracking article-location data 226 of imagery of the space occupied by spatial zone 108 and any moving article within the collector's and analyzers purview while zone-control body 110 is near zone 108. Data 226 includes data of imagery of any article within the collector's and analyzer's purview moving from movement origin 206 toward zone 108. Collector 232 provides data 226 of the imagery as principal outgoing article-location data 186 and other outgoing article-location data 240 which may be the same or differ.

In generating principal outgoing article-location data 186, collector 232 tracks any article moving from origin 206 toward zone 108. If the article passes through or/and by zone 108, collector 232 tracks the article as it goes beyond zone 108 at least as far as rear constituent 216. If constituent 216 does not terminate the movement of the article, collector 232 continues tracking the article at least until it impacts regional surface 112 or another surface within the collector's and analyzer's purview. Data 186 includes tracking data on the article.

Collector 232 typically collects incoming tracking article-location data 226 by generating (i) imagery of any article moving from origin 206 toward zone 108 within the collector's and analyzer's purview while control body 110 is near zone 108, (ii) imagery of the space occupied by zone 108 and adjoining space within the collector's and analyzer's purview, including any article in zone 108 and that adjoining space, while body 110 is near zone 108, and (iii) imagery of any article going beyond zone 108 insofar as the article goes beyond zone 108 within the collector's and analyzer's purview. The imagery of the space occupied by zone 108 and the adjoining space usually includes an image of fixture 114. This imagery may be solely in electronic form and thus not human visible. Collector 232 generates its imagery in any of the above-described ways that zone-vicinity article-info collector 182 generates its imagery.

Analyzer 222, specifically tracking article-info collector 232 or entry-determination processor 184, is programmed with, or can otherwise immediately access, the size and shape characteristics of principal object 104 and compares the size and shape of any moving article within the analyzer's purview to the size and shape characteristics of object 104. If the comparison indicates a sufficiently close match that the article is highly likely to be object 104, analyzer 222 treats the article as object 104. Incoming tracking article-location data 226 and principal outgoing article-location data 186 then include data of imagery of object 104.

Tracking data processor 234 responds to article-location data 186 on object 104 in the following ways. Processor 234 determines whether object 104 impacted solid or/and liquid matter materially affecting the movement of object 104 toward zone 108. If object 104 went through or/and by zone 108, processor 234 may determine whether rear constituent 216, if present, terminated the movement of object 104. If constituent 216 did not terminate the movement of object 104, processor 234 may determine whether object 104 impacted surface 112 after impacting constituent 216 or whether object 104 moved past constituent 216 without impacting it and later impacted surface 112 or another surface. Processor 234 provides these tracking determinations as a tracked-data signal 242.

Analyzer 222, specifically collector 232 or other-entry data processor 236, is programmed with the size and shape characteristics of additional object 214 and compares the size and shape of any moving article within the analyzer's purview to the size and shape characteristics of object 214. If the comparison indicates a sufficiently close match that the article is highly likely to be object 214, analyzer 222 treats the article as object 214. Incoming tracking article-location data 226 and other outgoing article-location data 240 then include data of imagery of object 214.

Other-entry processor 236 responds to the determinations of the temporary locations of zonal boundaries 120 and 122 provided in lower/upper boundary-location data 168 by processing other outgoing article-location data 240 on additional object 214 to determine variously whether at least part of object 214 entered zone 108 or/and space over or under it as at least part of principal object 104 entered zone 108 or as object 104 passed by zone 108, whether at least part of object 214 passed through or/and over or under zone 108 as at least part of object 104 entered zone 108 or as object 104 passed by zone 108, and whether object 214 contacted object 104 as at least part of object 104 entered zone 108 or as object 104 passed by zone 108. If object 214 passed by zone 108, processor 236 may determine where object 214 most closely approached zone 108. Processor 236 provides these other-entry determinations as an other-entry signal 244.

In performing the object-passage procedure for determining whether at least part of additional object 214 passed the spatial-relationship plane in the specified direction, collector 232 collects incoming tracking article-location data 226 of imagery of at least object 214. Processor 236 then examines data 226, as present in other outgoing article-location data 240 provided from collector 232 to processor 236, to determine whether at least part of object 214 passed the spatial-relationship plane in the specified direction.

Processor 236 may also generate additional object-path data for (i) a still image showing the additional space occupied by at least part of additional object 214 as at least part of object 214 was about to enter or/and pass over or under or/and to the front or rear of zone 108, was passing at least partway through or/and over or under or/and to the front or rear of zone 108, or had just exited or/and passed over or under or/and to the front or rear of zone 108 or/and (ii) a video clip simulating how at least part of object 214 occupied that additional space. If so, the additional object-path data is included in other-entry signal 244.

Results data processor 238 responds to entry-determination signal 172, tracked-data signal 242, and other-entry signal 244 by combining their determinations to produce results code signal 228. If additional object 214 contacted principal object 104, processor 238 often determines the consequence of that contact, e.g., fair ball, foul ball, and foul tip for BB/SB, and includes the consequence in signal 228. If signal 172 includes the principal object-path data or/and signal 244 includes the additional object-path data, this data is also included in signal 228. In the typical case where processor 238 receives the principal and additional object-path data, processor 238 combines both object-path data and includes the combined object-path data in signal 228.

Results indicator 224 contains a results audio generator 246, a results video generator 248, and a results memory 250. Results audio generator 246 responds to code signal 228 by providing results indication signal 230 as an audible results indication sound 230A that implements the result value of signal 230. If certain of the result indication values have the same consequence, generator 246 may additionally or alternatively provide results indication sound 230A as a sound implementing the value of that consequence. Sound 230A may be provided to a person who audibly repeats sound 230A or otherwise audibly voices the meaning of sound 230A.

Results video generator 248 responds to code signal 228 by providing indication signal 230 as video results indication imaging 230V that similarly implements the result indication value, including object-path data, of signal 230. Should certain of the result indication values have the same consequence, generator 248 may additionally or alternatively provide video results indication imaging 230V as consequence indication imaging implementing that consequence. Imaging 230V is supplied on one or more displays. Imaging 230V visually indicates the meaning of each result or consequence indication value of signal 230 in some way, e.g., by one or more visible words, characters, or/and graphical designs that suitably differ depending on the signal's value.

If code signal 228 contains the principal object-path data but not the additional object-path data, results indication imaging 230V usually presents (i) a still image showing the principal space occupied by principal object 104 as object 104 was about to enter or/and pass by zone 108, was passing at least partway through or/and by it, or had just exited or/and passed by it or/and (ii) a video clip simulating how object 104 occupied that space. See later FIG. 15*a* for a BB/SB example of this imagery for object 104.

Largely the reverse occurs if signal 228 contains the additional object-path data but not the principal object-path data. Imaging 230V then usually presents (i) a still image showing the additional space occupied by at least part of additional object 214 as at least part of object 214 was about to enter or/and pass over or under or/and to the front or rear of zone 108, was passing at least partway through or/and over or under or/and to the front or rear of zone 108, or had just exited or/and passed over or under or/and to the front or rear of zone 108 or/and (ii) a video clip simulating how at least part of object 214 occupied that additional space.

In the typical case where signal 228 contains the combined object-path data for both objects 104 and 214, imaging 230V usually presents (i) a still image showing both the above-mentioned principal space occupied by principal object 104 and the above-mentioned additional space occupied by at least part of additional object 214 or/and (ii) a video clip simulating how object 104 occupied that principal space and how at least part of object 214 simultaneously occupied that additional space. See later FIG. 15*b* for a BB/SB example of this imagery for objects 104 and 214.

Results memory 250 stores the result/consequence information in the determinations, including object-path data, of code signal 228. Memory 250 may also store, and hence be programmed with, the size and shape characteristics of objects 104 and 214. If so, the size and shape information on objects 104 and 214 is immediately available to analyzer 222 for determining whether any moving article within the analyzer's purview is object 104 or 214.

Responsive to instruction 252, results memory 250 provides indication signal 230 as results indication information 230M of selected result/consequence determinations of code signal 228. Instruction 252, typically human originated but providable by another part of system 202, can be furnished to memory 250 in any of the ways described above for providing instruction 194 to entry memory 192.

Results memory 250 also responds to instruction 252 by supplying a results video input signal 254V containing selected result/consequence information stored in memory 250. Video generator 248 responds to video input signal 254V by providing results indication imaging 230V of the selected result/consequence information. Memory 250 optionally responds to instruction 252 by supplying a results audio input signal 254A containing selected result/consequence information stored in memory 250. Audio generator 246 responds to audio input signal 254A by providing results indication sound 230A of the selected result/consequence information. If audio input signal 254A is generated, input signals 254A and 254V are generated in synchronism for the same result/consequence information so as to provide synchronized sound and imaging.

Indicator 224 may include a results motion generator (not shown) responsive to code signal 228 for providing indication signal 230 in the form of a results motion signal consisting of certain physical motion, such as physical vibration, that implements the result/consequence information of signal 230. A person senses the motion, typically by contacting the motion generator, and can then audibly voice the meaning of the results motion signal.

Except for indication information 230M, indication signal 230 is provided in its various forms quickly after principal object 104 reaches the immediate vicinity of zone 108. The various forms, excepting information 230M, of signal 230 are usually supplied at the same entry-signal time delay $\Delta t_d$ after reaching the immediate vicinity of zone 108 as the various forms, except entry information indication 174M, of entry indication signal 174.

Tracking article-info data collector 232 may collect incoming data of imagery of material other than articles moving within the collector's and analyzer's purview while body 110 is near zone 108. This other-material image data is included in incoming tracking article-location data 226 gathered by collector 232 and, in electronic form, is included in principal outgoing article-location data 186 provided to processors 184 and 234 or/and other outgoing article-location data 240 provided to processor 236.

Processors 184, 234, and 236 suitably process the electronic form of the other-material image data Processors 184, 234, and 236 may also process data received from other sources again such as memory 250. Examples of how one or more of processors 184, 234, and 236 process the other-material image data and data received from other sources, particularly memory 250, are presented below in the section on the BB/SB implementation.

Using the tracking capability, analyzer 222 determines certain dynamic characteristics of the movement of principal object 104 from movement origin 206 toward zone 108. The dynamic characteristics usually include linear and (orbital) angular velocities of object 104 at selected points along trajectory 106. The selected points can be the points where trajectory 106 intersects origin 206 and front zone-meeting plane 140 and, if object 214 contacts object 104, the trajectory point immediately before the contact. The characteristics may further include rotational (spin) speed and rotational direction of object 104 at the selected points. Analyzer 222 may determine mathematical attributes of trajectory 106 as a function of linear and angular velocities along trajectory 106 at the selected points and may classify it into one of a plurality of different types of potential trajectories for object 104.

Analyzer 222 also determines certain dynamic characteristics of additional object 214 and the interaction between objects 104 and 214 if object 214 contacts principal object 104. These characteristics usually include linear and angular velocities of object 214 at selected points on the object's trajectory and, if object 214 contacts object 104, linear and angular velocities of objects 104 and 214 at selected points on their trajectories after the contact. The dynamic-characteristic information is stored in memory 250 and selectively presented visually via indication imaging 230V and audibly via sound 230A.

Video Camera Network

Figure 11:
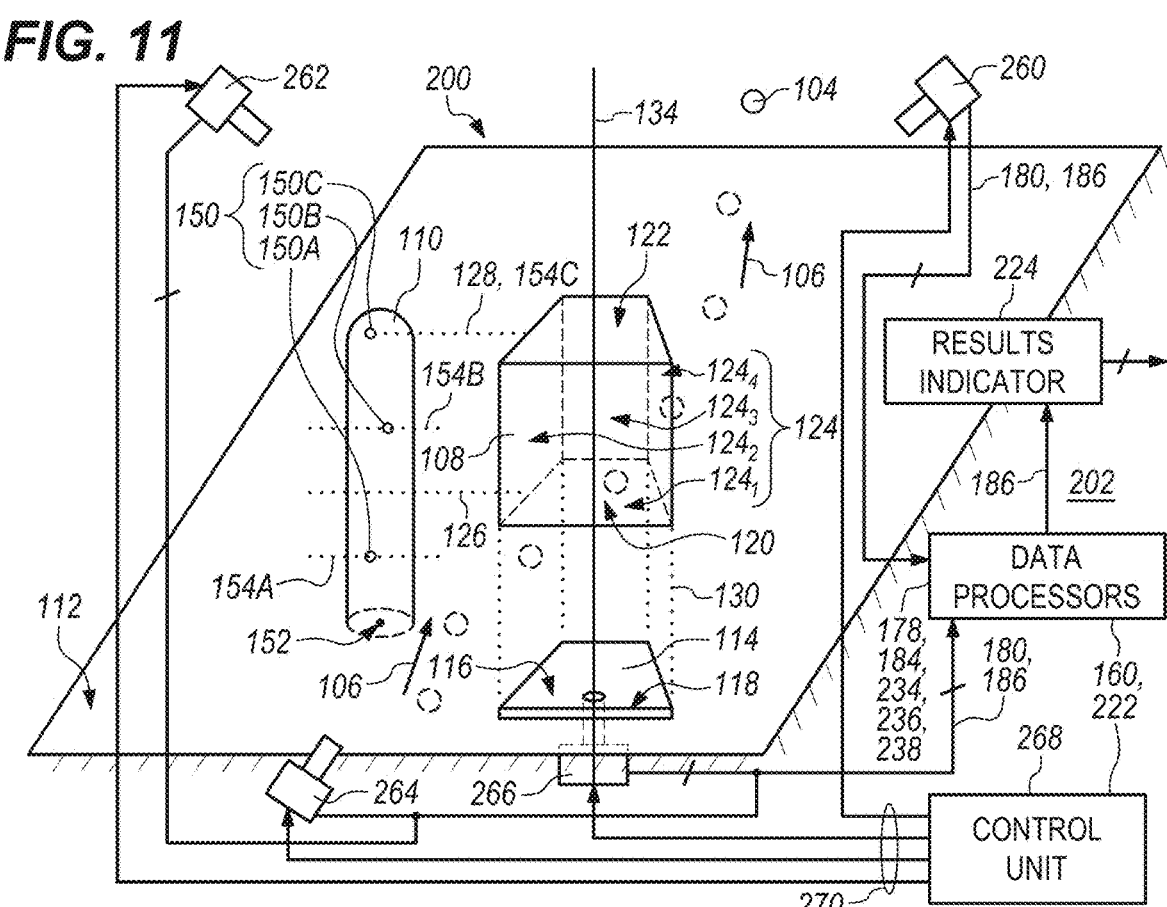
FIGS. 11 and 12 are diagrammatic, partially perspective, views of an embodiment of the object-movement region and movement-exam system of FIG. 9 for which the data collectors of the movement-exam system employ a video camera ("VC") network. The principal object and the zone-control body of the object-movement region of FIG. 11 are absent in FIG. 12 in order to facilitate understanding the VC network. Also, only the VC network of the movement-exam system appears in FIG. 12.

FIG. 11 illustrates an embodiment of object-movement region 200 and movement-exam system 202 of FIG. 10 in which body-image collector 176 and tracking article-info collector 232 together employ a video camera (again, "VC") network formed with three above-surface main VCs 260, 262, and 264, a below-surface main VC 266, and a VC control unit 268 for providing VC control signals 270 to control the operation of main VCs 260, 262, 264, and 266.

Each main VC 260, 262, 264, or 266 normally generates moving imagery in response to radiation extending across largely the entire visible wavelength range but can generate moving imagery in response to radiation extending across considerable bands of the IR, specifically the near IR, or UV wavelength range. One of VCs 260 and 262 may be deleted depending on where zone-control body 110 is located.

Data processors 178, 184, 234, 236, and 238 and VC control unit 268 are, for convenience, together additionally labeled with reference symbols 160 and 222 in FIG. 11 even though boundary determiner 160 and movement analyzer 222 also include VCs 260, 262, 264, and 266. Reference symbols 176 and 232 for the two data collectors in system 202 do not appear in FIG. 11 because VCs 260, 262, 264, and 266 and unit 268 that together form collectors 176 and 232 are scattered across FIG. 11. Reference symbol 168 for the lower/upper boundary-location data does not appear in FIG. 11 because that data is internal to processors 178, 184, and 236.

Figure 12:
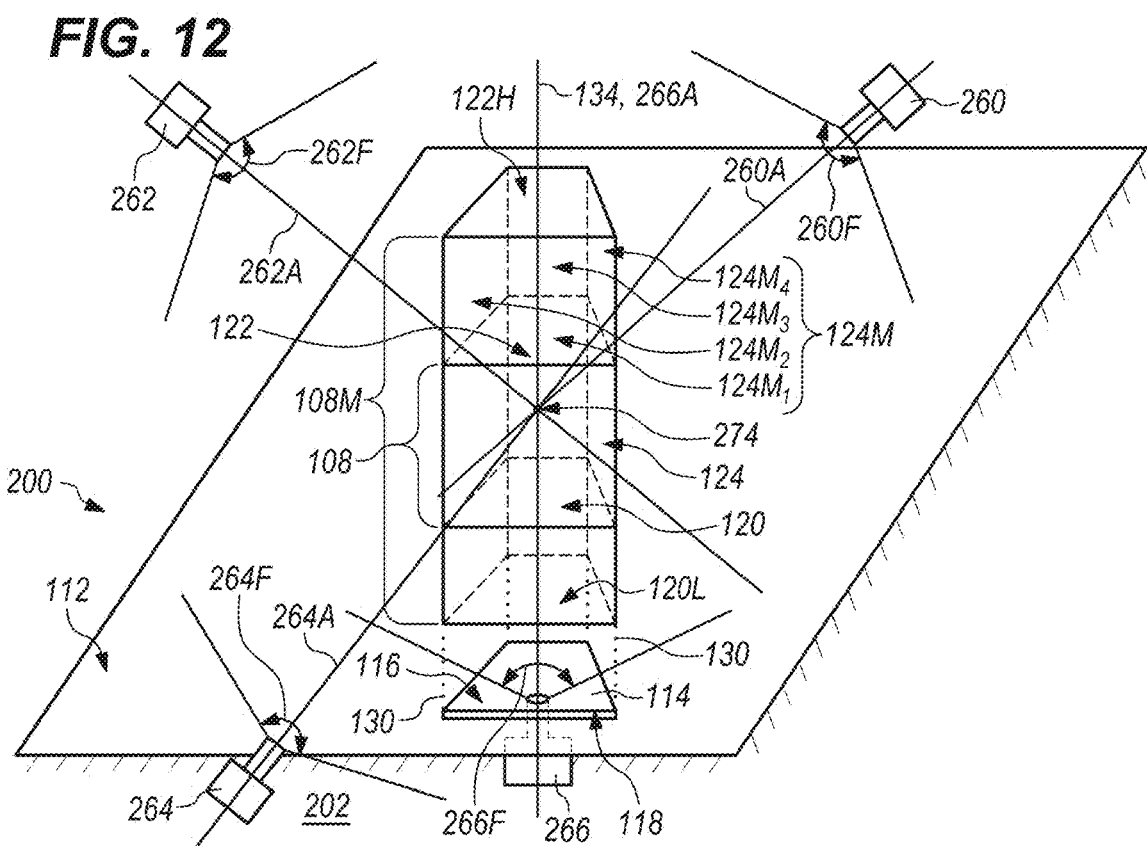

Assistance in understanding the locations and operation of main VCs 260, 262, 264, and 266, is provided by FIG. 12 which illustrates a version of object-movement region 200 and movement-exam system 202 of FIG. 11 simplified to focus on the characteristics of the VC network and what appears in its imagery. Objects 104 and 214 and control body 110 are all absent in FIG. 12. Also, only VCs 260, 262, 264, and 266 of system 202 appear in FIG. 12.

Figures 13A, 13B:
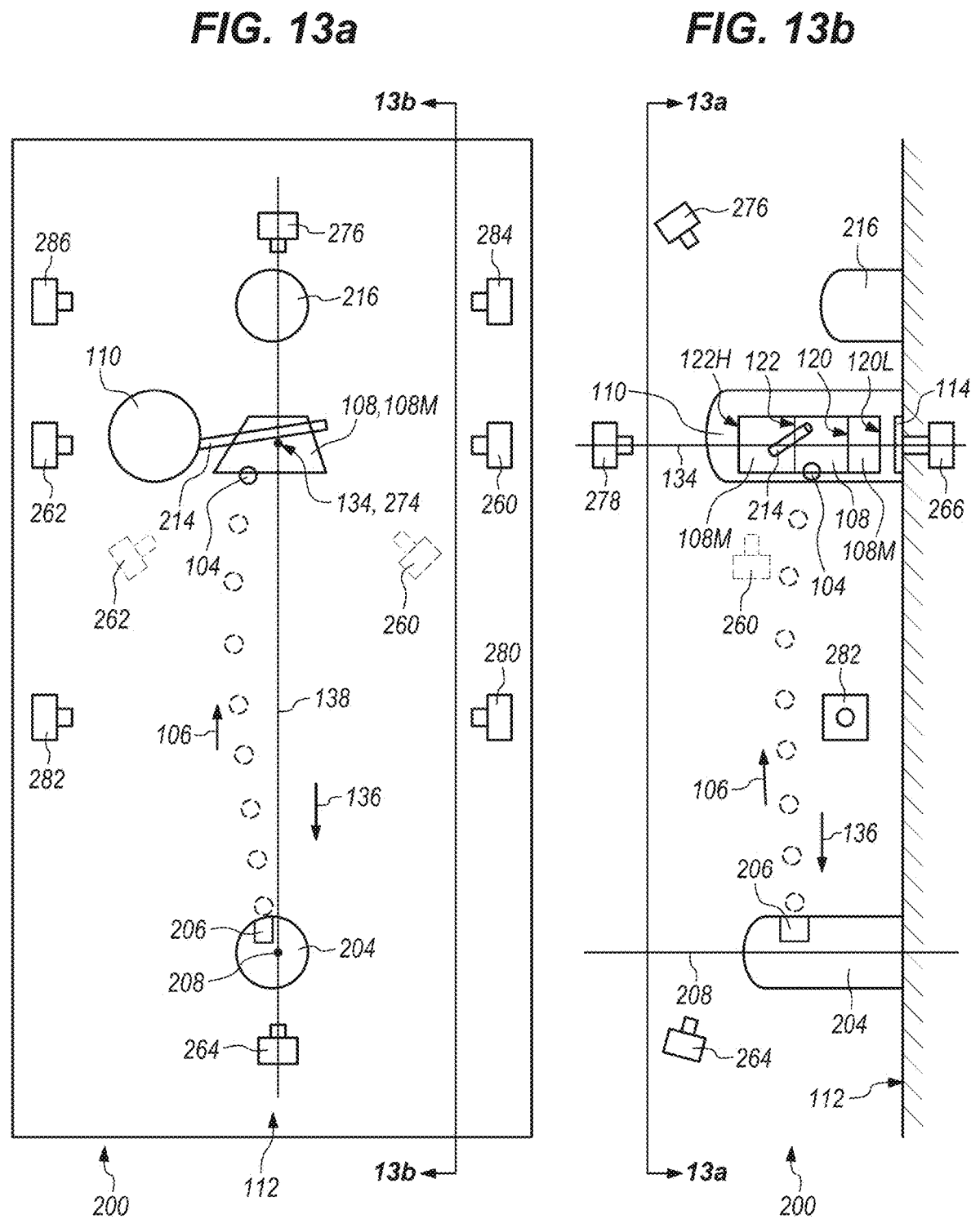

Further assistance is provided by FIGS. 13a and 13b (collectively "FIG. 13") which respectively present top and side views of the embodiment of object-movement region 200 and movement-exam system 202 in FIGS. 11 and 12. Only VCs, including VCs 260, 262, 264, and 266, of system 202 appear in FIG. 13.

Beginning with additional characteristics of spatial zone 108 as particularly shown in FIG. 12, lower zonal boundary 120 usually has a lowest potential location 120L, termed the lower limiting boundary, that can extend as low as regional surface 112. Upper zonal boundary 122 usually has a highest potential location 122H termed the upper limiting boundary. Lower and upper limiting boundaries 120L and 122H can also be respectively termed the first and second limiting boundaries. Zone 108 thereby lies in an imaginary 3D timewise variable-shape region, termed the maximum spatial-zone availability space 108M, situated directly above boundary-defining fixture 114 and extending from lower limiting boundary 120L to upper limiting boundary 122H. Spatial-zone availability space 108M has a maximum lateral limiting boundary 124M extending between lower/upper limiting boundaries 120L and 122H so as to encompass any shape and size of lateral zonal boundary 124. As with zonal boundaries 120, 122, and 124, limiting boundaries 120L, 122H, and 124M are imaginary surfaces not visible to any person.

Lateral limiting boundary 124M has the same geometrical characteristics as lateral zonal boundary 124. That is, boundary 124M is a semiclosed surface typically consisting of n distinct side limiting boundaries $124M_1$, $124M_2$, . . . and $124M_n$ where selected integer n again is 2 or more. Letting imaginary vertical lines 130, where visible, extend to upper limiting boundary 122H, each side limiting boundary $124M_i$ laterally meets side limiting boundary $124M_{i+1}$ along a line 130 where integer i once again runs from 1 to n−1. Side limiting boundary $124M_n$ laterally meets side limiting boundary $124M_i$ along another line 130.

Side limiting boundaries $124M_1$-$124M_n$ respectively situated directly above partial fixture edges $118_1$-$118_n$ can be planar or curved. Availability space 108M in FIG. 12 is a polyhedron, specifically a polygonal cylinder, so that lateral limiting boundary 124M is a polygonal semiclosed surface for which each of side boundaries $124M_1$-$124M_n$ is planar. In particular, boundary 124M in the example of FIG. 12 is a semiclosed tetragonal surface, selected integer n again being 4, so that boundary 124M consists of four side limiting boundaries $124M_1$, $124M_2$, $124M_3$, and $124M_4$. Space 108M here is then a tetragonal cylinder encompassing the tetragonal cylinder of zone 108. In this example, space 108M is specifically a trapezoidal cylinder just like zone 108.

Vertical zonal reference line 134 extends through space 108M and thus perpendicular to lower/upper limiting boundaries 120L and 122H as well as lower/upper zonal boundaries 120 and 122. Space 108M has an availability center (point) 274 located midway between limiting boundaries 120L and 122H. Line 134 usually runs through center 274 of space 108M.

Turning to the VC network, each VC 260, 262, 264, or 266 has an optical axis 260A, 262A, 264A, or 266A and a field of view ("FOV") 260F, 262F, 264F, or 266F largely centered on optical axis 260A, 262A, 264A, or 266A. Each axis 260A, 262A, 264A, or 266A passes through availability space 108M near, preferably largely through, its center 274 as depicted in FIG. 12. Each VC 260, 262, 264, or 266 generates moving imagery capturing anything within that VC's FOV 260F, 262F, 264F, or 266F and not obstructed by other material within FOV 260F, 262F, 264F, or 266F.

Any two of VCs 260, 262, 264, and 266 whose optical axes 260A, 262A, 264A, and 266A mutually extend in materially different directions, preferably roughly perpendicular, usually generate outgoing body-image data 180 and outgoing article-location data 186 and 240 in triangulation form sufficient for data processors 178, 184, 234, and 236 to adequately perform their functions. Using at least three of VCs 260, 262, 264, and 266 improves the accuracy of data 180, 186, and 240. Having all four VCs 260, 262, 264, and 266 in system 202 provides redundancy should one or two of VCs 260, 262, 264, and 266 malfunction.

Above-surface VC 260, termed the transverse far-side VC, is situated above regional surface 112 approximately opposite body 110 relative to spatial zone 108 or availability space 108M so as to be farther from body 110 than from zone 108 or space 108M. Transverse far-side VC 260 is pointed image-wise toward space 108M such that far-side FOV 260F encompasses (i) space 108M and suitable availability adjoining space, (ii) body 110 including each body feature 150, (iii) principal object 104 when it is in space 108M or/and that availability adjoining space, and (iv) additional object 214 when it is in space 108M or/and the availability adjoining space.

As used here, "suitable availability adjoining space" for a VC means space which is within the VC's FOV, which adjoins availability space 108M, and for which principal object 104 passes through space 108M or/and that availability adjoining space in the vast majority, usually at least 90%, preferably at least 99%, more preferably at least 99.9%, of the instances in which object 104 moves from object-movement origin 206 toward spatial zone 108 while body 110 is near zone 108. Inasmuch as nothing is usually situated laterally between far-side VC 260 and space 108M. VC 260 usually generates far-side moving imagery fully capturing space 108M and the VC's availability adjoining space.

Above-surface VC 262, termed the transverse near-side VC, is situated above surface 112 on the same side of zone 108 or space 108M as body 110. Transverse near-side VC 262, which appears in FIG. 13a but not in FIG. 13b due to potentially being hidden by another VC as described below, is closer to body 110 than to zone 108 or space 108M. VC 262 is pointed image-wise toward space 108M such that near-side FOV 262F encompasses largely the same space and items as far-side FOV 260F.

VC 262 generates near-side moving imagery at least partially capturing space 108M and the VC's availability adjoining space. Body 110 may be situated laterally between space 108M and VC 262. To avoid having body 110 obstruct the near-side imagery from fully capturing space 108M and the VC's availability adjoining space, VC 262 may be positioned sufficiently higher above surface 112 than body 110 for any expected height of body 110 such that the near-side imagery fully captures space 108M and the VC's availability adjoining space.

Body 110 can be on the opposite side of space 108M relative to what is shown in FIGS. 11 and 13a. If so, the roles of transverse VCs 260 and 262 are reversed. That is, VC 262 functions as the far-side VC while VC 260 functions as the near-side VC. In light of this, VCs 260 and 262 are preferably laterally situated approximately opposite each other relative to zone 108 and also approximately symmetrically relative to movement origin 206. The composite imagery of VCs 260 and 262 then usually fully captures space 108M and the VCs' composite availability adjoining space regardless of the side of space 108M on which body 110 is situated laterally. System 202 typically needs both VCs 260 and 262 in this positioning arrangement, especially if one of VCs 264 and 266 is absent.

Transverse VCs 260 and 262 can alternatively be positioned sufficiently closer to, or farther from, movement origin 206 than in the foregoing positioning arrangement such that body 110 does not obstruct (prevent) the imagery of VCs 260 and 262 from fully capturing space 108M and the VCs' availability adjoining space. FIG. 13 presents an example of this positioning alternative via VCs 260 and 262 depicted in dashed line and situated laterally approximately symmetrically relative to origin 206.

Regardless of which of the foregoing positioning arrangements is used, each VC 260 or 262 generates moving imagery capturing (a) zone 108, (b) space adjoining zone 108 and within FOV 260F or 262F, (c) body 110, (d) principal object 104 when it is unobstructedly within FOV 260F or 262F, and (e) additional object 214 when it is unobstructedly within FOV 260F or 262F.

Above-surface VC 264, referred to as the front-side VC, is situated above surface 112 in front of zone 108 or space 108M. Front-side VC 264 is usually farther from zone 108 or space 108M than is movement origin 206 but can be closer to zone 108 or space 108M than is origin 206. VC 264 is pointed image-wise toward space 108M so that front-side FOV 264F encompasses largely the same space and items as FOV 260F or 262F except possibly body 110. If VC 264 is closer to space 108M than is origin 206, VC 264 is positioned sufficiently farther above surface 112 than is movement-originating body 204 for any expected height of body 204 so as to meet this requirement on what front-side FOV 264F encompasses.

Collectors 176 and 232 may employ an extra above-surface main VC 276 besides, or as a replacement for, front-side VC 264. See FIG. 13. Extra above-surface main VC 276, referred to as the rear-side VC, lies above surface 112 to the rear of zone 108 or space 108M at a location typically extending approximately through zone-to-origin plane 138. Rear-side VC 276, if present, is pointed image-wise toward space 108M so that the VC's FOV likewise encompasses largely the same space and items as FOV 260F or 262F except possibly body 110. If rear constituent 216 is present, e.g., implemented by at least catcher C in a BB/SB game, VC 276 is situated sufficiently higher above surface 112 than constituent 216 for any expected height of constituent 216 so as to meet this requirement on what the VC's FOV encompasses.

Above-surface VCs 260, 262, 264 and 276 are typically mounted on apparatus (not shown) situated on surface 112. Alternatively, one or more of VCs 260, 262, 264, and 276 may be connected to apparatus (not shown), such as a roof, overlying surface 112. VCs 260, 262, 264, and 276 are positioned so as to substantially avoid interfering with body 110 and objects 104 and 214 as principal object 104 moves toward zone 108 and, if object 104 goes beyond zone 108, immediately after object 104 goes beyond zone 108 at least while body 110 is above or close to reference situs 152.

The far-side moving imagery of VC 260 (or 262) usually captures all body features 150, including changes in their positions. If the far-side imagery does not capture one or more of features 150, the near-side moving imagery of VC 262 (or 260) captures those one or more features 150. Hence, the far-side and near-side imagery together captures all features 150 preferably as object 104 moves toward zone 108. The far-side and near-side imagery largely forms incoming body-image data 166 gathered by body-image collector 176 and provided in electronic form as outgoing body-image data 180 for body-image processor 178 to process as described above.

In rare situations, body features 150 may be so located on control body 110 that all features 150 will sometimes not be captured in the far-side and near-side imagery. FOV 264F of front-side VC 264 is adjusted, if needed, in these rare situations to encompass body 110 including at least each feature 150 not captured in the far-side and near-side imagery. VC 264 then generates front-side moving imagery capturing (a) zone 108, (b) space adjoining zone 108 and within FOV 264F, (c) body 110, (d) principal object 104 when it is unobstructedly within FOV 264F, and (e) additional object 214 when it is unobstructedly within FOV 264F. The front-side imagery captures any feature 150 not captured in the far-side and near-side imagery. The far-side, near-side, and front-side imagery now forms body-image data 166.

Features 150 may, in even rarer situations, be so located on body 110 that all features 150 will sometimes not be captured in the far-side, near-side, and front-side imagery. In these very rare situations, the VC network includes rear-side VC 276 whose FOV is adjusted, if needed, to include body 110 including at least each feature 150 not captured in the far-side, near-side, and front-side imagery. VC 276 then generates rear-side moving imagery capturing (a) zone 108, (b) space adjoining zone 108 and within the VC's FOV. (c) body 110, (d) principal object 104 when it is unobstructedly within that VC's FOV, and (e) additional object 214 when it is unobstructedly within that VC's FOV. The rear-side imagery captures any feature 150 not captured in the far-side, near-side, and front-side imagery. The far-side, near-side, front-side, and rear-side imagery forms body-image data 166 in these situations.

Below-surface VC 266, referred to as the lower-side VC, is a data-collecting device situated substantially below regional surface 112, i.e., all or nearly all of lower-side VC 266 lies below surface 112. VC 266 also lies below fixture 114 so as to underlie space 108M and zone 108. Should VC 266 extend laterally beyond fixture 114, VC 266 still lies substantially below surface 112. The portion of VC 266 hidden by surface 112 in the perspective views of FIGS. 11 and 12 is depicted in dashed line in those figures. Also, VC 266 appears in FIG. 13b but, to avoid illustration complexity, does not appear in FIG. 13a.

Lower-side VC 266 is pointed vertically upward imagewise so that its FOV 266F originates below surface 112, is directed upward, and passes through fixture 114. Fixture 114 is transparent, or at least semitransparent, to the image-generating radiation entering VC 266 at least where lower-side FOV 266F extends through fixture 114. In this regard, fixture 114 may be one-way transparent for largely blocking visible radiation (or light) incident on fixture surface 116 from below surface 116. Fixture 114 then appears opaque from above fixture 114. One-way transparency to visible radiation and the associated semitransparency to visible radiation, if undesirable, can be avoided by implementing the image-generating radiation entering VC 266 with IR or UV radiation.

Lower-side FOV 266F is typically fixed but can sometimes be adjusted by rotating or/and moving lower-side VC 266 while it remains below surface 112. Optical axis 266A of VC 266 usually extends approximately parallel to zonal reference line 134. In the preferred situation of FIG. 12, optical axis 266A and line 134 are largely the same.

FOV 266F encompasses (i) space 108M and suitable availability adjoining space and (ii) objects 104 and 214 when they are in space 108M or/and that adjoining space. Lower-side VC 266 thereby generates lower-side moving imagery capturing (a) zone 108, (b) space adjoining zone 108 and within FOV 266F, (c) principal object 104 when it is unobstructedly within FOV 266F, and (d) additional object 214 when it is unobstructedly within FOV 266F. The lower-side imagery specifically captures the locations of lateral limiting boundary 124M and lateral zonal boundary 124 for any shape of zone 108.

Due to its subsurface location, lower-side VC 266 is particularly useful in determining whether at least part of additional object 214 passed an imaginary front area consisting of front zonal boundary 124i, the area extending from the lower front edge of boundary 124, down to fixture 114, and the area extending upward from the lower front edge of boundary 124, within the VC's purview. The front area is implemented with plate-clearing area 74 in BB/SB. VC 266 is thus especially useful in determining whether a "swinging strike" occurred under the plate-clearing definition.

Collectors 176 and 232 may employ another extra above-surface main VC 278 besides, or as a replacement for, lower-side VC 266. Extra above-surface main VC 278, referred to as the upper-side VC, lies above surface 112 at a location higher than space 108M and therefore higher than zone 108. Upper-side VC 278 which appears in FIG. 13b but, to avoid illustration complexity, does not appear in FIG. 13a is specifically positioned sufficiently far above space 108M so as to substantially avoid interfering with object 104 during its movement toward zone 108. VC 278 can, for instance, be suspended from a roof overlying surface 112.

The FOV of upper-side VC 278 is typically fixed but sometimes can be adjusted by rotating or/and moving VC 278. The optical axis of VC 278 usually extends approximately parallel to zonal reference line 134. In the preferred situation, the upper-side optical axis and line 134 are largely the same so that VC 278 is situated directly above space 108M and fixture 114 as indicated in FIG. 13b.

The FOV of upper-side VC 278 encompasses largely the same space and items as FOV 260F or 262F. VC 278 thus generates upper-side moving imagery capturing largely the same space and items as VC 260 or 262. As with lower-side VC 266, the upper-side imagery specifically captures the locations of lateral limiting boundary 124M and lateral zonal boundary 124.

Arranging VCs 260, 262, 264, and 266 and VCs 276 and 278 to the extent present (collectively the "main VCs") in the preceding way enables the purview of system 202 to fully encompass space 108M and suitable availability adjoining space and therefore to fully encompass zone 108 and suitable zonal adjoining space for any shape of zone 108 where zone 108 and the zonal adjoining space together occupy the same space as space 108M and the availability adjoining space together. In BB/SB, all of strike zone 56 and the zonal adjoining space is within the purview of system 202 for any shape of zone 56.

Transverse VCs 260 and 262 are well positioned to collect incoming body-image data 166 used in determining the locations of lower/upper zonal boundaries 120 and 122. Lower-side VC 266 is well positioned to assist in determining the locations of boundaries 120 and 122. VCs 260 and 262 are also well positioned for collecting data 166 to determine the locations of lower/upper boundaries 60 and 62 of strike zone 56 in BB/SB because their moving imagery captures zone 56, batter B, ball 52 when it is unobstructedly within FOVs 260F and 262F, and bat 54 when it is unobstructedly within FOVs 260F and 262F. VC 266 is well positioned to assist in determining the locations of boundaries 60 and 62 because the VC's imagery captures zone 56, ball 52 when it is unobstructedly within FOV 266F, and bat 54 when it is unobstructedly within FOV 266F. The moving imagery of each VC 260, 262, or 266 also captures space adjoining zone 56 and within FOV 260F, 262F, or 266F.

VCs 260 and 262 are well positioned to collect incoming tracking article-location data 226 used in determining whether principal object 104 passed through or/and by spatial zone 108 as at least part of additional object 214 passed the above-mentioned specified location on zone-control body 110 in the specified lateral direction without object 214 contacting object 104. VCs 260 and 262 are well positioned for collecting data 226 to determine whether ball 52 passed through or/and by strike zone 56 in BB/SB as at least part of bat 54 passed the below-described specified location on batter B in zone-to-pitcher 136 direction without bat-to-ball contact. VC 266 is well positioned to assist in these determinations.

Lower-side VC 266 and upper-side VC 278, if present, are generally well positioned to collect data 226 for use in generating values A-P of results indication signal 230 including determining whether at least part of additional object 214 entered zone 108 or/and adjoining space over or under zone 108 and exited it or/and that adjoining space at the selected exit location laterally dependent on zone 108. VCs 266 and 278 are well positioned to collect data 226 for electronically calling "balls" and "strikes" in BB/SB as described below including determining whether a "swinging strike" occurred under the plate-clearing definition if bat 54 crossed front plate-clearing area 74 in direction 136 without bat-to-ball contact. Transverse VCs 260 and 262 are well positioned to assist in these actions.

Control unit 268 controls the main VCs via camera control signals 270 in the following way. Unit 268 causes the main VCs to turn on and off. If the main VCs can go into a low-power (sleep) mode, unit 268 controls their entry into and exit from the low-power mode. Unit 268 controls the instants when the main VCs start and stop generating imagery. Unit 268 can also control the orientations of the main VCs, i.e., the directions of their optical axes, and thus what is encompassed by their FOVs.

The main VCs are controlled to generate imagery for determining the locations of lower/upper zonal boundaries 120 and 122 preferably during each time period extending from when object 104 starts moving from movement origin 206 toward spatial zone 108 to when object 104 reaches front zone-meeting plane 140 described above in connection with FIG. 4. For BB/SB, the main VCs generate imagery for determining the lower/upper zonal boundary locations preferably soon after, usually no more than 0.1 s after, ball 52 leaves pitcher P.

The VC network has a composite FOV consisting of the FOVs of the main VCs. If object 104 passes by zone 108 outside the composite FOV of the VC network, a human official usually determines that none of object 104 entered zone 108. In BB/SB, the human official is usually home-plate umpire U for ball 52 passing by strike zone 56 outside the composite FOV.

The tracking of object 104 can be performed with the main VCs, except possibly lower-side VC 266 due to its subsurface location, or/and one or more further VCs. Items 280, 282, 284, and 286 in FIG. 13a indicate examples of further VCs suitable for use in tracking object 104. Further VCs 280, 282, 284, and 286 can be situated on regional surface 112 but are typically positioned some distances above surface 112 as indicated by VC 282 in FIG. 13b.

In the example of FIG. 13, further VCs 280 and 284 are situated beyond one side of zone-to-origin plane 138 while further VCs 282 and 286 are situated beyond the other side of plane 138. VCs 280 and 282 are additionally situated beyond the front side of zone 108. This enables VCs 280 and 282 to be particularly useful in tracking object 104 as it moves from movement origin 206 toward zone 108. VCs 284 and 286 are additionally situated beyond the back side of zone 108 so as to be particularly useful in tracking object 104 if it goes beyond zone 108.

The optical axes of the tracking VCs, i.e., the main VCs and potentially the further VCs, may rotate to track object 104 as it moves from movement origin 206 toward zone 108. If the axis rotation would hamper the ability of the main VCs to collect incoming body-image and article-location data 166 and 226, the tracking of object 104 is performed with further VCs.

The main VCs, i.e., variously VCs 260, 262, 264, 266, 276, and 278, along with control unit 268 can be employed in collectors 176 and 182 in movement-exam system 102 and in the expansion of system 102 described below. The main VCs and the further VCs. i.e., variously VCs 280, 282, 284, and 286, can similarly be used in collectors 176 and 232 of the compression of system 202 described below.

Expansion and Compression Variations of Movement-Examination System

An expansion of movement-exam system 102 according to the invention employs other-entry processor 236 of movement-exam system 202 but not its tracking processor 234. The expansion of system 102 determines whether at least part of additional object 214 entered spatial zone 108 or/and space over or under or/and to the front or rear of zone 108, whether at least part of object 214 passed through or/and over or under or/and to the front or rear of zone 108, and substantially whether object 214 contacted principal object 104, each of these actions occurring as object 104 was about to enter or/and pass by zone 108, was passing through or/and by it, or had just exited or/and passed by it. Consequently, the expansion of system 102 provides results indication signal 230 at any of indication values A-F, K. and L not dependent on the tracking capability.

The expansion of system 102 provides initial findings for indication values G. H. M, and N dependent on the tracking capability subject to human correction. The correction is particularly important in BB/SB because the consequences of values G and M are changed from a "strike" to a "ball" if ball 52 hit infield 22 before reaching the immediate vicinity of strike zone 56.

A compression of system 202 in accordance with the invention utilizes all the capabilities of system 202 except that the locations of lower/upper zonal boundaries 120 and 122 are determined before object 104 starts moving toward zone 108. The compression of system 202 fully provides values A-P of indication signal 230 except that values A-P lack the adjustments in the locations of boundaries 120 and 122 as object 104 moves toward zone 108. The compression of system 202 may also lack the tracking capability. In that case, the compression of system 202 fully provides values A-F, K, and L of signal 230 but only initial findings for values G, H, M. and N of signal 230 subject to human correction as described above for the expansion of system 102.

In short, a movement-exam system according to the invention contains the boundary-determination, principal-entry, and entry-indication capabilities combined with one of or both the tracking and other-entry capabilities. The boundary-determination capability can be implemented with the feature-data-collection capability described above in connection with FIG. 6 or the whole-body shape-examination capability described above in connection with FIGS. 7 and 8. The other-entry capability can use the object-passage procedure.

Baseball or Softball Implementation

Figures 14, 15A, 15B:
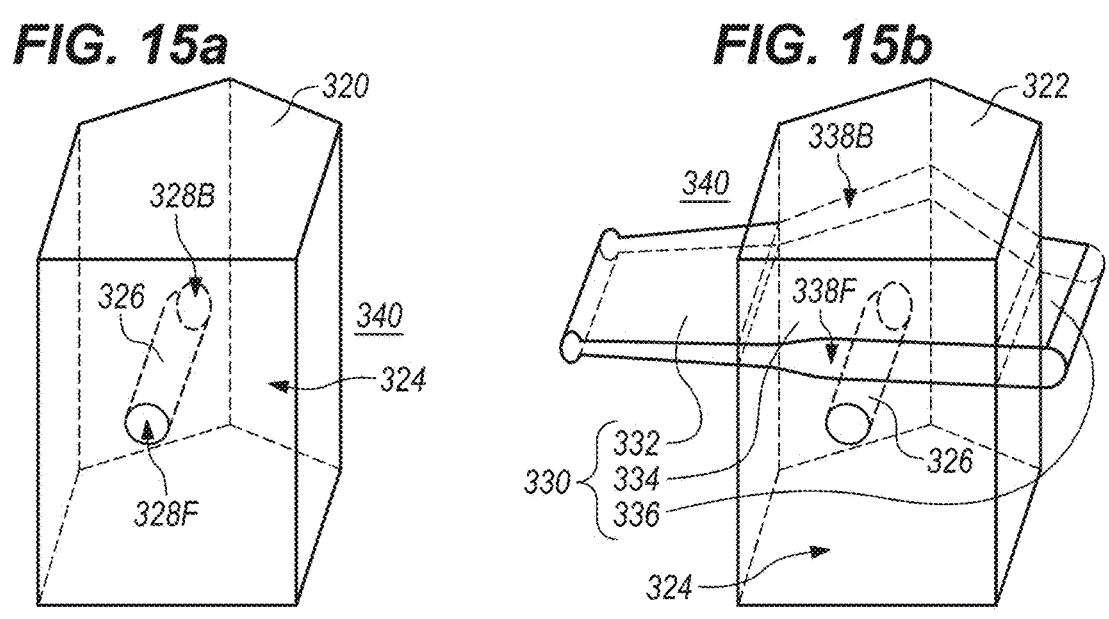
FIG. 14 is a plan view of a BB/SB implementation of the object-movement region and movement-exam system of FIGS. 9a, 9b, 10-12, 13a, and 13b.
FIGS. 15*a* and 15*b* are perspective views of two respective simulations of the strike zone in the BB/SB implementation of FIG. 14.

FIG. 14 illustrates a BB/SB implementation 300 of object-movement region 200 and movement-exam system 202. The reference symbols of FIGS. 1 and 2 are used for the same items in FIG. 14 and the later figures. All references to system 202 and its components and signals in this BB/SB section mean system 202 and its components and signals in implementation 300. Zone-to origin direction 136 is zone-to-pitcher direction 136 here. Zone-to-origin plane 138 is zone-to-pitcher plane 138 here.

Items 22, 24, 26L, 26R, 28, 30, 32, 34, 36, 38, 40, 42, 44, 46L, 46R. 50L, 50R, P, C, and U of FIG. 1 specifically appear in FIG. 14. The centers of pitcher's mound 28 and home plate 34 pass through zone-to-pitcher plane 138. Spatial-zone availability space 108M is strike-zone availability space 108M here. Only the VC network of system 202 appears in FIG. 14. The remainder of system 202 is indicated by block 302 labeled "MOVEMENT-EXAMINATION SYSTEM 202 EXCEPT VIDEO CAMERAS".

Object-movement region 200 in BB/SB implementation 300 is a ball-movement region 304. The following additional items appear in ball-movement region 304. A fair-territory outfield 306 extends from infield 22 to an outfield barrier 308, commonly termed a "fence" but sometimes at least partially a wall, between the outside edges of foul lines 26. A grass area 310 of outfield 306 adjoins dirt infield area 32. Although grass outfield area 310 sometimes extends to outfield barrier 308, a warning track 312 defined with dirt or other hard material is often situated between barrier 308 and outfield area 310 as shown in FIG. 14. Warning track 312 typically extends along lines 26 partway from barrier 308 to infield 22. Fair territory consists of infield 22, outfield 306, and lines 26.

Foul territory 24 consists of dirt foul area 42, grass foul area 44, and a track foul area 314 extending from grass foul area 44 farther away from infield 22 than foul area 44. Track foul area 314, also defined with dirt or other hard material, merges with track 312 along foul lines 26 to form a composite annular track laterally surrounding the combination of grass outfield area 310 and grass foul area 44.

Stands 316 with seating for spectators are situated outside track foul area 314. Although FIG. 14 only depicts stands 316 as extending partway along foul area 314, stands 316 often extend fully along foul area 314 and beyond outfield barrier 308. One or more open spaces (not shown) are often present between barrier 308 and the part of stands 316 beyond barrier 308. If foul area 314 is absent, stands 316 are situated along grass foul area 44 and often extend beyond barrier 308.

Transverse VCs 260 and 262 are situated above stands 316 respectively to the left and right of zone-to-pitcher plane 138. A vertical plane (not shown) extending through home plate 34 perpendicular to plane 138 passes close to, preferably through, VCs 260 and 262 and likewise close to, preferably through, batter's boxes 46. Each VC 260 or 262 is considerably farther from plate 34 than is batter's box 46L or 46R. VCs 260 and 262 respectively function as the far-side and near-side VCs when batter B (not indicated in FIG. 14 due to lack of space) is in right box 46R and vice versa when batter B is in left box 46L.

Front-side VC 264 is situated above the region behind outfield barrier 308. Plane 138 passes close to, preferably through, VC 264 so that it is directly in front of home plate 34. VC 264 is positioned sufficiently high as to avoid having pitcher P obstruct the front-side imagery from fully capturing strike-zone availability space 108M.

Lower-side VC 266 does not appear in FIG. 14 to avoid illustration complexity. VC 266 is, nonetheless, situated below home plate 34. Plane 138 passes close to, preferably through, VC 266.

Rear-side VC 276, if present, is situated above stands 316 and to the rear of home-plate umpire U and thus behind home plate 34. Plane 138 passes close to, preferably through, VC 276. Also, VC 276 is positioned sufficiently high as to avoid having catcher C or/and umpire U obstruct the rear-side imagery from fully capturing availability space 108M. This positioning sometimes cannot readily be achieved. As a result, VC 276 is sometimes absent.

Upper-side VC 278, if present, does not appear in FIG. 14 to avoid illustration complexity. VC 278 is positioned approximately above home plate 34 sufficiently high as to substantially avoid interfering with the BB/SB play. Should ball-movement region 304 have a roof, VC 278 is typically attached to the roof. If not, VC 278 is typically absent.

Further VCs 280, 282, 284, and 286 are present in BB/SB implementation 300 for use in tracking pitched ball 52 as it moves from pitcher P toward home plate 34 and potentially goes beyond catcher C toward the part of stands 316 behind catcher C. VCs 280, 282, 284, and 286 are situated above stands 316 with VCs 280 and 284 to the left beyond plane 138 and VCs 282 and 286 to the right beyond plane 138.

One major purpose in tracking ball 52 is to determine whether it hit infield 22 before reaching the immediate vicinity of strike zone 56. The distance from the center of pitcher's mound 28 to upper front edge 58F of home plate 34 is nearly 17.5 m (691 in) corresponding to approximately 18.5 m (726 in) from the pitcher's plate (not shown) on mound 28 to the rear corner of plate 34. However, pitched balls rarely contact infield 22 more than 3 m in front of plate 34. Accordingly, further VCs 280 and 282 are usually considerably closer to plate 34 than to pitcher P. In particular, a vertical plane (not shown) extending perpendicular to plane 138 partway between mound 28 and plate 34 and passing close to, preferably through, VCs 280 and 282 is preferably much closer to plate 34 than to mound 28.

Transverse VCs 260 and 262 may be sufficient to track ball 52 as it moves from the pitcher's pitching hand toward strike zone 56. This is especially the situation if further VCs 280 and 282 would be positioned respectively close to VCs 260 and 262 to accommodate pitched balls rarely contacting infield 22 more than 3 m in front of home plate 34. In that case. VCs 280 and 282 are typically absent.

Another major purpose in tracking ball 52 is to determine what happened to it in situations where ball 52 went beyond zone 56, especially in "foul-tip strike" situations where the strike count is two, i.e., whether catcher C caught ball 52. For this purpose, a vertical plane (not shown) extending perpendicular to plane 138 partway between home plate 34 and the portion of stands 316 directly to the rear of plate 34 passes close to, preferably through, VCs 284 and 286. If VCs 260 and 262 are sufficient to track ball 52 if it went beyond zone 56, including when it went beyond catcher C toward the part of stands 316 behind catcher C, VCs 284 and 286 are again typically absent.

Main VCs 260 and 262 and further VCs 280, 282, 284, and 286 to the extent present are also positioned sufficiently high above stands 316 as to substantially avoid interfering with spectators viewing the BB/SB play and to substantially avoid being interfered with by spectators. The same applies to main VC 264 if stands 316 are present behind outfield barrier 308 close to the VC's location.

FIGS. 15a and 15b respectively depict two simulations 320 and 322 of strike zone 56 provided by results indication imaging 230V. Item 324 indicates a simulation of front zonal boundary 64F, the middle part of plate-clearing area 74. Each FIG. 15a or 15b presents a simulation 326 of space occupied by pitched ball 52 as it passed through strike-zone simulation 320 or 322. Ball-space simulation 326 is a circular quasi-cylinder. Circular item 328F, labeled only in FIG. 15a, is a simulation of the maximum area occupied by ball 52 as it entered zone 56 along boundary 64F. Elliptical item 328B, likewise labeled only in FIG. 15*a*, is a simulation of the maximum area occupied by ball 52 as it exited zone 56 along left back zonal boundary 64BL.

FIG. 15*a* simulates (i) a "called strike" of indication value G or M of indication imaging 230V provided that ball 52 did not previously hit infield 22 or (ii) a "hit-infield ball" of indication value I or O of imaging 230V if ball 52 previously hit infield 22. The tracking capability of system 202 determines whether ball 52 previously hit infield 22 for each result indication value dependent on ball 52 previously hitting, or not hitting, infield 22.

Turning to FIG. 15*b*, it additionally presents a simulation 330 of space occupied by bat 54 as part of bat 54, termed the zonal bat part, simultaneously passed through strike zone 56. Bat-space simulation 330 is also a quasi-cylinder. The quasi-cylinder of bat-space simulation 330 is considerably flattened compared to the circular quasi-cylinder of ball-space simulation 326.

Bat-space simulation 330 consists of a handle-space simulation 332, an intermediate-space simulation 334, and an end-space simulation 336. Intermediate-space simulation 334 simulates the space occupied by the zonal bat part as it passed through strike zone 56. Item 338F is a simulation of the maximum area occupied by the zonal bat part as it entered zone 56 along front boundary 64F. Item 338B is a simulation of the maximum area occupied by the zonal bat part as it exited zone 56 along back zonal boundaries 64BL and 64BR.

Item 340 indicates a simulation, referred to as the simulated outside space, of space outside strike zone 56. Handle-space simulation 332 simulating much of the handle of bat 54 is present in simulated outside space 340 to one side of strike-zone simulation 322. End-space simulation 336 simulating the remote end of bat 54 is present in space 340 to the opposite side of simulation 322. If the remote end of bat 54 passed through zone 56, end-space simulation 336 would be absent. In any event, FIG. 15*b* simulates a "swinging strike" of result indication value A of imaging 230V because, although not explicitly shown in FIG. 15*b*, part of bat 54 would pass front zonal boundary 64F and therefore plate-clearing area 74.

Other BB/SB simulations analogous to those of FIGS. 15*a* and 15*b* are readily provided for imaging 230V. For instance, modifying FIG. 15*a* to have simulation 326 of space occupied by ball 52 pass by strike-zone simulation 320 simulates (i) a basic "ball" of indication value H or N provided that ball 52 did not previously hit infield 22 or (ii) a "hit-infield ball" of indication value J or P if ball 52 previously hit infield 22. Modifying FIG. 15*b* to have ball-space simulation 326 pass by strike-zone simulation 322 simulates a "swinging strike" of indication value B because part of bat 54 would pass plate-clearing area 74. In short, simulations of all indication values A-P including indication values E1, E2, F1, and F2 are readily providable for BB/SB.

Figures 16A, 16B:
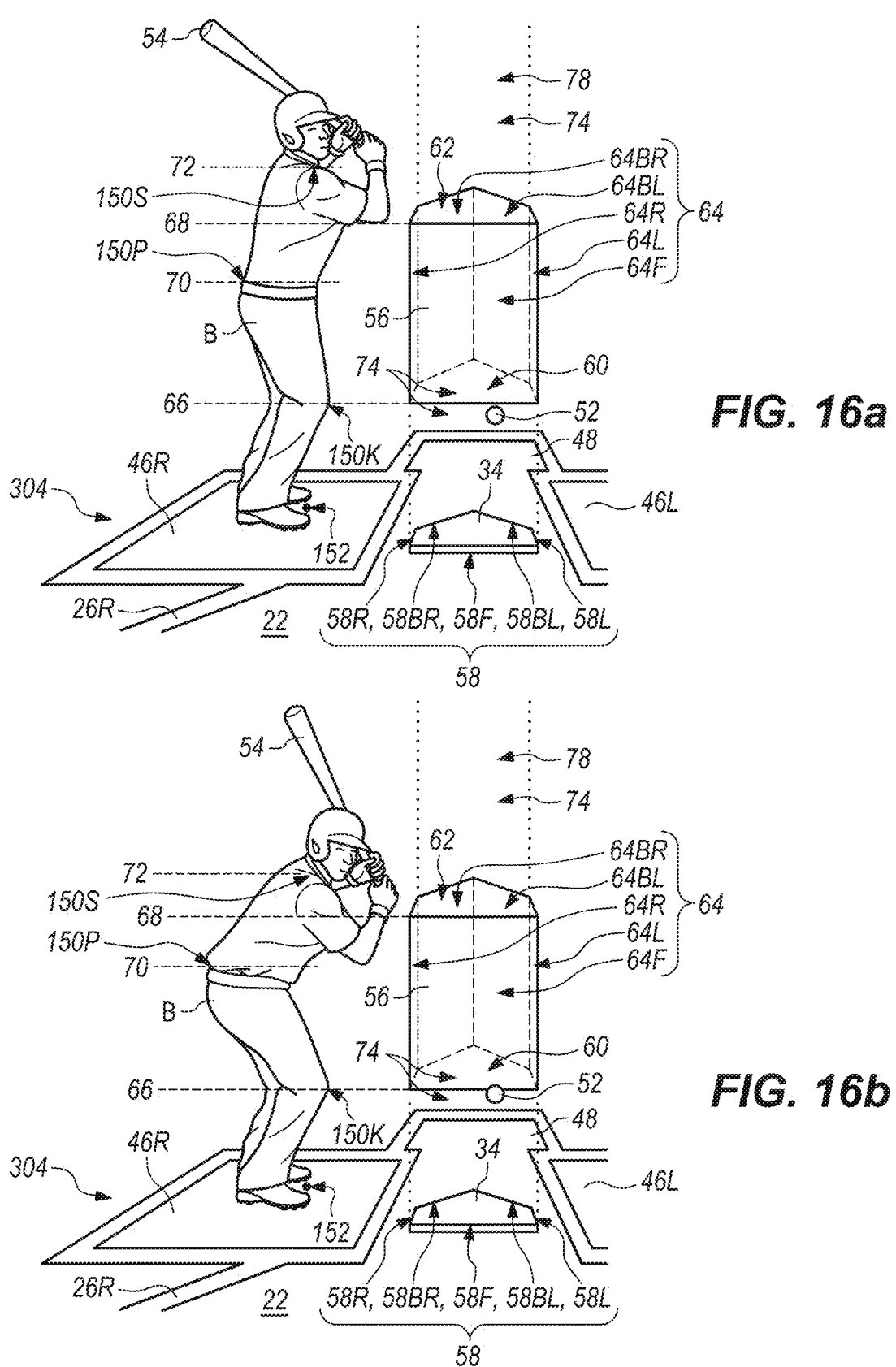
FIGS. 16*a* and 16*b* are perspective views of the home-plate region in the BB/SB implementation of FIG. 14 showing the boundaries of the strike zone as it is approached by the ball with the batter in two respectively different stances.

FIGS. 16*a* and 16*b* illustrate the home-plate region in BB/SB implementation 300 showing the boundaries of strike zone 56 as it is approached by pitched ball 52 with batter B in two respectively different stances. FIG. 16*a* presents an example in which batter B is in a slight crouch and in which pitched ball 52 passes home plate 34 below lower zonal boundary 60 without batter B swinging or bunting at ball 52 and without ball 52 previously hitting infield 22. Hence, the call is a basic "ball".

FIG. 16*b* presents an example in which batter B, the same batter as in FIG. 16*a*, is in a deeper crouch and in which ball 52 passes home plate 34 at the same location as in FIG. 16*a* likewise without batter B swinging or bunting at ball 52 and without ball 52 previously hitting infield 22. Due to the batter's deeper crouch in FIG. 16*b* than in FIG. 16*a*, movement-exam system 202 causes the locations of lower/upper zonal boundaries 60 and 62 to be somewhat downward and closer together in FIG. 16*b* than in FIG. 16*a*. Lower boundary 60 is sufficiently lower in FIG. 16*b* that part of ball 52 passes through the bottom of strike zone 56. The call in FIG. 16*b* is therefore a "called strike" even though ball 52 passes plate 34 at the same location as in FIG. 16*a* and batter B is the same in both FIGS. 16*a* and 16*b*.

FIG. 16*a* can alternatively represent a prior art situation in which the locations of lower/upper zonal boundaries 60 and 62 are determined by the batter's slight crouch before pitcher P pitches ball 52. If batter B actually remained in that slight crouch, the call would be a basic "ball" because ball 52 passed by strike zone 56. However, after ball 52 left the pitcher's pitching hand, batter B went into the deeper crouch of FIG. 16*b*. Consequently, the correct call is a "called strike" due to the lower location of lower boundary 60 in FIG. 16*b* than in FIG. 16*a*. In this way, system 202 provides a correct call that would have been erroneous in the prior art. Similarly, system 202 provides a correct call of a basic "ball" instead of an erroneous "called strike" when the lower location of upper zonal boundary 62 in FIG. 16*b* than in FIG. 16*a* results in ball 52 passing by zone 56 above upper boundary 62 rather than at least part of ball 52 passing through zone 56 along or near boundary 62.

Turning to the determination of the locations of lower/upper boundaries 60 and 62 of strike zone 56 by system 202, incoming body-image data 166 consists of data of imagery of largely all batter B, specifically at least the body portion extending from the bottom of the lowest of designated physical body features 150 to the top of the batter's head. Data 166 thereby includes data of each body feature 150. Incoming feature data 166A at least includes data of each feature 150. Incoming whole-body data 166B consists of data of imagery of substantially all batter B and likewise includes data of each feature 150. Feature planes 154 are implemented with lower boundary-defining plane 66, first boundary-defining plane 70, and second boundary-defining plane 72 in FIGS. 16*a* and 16*b*.

Batter B in MLB, Minor League Baseball, or NCAA baseball has three body features 150 consisting of a lower physical body feature 150K at the hollow beneath the batter's kneecap, an intermediate physical body feature 150P at the top of the batter's uniform pants, and an upper physical body feature 150S at the top of the batter's shoulders as shown in FIGS. 16*a* and 16*b*. Lower boundary-defining feature plane 66 extending through lower zonal boundary 60 extends through lower feature 150K. First boundary-defining feature plane 70 extends through intermediate feature 150P. Second boundary-defining feature plane 72 extends through upper feature 150S. Upper boundary-defining plane 68 extending through upper zonal boundary 62 is situated midway between feature planes 70 and 72.

Body features 150 for NCAA softball, namely women's fastpitch softball, consist of a lower physical body feature 150 at the top of the batter's knees and an upper physical body feature 150 at the bottom of the batter's sternum. For NSA fastpitch softball, features 150 consist of a lower physical body feature 150 at the top of the batter's knees and an upper physical body feature 150 extending through the batters armpit(s). Features 150 for NSA slowpitch softball consist of a lower physical body feature 150 at the batter's front knee and an upper physical body feature 150 at the batter's highest shoulder.

Body reference situs 152 is implemented as a fixed location, e.g., a point, in regional surface 112 of diamond area 20 dependent on batter B. The location is in left batter's box 46L for batter B standing in box 46L or in right batter's box 46R for batter B standing in box 46R. All distances pertinent to determining the locations of lower/upper zonal boundaries 60 and 62 are measured vertically.

Boundary determiner 160 operates in any of the following ways in BB/SB implementation 300. In the basic body-image technique, determiner 160 collects incoming body-image data 166 of largely all batter B, including data of imagery of each body feature 150, within the determiner's purview while batter B is near strike zone 56 and preferably while ball 52 is moving toward zone 56. Determiner 160 processes data 166 to determine how far each feature 150 is vertically spaced apart from reference situs 152 and employs that vertical distance information to determine the temporary locations of lower/upper zonal boundaries 60 and 62 again preferably while ball 52 is moving toward zone 56. Determiner 160 operates the same using the feature-data technique of FIG. 6 except that incoming feature data 166A need only include the portion(s) of batter B relevant to the locations of features 150.

Generation of potential body shapes 198 for the whole-body simulation technique of FIGS. 7 and 8 applied to BB/SB is handled according to either of the following shape-generation techniques. In a first shape-generation technique, shapes 198 are generated for models of BB/SB players as a function of player height for selected increments in player height, as a function of player mass (weight) for selected increments in player mass at each different player height, and as a function of player stance for different player stances at each different combination of player height and mass. Body features 150 not inherent in shapes 198 are incorporated into them. The models can be computer simulated or actual BB/SB players.

The player stances at each different combination of player height and mass are defined in selected increments of reduction in player height by having the models bend at their knees and waists (crouch) in the way that an actual BB/SB player usually bends at the waist and knees in preparing to hit a baseball or softball. The increments in reduction of player height for defining the stances are usually no more than 2.5 cm, preferably no more than 2.0 cm, more preferably no more than 1.0 cm. The same applies to the increments in player height. The increments in player mass are usually no more than 1.0 kg, preferably no more than 0.5 kg.

Potential body shapes 198 in a second shape-generation technique are generated for each player, referred to here as a "potential batter", that can be batter B prior to he/she actually being batter B. This is done as a requirement of playing BB/SB using system 202.

For body features 150 that are visible, e.g., the top of the shoulders or the top of the uniform pants, images of each potential batter are generated with he/she at various batting stances and preferably holding a bat to make the stances realistic. Images of the potential batter can, for example, be generated while he/she is standing in batter's box 46L or 46R used during play with he/she swinging bat 54 and at various batting stances. If the potential batter sometimes uses box 46L and other times uses box 46R, the images are generated for him/her standing in both boxes 46. The various images are converted into body shapes 198 for that potential batter.

Should a body feature 150 be difficult to discern, e.g., a potential batter wears BB/SB pants artificially high while playing BB/SB so as to materially distort a feature 150 relating to the top of the uniform pants, a difficult-to-discern feature 150 is converted into a discernable feature 150 by first generating images of him/her while he/she is wearing a BB/SB uniform exposing feature 150 difficult to discern during actual play. The images are generated with the potential batter at various representative batting stances and typically holding a bat to make the batting stances realistic. The images are then suitably projected onto images of the potential batter while he/she is wearing a BB/SB uniform which makes that feature 150 difficult to discern so as to demarcate the feature's location on him/her and thereby create a set of body shapes 198 for him/her with the difficult-to-discern feature 150 marked at a specific location on his/her images.

The whole-body simulation of FIGS. 7 and 8 is implemented as follows using potential body shapes 198 generated according to either of the shape-generation techniques. The spatial-zone simulation is a strike-zone simulation of strike zone 56. The reference-situs simulation continues to be a simulation of reference situs 152. The variable-shape body simulation is a variable-shape batter simulation of batter B. The first and second simulated spatial boundaries of the spatial-zone simulation respectively are simulations of lower/upper zonal boundaries 60 and 62.

The batter simulation has (a) a simulated feature for each designated body feature 150 of batter B and (b) a plurality of potential body shapes 198 for batter B. Certain of body shapes 198 may be shape-wise so distant from batter B as to be incapable of matching batter B. For instance, certain shapes 198 may be too tall or too short for matching batter B at any stance of batter B. Those shapes 198 can then be preliminarily eliminated from consideration. Boundary determiner 160 also preferably adjusts for any difference between the shoe heights of a shape 198 and batter B.

The simulated feature for each body feature 150 for each potential body shape 198 is simulated at a specified (known) vertical distance from the reference-situs simulation. Determiner 160 collects incoming whole-body data 166B of imagery of substantially all batter B within the determiner's purview preferably while ball 52 moves toward strike zone 56. Determiner 160 then processes data 166B by a BB/SB shape-examination procedure that entails (i) comparing the imagery of batter B in data 166B to shapes 198 under consideration to determine a particular one of those shapes 198 as largely most closely matching the imagery of batter B in shape and (ii) determining the locations of lower/upper zonal boundaries 60 and 62 as a function of the specified distance of each simulated feature of that particular closest shape 198 from the reference-situs simulation again preferably while ball 52 is moving toward zone 56.

Operating in the preceding way enables determiner 160 in system 202 to accurately determine the locations of lower/upper zonal boundaries 60 and 62. Using the whole-body simulation of FIGS. 7 and 8 in BB/SB implementations of movement-exam system 102 and the expansion of system 102 likewise enables those implementations to accurately determine the locations of boundaries 60 and 62.

Zonal boundaries 60, 62, and 64 are typically imposed on a view of strike zone 56 as seen on a television screen. Subject to some parallax depending on how close the optical axis of the view comes to passing through pitcher P, television viewers may be able to independently estimate whether ball 52 did, or did not, pass through at least part of zone 56 as determined by system 102 or 202, the expansion of system 102, or the compression of system 202.

Regardless of the boundary-determination technique used by determiner 160, movement analyzer 222 in system 202 collects article-location data 226 of imagery of ball 52 moving toward strike zone 56. Responsive to the determinations of the locations of the lower/upper zonal boundaries 60 and 62 in lower/upper boundary-location data 168, analyzer 222 provides results code signal 228 at the appropriate results code value, e.g., a value corresponding to one of result indication values A-P for BB/SB. Movement analyzer 162 in system 102 operates the same except that analyzer 162 simply determines whether at least part of ball 52 entered zone 56 and, if so, preferably whether and where ball 52 passed through zone 56, and provides entry-determination signal 172 at the appropriate entry-non-entry passage/non-passage value.

System 202 preferably employs results memory 250 to automatically keep track of the ball/strike count, starting from zero "ball" and zero "strike", on batter B during an individual at bat. Memory 250 is provided with instruction 252 at value suitable to initiate keeping track of the ball/strike count for first batter B in the first half inning of a game and sometimes for first batter B in each later half inning.

In response to results audio input signal 254A supplied from memory 250, audio generator 246 audibly announces the count after each pitch during the at bat via indication sound 230A provided that batter B remains close to strike zone 56 as determined by body-image collector 176 and body-image processor 178 in determiner 160 before the count is to be reset to zero "ball" and zero "strike" to start another individual at bat. Should current batter B be replaced with new batter B, a pinch hitter, before the at bat ends, the combination of memory 250, collector 176, and processor 178 recognizes the replacement and applies the count to new batter B.

If, after a pitch, batter B leaves batter's box 46L or 46R as detected by collector 176 and processor 178, audio generator 246 waits until batter B returns to box 46L or 46R as likewise detected by collector 176 and processor 178 before announcing the count. If batter B does not return to box 46L or 46R within a selected time period, e.g., 60 s, as again detected by collector 176 and processor 178, processor 178 provides memory 250 with instruction 252 for resetting the count to zero "ball" and zero "strike" in preparation for a change in batter B. The capability of system 202 to keep track of the count is, of course, subject to human officiating override.

System 202 often depends on a human official providing memory 250 with instruction 252 indicating a batter-player change, i.e., a change in whomever acts as batter B. Nevertheless, system 202 can sometimes employ a repetitive-comparison procedure or a batter-recognition procedure for automatically electronically determining whether a batter-player change has occurred.

The repetitive-comparison procedure entails first identifying an initial shape for batter B after batter B has initially entered a selected one of batter's boxes 46L and 46R prior to the first pitch of an at bat. Collector 176 can collect imagery of current batter B when that batter B initially enters selected box 46L or 46R. Transverse VCs 260 and 262 are well positioned to collect incoming body-image data 166 of batter B for use in determining a batter-player change. Processor 178 processes the imagery of batter B to generate the initial batter shape. If body shapes 198 have been previously generated for batter B as a potential batter, processor 178 can alternatively begin the repetitive-comparison procedure by identifying one of pre-generated shapes 198 as the initial batter shape for him/her as he/she initially entered selected box 46L or 46R.

In either case, collector 176 collects imagery of whomever acts as batter B after each (subsequent) pitch. Processor 178 processes the imagery of whomever acts as batter B after each pitch to generate a current shape for whomever acts as batter B after that pitch and compares the current batter shape after that pitch to the initial batter shape. If the current batter shape after that pitch does not reasonably match the initial batter shape, processor 178 determines that a batter-player change has occurred.

Processor 178 subsequently provides a batter-player-change signal that causes audio generator 246 to announce new batter B via indication sound 230A. Processor 178 can provide the batter-player-change signal directly to generator 246 or via instruction 252 that causes memory 250 to generate results audio input signal 254A at a value causing generator 246 to announce new batter B. Processor 178 also provides a count-reset signal that causes memory 250 to reset the count to zero "ball" and zero "strike" unless system 202 determines, as described above, that the at bat has not ended.

Memory 250 is preferably loaded via instruction 252 with (a) unique individual identifying information for each person who can actively participate as a player in the activity, e.g., BB/SB game or practice session, for which system 202 is being used, (b) pre-generated potential body shapes 198, if available, for each player, and (c) the players forming the starting lineup for each team participating in the activity. Processor 178 accesses this information and uses it to confirm that a batter-player change has occurred. If the batter-player change involves a lineup change, processor 178 provides memory 250 with a lineup-change signal identifying new batter B in the appropriate lineup.

If the confirmation fails, processor 178 generates a clarification-needed signal for one or more human officials to receive. The clarification-needed signal requests clarification as to whether a batter-player change occurred. Processor 178 may also provide such a clarification-needed signal to audio generator 246 or video generator 248 to similarly request clarification via indication sound 230A or results indication imaging 230V.

For the batter-recognition procedure, the individual identifying information for each player includes (a) the name of each player, (b) alphanumeric information on the uniform of each player, (c) imagery, usually at least one still image, of the face of each player, and (d) preferably a description of the color pattern for that player's uniform if the player is on a team using uniforms of the same color pattern. The alphanumeric information includes the player's number and, if present, the player's name, often only the surname, or/and the name of the player's team. Group identifying information consisting of the individual identifying information for all the players is loaded into memory 250.

Body-image processor 178 has a batter-recognition facility formed with a character-recognition facility or/and a face-recognition facility, preferably both facilities. The character-recognition facility enables processor 178 to recognize the alphanumeric information on the uniform of each player.

After batter B has initially entered batter's box 46L or 46R and prior to the first pitch of an at bat, body-image collector 176 initiates the batter-recognition procedure by collecting imagery of the batter's uniform or/and face, preferably both (the uniform and face). Processor 178 then uses its batter-recognition facility to determine the identity of whomever acts as batter B prior to the first pitch. This entails comparing the imagery of the batter's uniform or/and face, preferably both, to the group identifying information for all the players as accessed from memory 250 in order to locate a match between the imagery of the batter's uniform or/and face, preferably both, and the individual identifying information for one player in the group identifying information, thereby identifying that player as acting as batter B prior to the first pitch of the at bat.

After the first pitch and any subsequent pitch in the at bat, collector 176 continues the batter-recognition procedure by collecting imagery of the batter's uniform or/and face, preferably both Processor 178 uses its batter-recognition facility to recognize whomever acts as batter B after the first pitch or any subsequent pitch. If processor 178 identifies a different player acting as batter B after the first pitch or any subsequent pitch, processor 178 determines that a batter-player change has occurred. Processor 178 then proceeds as described above in connection with the repetitive-comparison procedure to have new batter B announced and to have the ball/strike count reset to zero "ball" and zero "strike" again unless system 202 determines that the at bat has not ended.

If the individual identifying information for each player includes a description of the color pattern for that player's uniform such that the group identifying information includes a description of the color pattern for the players' uniforms, the batter-recognition facility includes a color-pattern-recognition facility. The collecting operations performed by collector 176 then entail collecting imagery of the batter's uniform or/and face, preferably both, and the color pattern of the batter's uniform. The comparing operations performed by processor 178 correspondingly entail comparing the imagery of the batter's uniform or/and face, preferably both, and the color pattern of the batter's uniform to the group identifying information for all the players in order to locate a match between the imagery of the batter's uniform or/and face, preferably both, and the color pattern of the batter's uniform for one player in the group identifying information.

The batter-recognition procedure is readily extended to electronically identifying the player, referred to as the "prospective next batter", who has entered the on-deck area (not shown) for the team currently at bat and will prospectively next be batter B for that team after current batter B has completed his/her at bat. Collector 176 initially collects imagery of the uniform or/and face, preferably both, of the prospective next batter. There are typically two spaced apart on-deck areas, one for each team. To achieve the requisite imagery collection for prospective next batters of both teams, the FOVs of the main and further VCs are arranged to include the on-deck areas and player in the on-deck areas so that the imageries of the main and further VCs capture the prospective next batters after they have entered their on-deck areas. This can typically be accomplished with transverse VCs 260 and 262 or/and further VCs 284 and 286.

Processor 178 then uses its batter-recognition facility to identify the prospective next batter for the team currently at bat. This entails comparing the imagery of the uniform or/and face, preferably both, of the prospective next batter to the group identifying information for all the players as accessed from memory 250 in order to locate a match between the imagery of the uniform or/and face, preferably both, of the prospective next batter and the individual identifying information for one player in the group identifying information, thereby identifying that player as the prospective next batter. The individual and group identifying information for identifying the prospective next batter are used in the same way as the individual and group identifying information for identifying the player acting as batter B prior to the first pitch of the at bat.

After current batter B has completed his/her at bat as determined by system 202, processor 178 proceeds as described above in connection with the repetitive-comparison procedure to have the so-identified prospective next batter announced as batter B and to have the ball/strike count reset to zero "ball" and zero "strike". The announcement typically occurs before the prospective next batter has entered batter's box 46L or 46R to become batter B. To accommodate the situation in which the so-identified prospective next batter does not actually become batter B after current batter B has completed his/her at bat, system 202 still performs the batter-recognition procedure after batter B has entered box 46L or 46R prior to the first pitch of the at bat. If system 202 determines that batter B is not the so-identified prospective next batter, processor 178 proceeds to have the actual so-identified next batter announced as batter B.

Part of or all the data collection needed to determine batter-player changes, including lineup changes, can sometimes be performed by collector 232 in analyzer 222. Part of or all the data processing needed to determine batter-player changes, including lineup changes, can similarly be performed by one or more of processors 184, 234, 236, and 238 in analyzer 222, especially results processor 238.

A human official can provide memory 250 with instruction 252 to disable the announcement of the ball/strike count, to disable resetting the count to zero "ball" and zero "strike", or/and to disable or override the announcement of a batter-player change. If the count or batter-player change is altered by an occurrence outside the purview of system 202, a human official is expected to provide memory 250 with instruction 252 specifying an adjustment to the count or batter-player change. The human official is typically home-plate umpire U but can be an off-field human official.

System 202, specifically analyzer 222, is expected to have a ball/strike entry-determination accuracy of no more than 1 cm, preferably no more than 0.5 cm, more preferably no more than 0.25 cm. That is, analyzer 222 determines that (i) at least part of ball 52 entered strike zone 56 when at least part of ball 52 actually entered at least 1 cm, preferably at least 0.5 cm, more preferably at least 0.25 cm, into zone 56 and (ii) ball 52 passed by zone 56 when no part of ball 52 actually came closer than 1 cm, preferably 0.5 cm, more preferably 0.25 cm, to zone 56 in passing by zone 56. The same applies to BB/SB implementations of system 102, the expansion of system 102, and the compression of system 202.

Analyzer 222 covers all of strike zone 56, not just front boundary 64F. In particular, analyzer 222 provides indication signal 230 at a result indication value indicating that at least part of ball 52 entered zone 56 when entry occurred at any boundary 60, 62, 64L, 64R, or 64F or feasible combination of boundaries 60, 62, 64L, 64R, and 64F. Due to its complete strike-zone coverage and high entry-determination accuracy, analyzer 222 provides better calls on "balls" and "strikes" than human umpires. Analyzer 222 also determines substantially whether bat 54 contacted ball 52 during a pitch regardless of whether batter B swung or bunted, or did not swing or bunt, at ball 52.

Analyzer 222 accommodates situations, often on bunts or attempted bunts, in which bat-to-ball contact or unsuccessful attempt to achieve bat-to-ball contact occurred in front of strike zone 56 or/and space surrounding space in front of zone 56. Ball 52 passes by zone 56 in the vast majority of "hit-infield ball" instances. Nevertheless, analyzer 222 determines that ball 52 is a "hit-infield ball" if ball 52 hit infield 22 and subsequently passed through zone 56 without bat-to-ball contact in accordance with, for example, 2022

MLB Rule 5.05(a)(3), 2021-2022 NCAA Baseball Rule 7, sect. 5(a), and 2020-2021 NCAA Softball Rule 11.3.2.1.

Analyzer 222 makes the following earlier-described ball/strike determinations within its purview for a suitable definition of a "swinging strike":

i. a "missed-bunt strike" if batter B bunted bat 54 at ball 52 without bat-to-ball contact as ball 52 passed through or/and by strike zone 56;

ii. a "hit-ball strike" for a fair or foul ball if bat-to-ball contact occurred causing ball 52 to travel away from zone 56 as ball 52 was about to enter or/and pass by zone 56, was passing partway through or/and by it, or had just passed through or/and by it;

iii. a "called strike" if at least part of ball 52 passed through zone 56 without bat-to-ball contact, without batter B simultaneously swinging or bunting bat 54 at ball 52, and without ball 52 previously hitting infield 22;

iv. a basic "ball" if ball 52 passed by zone 56 without bat-to-ball contact, without batter B simultaneously swinging or bunting bat 54 at ball 52, and without ball 52 previously hitting infield 22; and v. a "hit-infield ball" if ball 52 hit infield 22 and subsequently passed through or/and by zone 56 without bat-to-ball contact and without batter B simultaneously swinging or bunting bat 54 at ball 52.

A "hit-ball strike" can be a "foul-tip strike" or a "fair/foul hit-ball strike". Analyzer 222 makes the following earlier-described ball/strike determinations within its purview likewise for a suitable definition of a "swinging strike":

ii1. a "foul-tip strike" if batter B swung or bunted bat 54 at ball 52 with slight bat-to-ball contact as ball 52 was about to enter or/and pass by strike zone 56, was passing partway through or/and by it, or had just passed through or/and by it and was immediately caught by catcher C; and ii2. a "fair/foul hit-ball strike" if batter B swung or bunted bat 54 at ball 52 with bat-to-ball contact causing ball 52 to travel away from zone 56 as ball 52 was about to enter or/and pass by zone 56, was passing partway through or/and by it, or had just passed through or/and by it without immediately being caught by catcher C.

Also, a "foul-tip strike" is an "out" if the strike count is two. Analyzer 222 further determines that a two-strike "foul-tip strike" is an "out".

Analyzer 222 makes the following earlier-described ball/strike determinations within its purview via results indication signal 230 for the definition of a "swinging strike" presented in determination AA:

AA. a "swinging strike" if batter B swung bat 54 at ball 52 such that at least part of bat 54 crossed front plate-clearing area 74 in zone-to-pitcher direction 136 without bat-to-ball contact as ball 52 passed through or/and by strike zone 56;

BB. a "missed-bunt strike" if batter B bunted bat 54 at ball 52 without bat-to-ball contact as ball 52 passed through or/and by zone 56;

CC. a "hit-ball strike" for a fair or foul ball if bat-to-ball contact occurred causing ball 52 to travel away from zone 56 as ball 52 was about to enter or/and pass by zone 56, was passing partway through or/and by it, or had just passed through or/and by it;

DD. a "called strike" if at least part of ball 52 passed through zone 56 without bat-to-ball contact, without batter B simultaneously bunting bat 54 at ball 52, without any part of bat 54 simultaneously crossing area 74 in direction 136, and without ball 52 previously hitting infield 22;

EE. a basic "ball" if ball 52 passed by zone 56 without bat-to-ball contact, without batter B simultaneously bunting bat 54 at ball 52, without any part of bat 54 simultaneously crossing area 74 in direction 136, and without ball 52 previously hitting infield 22; and FF. a "hit-infield ball" if ball 52 hit infield 22 and subsequently passed through or/and by zone 56 without bat-to-ball contact, without batter B simultaneously bunting bat 54 at ball 52, and without any part of bat 54 simultaneously crossing area 74 in direction 136.

Should the "swinging strike" of determination AA require that a specific segment of bat 54 cross plate-clearing area 74 in zone-to-pitcher direction 136, determinations AA is so modified. In particular, the language "at least part of bat 54" is changed to "at least [the specific segment] of bat 54" with the rectangular brackets removed after inserting a description of the specific segment into the changed material. If the specific segment is the barrel of bat 54, the changed material reads "at least the barrel of bat 54". The definition of a "swinging strike" in determination AA is then the plate-clearing definition.

Determinations EE and FF are complementarily modified. The language "without any part of bat 54 simultaneously crossing area 74 in direction 136" is changed to "without [the specific segment] of bat 54 simultaneously crossing area 74 in direction 136", the rectangular brackets again being removed after inserting a description of the specific segment into the changed material. If the specific segment is the barrel of bat 54, the changed material reads "without the barrel of bat 54 simultaneously crossing area 74 in direction 136".

There are two common definitions of what does, or does not, constitute a "missed-bunt strike" when bat 54 does not contact ball 52 during a bunt attempt per Tittrington, "Bunt, Slap and Checked-Swing Quandaries", Referee, www.referee.com/bunt-slap-and-checked-swing-quandaries. 24 Nov. 2020, 4 pp. One definition, termed the thrusting-neutral definition, specifies that thrusting thrust bat 54 forward toward pitcher P into the path of ball 52 or leaving bat 54 essentially motionless (neutral) but still in the path of ball 52 produces a "missed-bunt strike". Bat 54 must be withdrawn from the path of ball 52 as it closely approaches strike zone 56 to avoid a "missed-bunt strike" under the thrusting-neutral definition.

The other definition, termed the thrusting definition, specifies that thrusting bat 54 forward toward pitcher P into the path of ball 52 as it closely approaches strike zone 56 produces a "missed-bunt strike". Withdrawing bat 54 from the path of ball 52 as it closely approaches zone 56 or leaving bat 54 essentially motionless in the path of ball 52 avoids a "missed-bunt strike" under the thrusting definition.

Figure 17A:
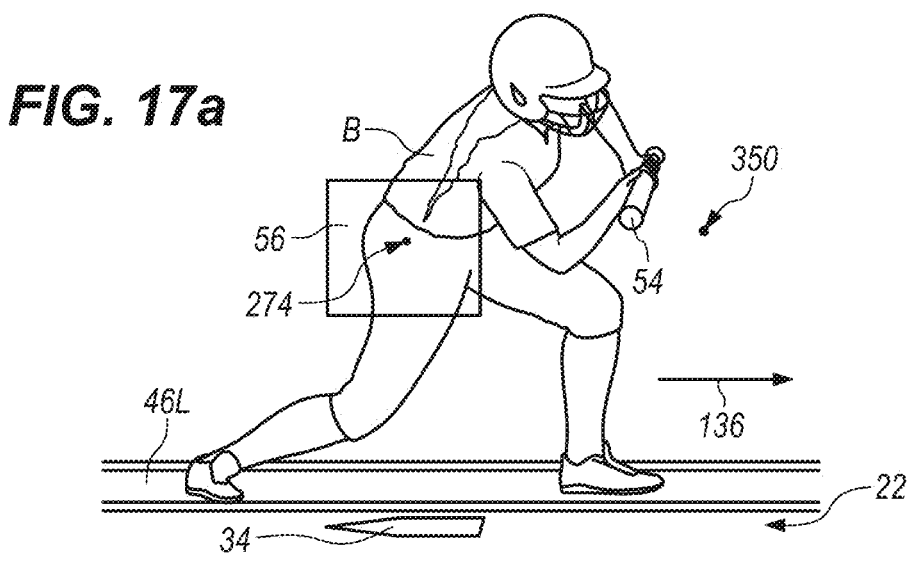
FIGS. 17*a*-17*c* are perspective views of the home-plate region in the BB/SB implementation of FIG. 14 showing the action of the bat during a bunt attempt.
Figure 17B:
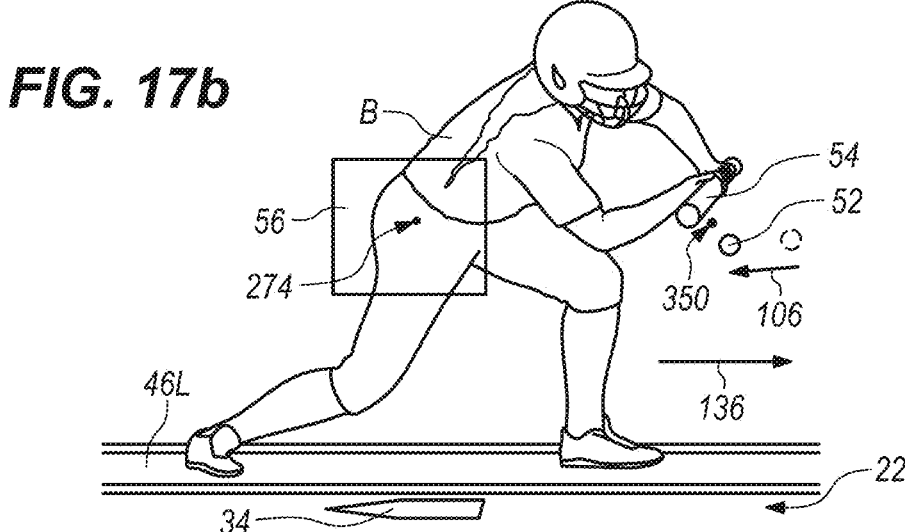
Figure 17C:
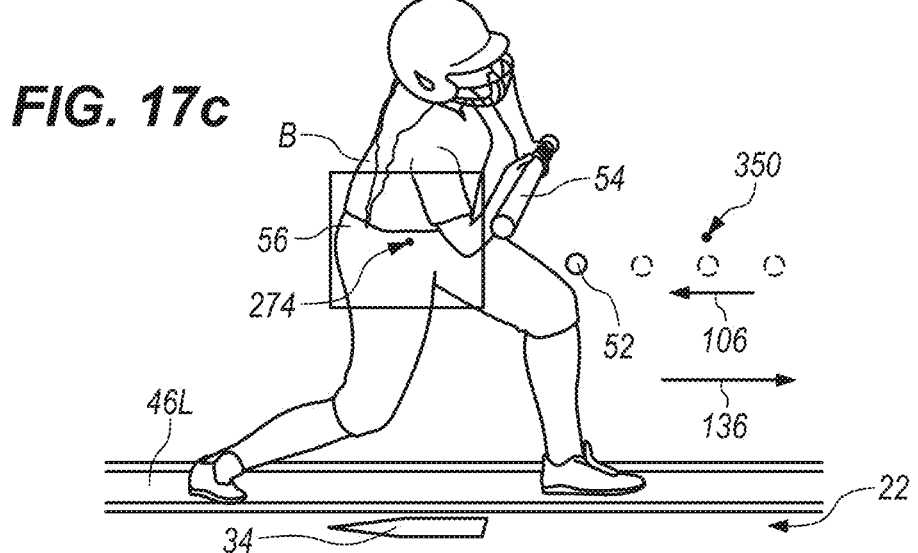

FIGS. 17a-17c (collectively "FIG. 17") illustrate the home-plate region in BB/SB implementation 300 showing the action of batter B and bat 54 during a bunt effort. FIG. 17 assists in understanding how movement analyzer 222 performs a position-examination procedure to automatically determine whether the action during the bunt effort constituted a "missed-bunt strike" under either of the "missed-bunt strike" definitions.

FIG. 17a depicts a crouching stance of batter B and a neutral position of bat 54 in front of strike zone 56 and in the path of pitched ball 52 as batter B is preparing to bunt ball 52. Batter B goes into this stance before pitcher P releases ball 52 or very quickly after pitcher P releases ball 52 and before it is close to zone 56. Batter B and bat 54 are typically essentially motionless (neutral) in this stance and briefly remain motionless in it.

FIG. 17*b* shows a deeper crouching stance of batter B and a thrusting position of bat 54 farther in front of strike zone 56 as batter B thrusts bat 54 at ball 52 generally in zone-to-pitcher direction 136 in an effort to bunt ball 52. In some bunt efforts, batter B goes directly from standing in batter's box 46L or 46R, specifically batter's box 46L in the example of FIG. 17, to the deeper stance of FIG. 17*b*, thereby skipping the shallower stance of FIG. 17*a* and the neutral position in which bat 52 is briefly essentially motionless.

FIG. 17*c* depicts a higher stance of batter B and the position of bat 54 after batter B withdraws bat 54 in a direction generally opposite direction 136 in an effort to avoid bunting ball 52. Ball 52 is about to pass by bat 54 without bat-to-ball contact.

Analyzer 222 initiates the position-examination procedure by collecting data of moving imagery of the action of batter B, bat 54, and ball 52 as it approaches bat 54 with batter B standing in batter's box 46L or 46R or, at the latest, with batter B crouched as in FIG. 17*a* and preparing to bunt ball 52. Transverse VCs 260 and 262 situated respectively beyond left/right boundaries 64L and 64R of strike zone 56 are particularly suitable for collecting this imagery data. Lower-side VC 266 is well positioned to assist in the procedure.

Item 350 in FIG. 17 indicates a nominal bunt-contact location approximately representing the average of a substantial number of locations where bat 54 contacted ball 52 during bunt efforts. In the example of FIG. 17, bunt-contact location 350 is situated in front of strike zone 56 because batter B typically bunts ball 52 in front of zone 56, especially in softball where batter's boxes 46 commonly extend further into infield 22 than in baseball. Location 350 is typically roughly the same distance above regional surface 112 as center 274 of availability space 108M. Zone-to-pitcher plane 138 (not appearing in FIG. 17) usually extends through location 350.

Optical axes 260A and 262A of transverse VCs 260 and 262 may extend approximately through bunt-contact location 350 or through a location between availability-space center 274 and location 350 instead of extending approximately through center 274. The same applies to lower-side VC 266 or/and upper-side VC 278, if present.

Analyzer 222 continues the position-examination procedure by examining the moving imagery to determine whether batter B thrust bat 54 at ball 52 as it closely approached bat 54 or, if the bunt effort was late, passed by bat 54. See FIG. 17*b*. A thrust typically requires that bat 54, specifically the barrel, be thrust at least a predefined minimum thrust distance in zone-to-pitcher direction 136 from the bat's neutral position in FIG. 17*a* or, if the neutral position is absent (skipped), from the bat's initial position when batter B was initially standing in batter's box 46L or 46R. If analyzer 222 determines that batter B thrust bat 54 at ball 52, a "missed-bunt strike" occurred under both "missed-bunt strike" definitions.

Analyzer 222 further examines the imagery to determine whether batter B held bat 54 essentially motionless generally in the path of ball 52 as it passed by bat 54. If batter B did so, a "missed-bunt strike" occurred under the thrusting-neutral definition but not under the thrusting definition.

Finally, analyzer 222 examines the imagery to determine whether batter B withdrew bat 54 just before ball 52 passed by bat 54 as shown in FIG. 17*c*, particularly when the thrusting-neutral definition is being used and bat 54 was in the neutral position of FIG. 17*a*. A withdrawal typically requires that bat 54, specifically the barrel, be withdrawn at least a predefined minimum withdrawal distance in the direction from pitcher P to strike zone 56, i.e., the direction opposite direction 136, from the bat's neutral position in FIG. 17*a*. If batter B withdrew bat 54, a "missed-bunt strike" did not occur under either "missed-bunt strike" definition.

Analyzer 222 alternatively or additionally makes the following earlier-described ball/strike determinations within its purview via indication signal 230 for the definition of a "swinging strike" presented in determination GG:

GG. a "swinging strike" if batter B swung bat 54 at ball 52 such that at least part of bat 54 passed a specified location on batter B in zone-to-pitcher direction 136 without bat-to-ball contact as ball 52 passed through or/and by strike zone 56;

HH. a "called strike" if at least part of ball 52 passed through zone 56 without bat-to-ball contact, without batter B bunting bat 54 at ball 52, without any part of bat 54 simultaneously passing the specified location on batter B in direction 136, and without ball 52 previously hitting infield 22;

II. a basic "ball" if ball 52 passed by zone 56 without bat-to-ball contact, without batter B bunting bat 54 at ball 52, without any part of bat 54 simultaneously passing the specified location on batter B in direction 136, and without ball 52 previously hitting infield 22; and JJ. a "hit-infield ball" if ball 52 hit infield 22 and subsequently passed through or/and by zone 56 without bat-to-ball contact, without batter B bunting bat 54 at ball 52, and without any part of bat 54 simultaneously passing the specified location on batter B in direction 136.

Bat 54 may contact ball 52 in front of strike zone 56 or/and over or under space in front of zone 56 depending on where batter B stands in batter's box 46L or 46R, on the batter's stride during a swing, and on how far batter's boxes 46 extend into infield 22. Hence, at least part of bat 54 may, or may not, pass the specified location on batter B when at least part of bat 54 passes front plate-clearing area 74, and vice versa. For this reason, each determination GG, HH, 11, or JJ is independent of similar determination AA, DD, EE, or FF.

The definition of a "swinging strike" in determination GG approaches the typical version of the body-passing definition. Should the body-passing definition require that a specific segment of bat 54 pass the specified location on batter B, determination GG is modified to require the specific segment in the same way as determination AA is so modified. If the specific segment is the barrel of bat 54, the language "at least part of bat 54" in determination GG is changed to "at least the barrel of bat 54". Determination GG then employs the body-passing definition that a "swinging strike" occurred when batter B swung bat 54 at ball 52 such that at least the barrel of bat 54 passed the specified location on batter B without bat-to-ball contact as ball 52 passed through or/and by strike zone 56. The language "without any part of bat 54" in determinations HH-JJ is complementarily changed to "without the barrel of bat 54".

The specified location on batter B for the "swinging strike" of determination GG can be the front of the batter's body. If so, determination GG employs the body-passing definition that a "swinging strike" occurs when batter B swung bat 54 at ball 52 such that at least part of bat 54, or at least the specific bat segment, passed the front of the batter's body in zone-to-pitcher direction 136 without batto-ball contact as ball 52 passed through or/and by strike zone 56. Determinations HH-JJ then require that the front of the batter's body not be passed in direction 136 either by any of bat 54 or by the specific bat segment.

If the specific bat segment is the barrel, a "swinging strike" occurs under the body-passing definition of determination GG when batter B swung bat 54 at ball 52 such that at least the barrel of bat 54 passed the front of the batter's body in direction 136 without bat-to-ball contact as ball 52 passed through or/and by strike zone 56. Determinations HH-JJ require that the barrel of bat 54 not pass the front of the batter's body in direction 136.

The specified location on batter B for the "swinging strike" of determination GG can alternatively be the front hip of batter B. The batter's front hip is the hip closest to pitcher P before batter B swings at ball 52, i.e., the batter's left hip if batter B is in left batters box 46L, and the batter's right hip if batter B is in right batter's box 46R. In that case, determination GG employs the body-passing definition that a "swinging strike" occurs when batter B swung bat 54 at ball 52 such that at least part of bat 54, or at least the specific bat segment, passed the batter's front hip in direction 136 without bat-to-ball contact as ball 52 passed through or/and by strike zone 56. Determinations HH-JJ require that the batter's front hip not be passed in direction 136 either by any of bat 54 or by the specific bat segment.

Should the specific bat segment be the barrel in this alternative, a "swinging strike" occurs under the body-passing definition of determination GG when batter B swung bat 54 at ball 52 such that at least the barrel of bat 54 passed the batter's front hip in direction 136 without bat-to-ball contact as ball 52 passed through or/and by strike zone 56. Determinations HH-JJ require that the barrel of bat 54 not pass the batter's front hip in direction 136.

Figure 18A:
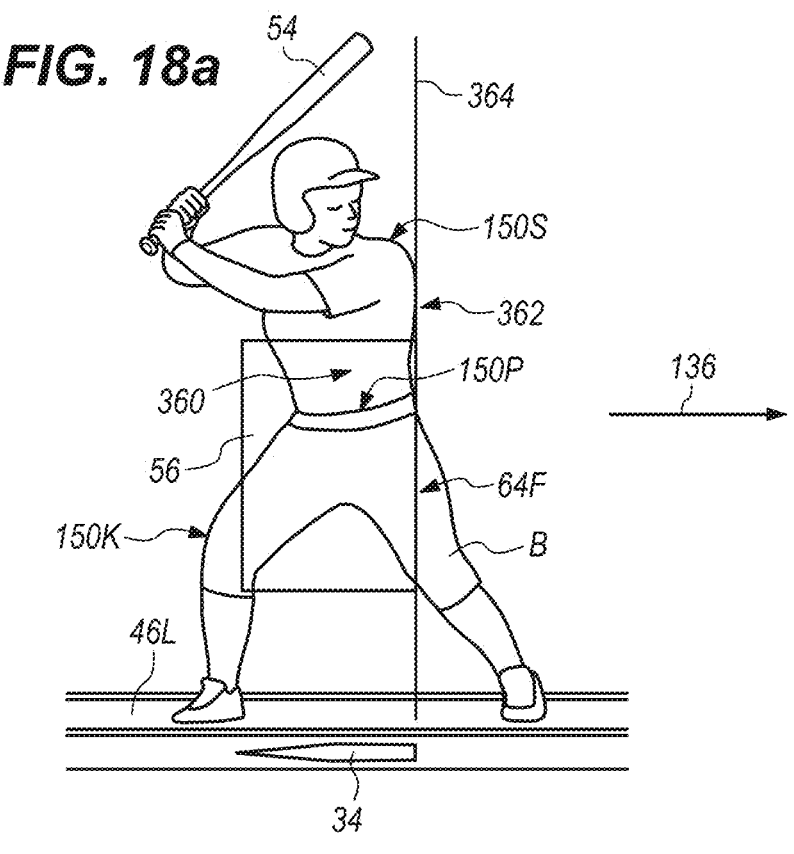
FIGS. 18*a* and 18*b* are perspective views of the home-plate region in the BB/SB implementation of FIG. 14 showing the action of the bat during a swing.
Figure 18B:
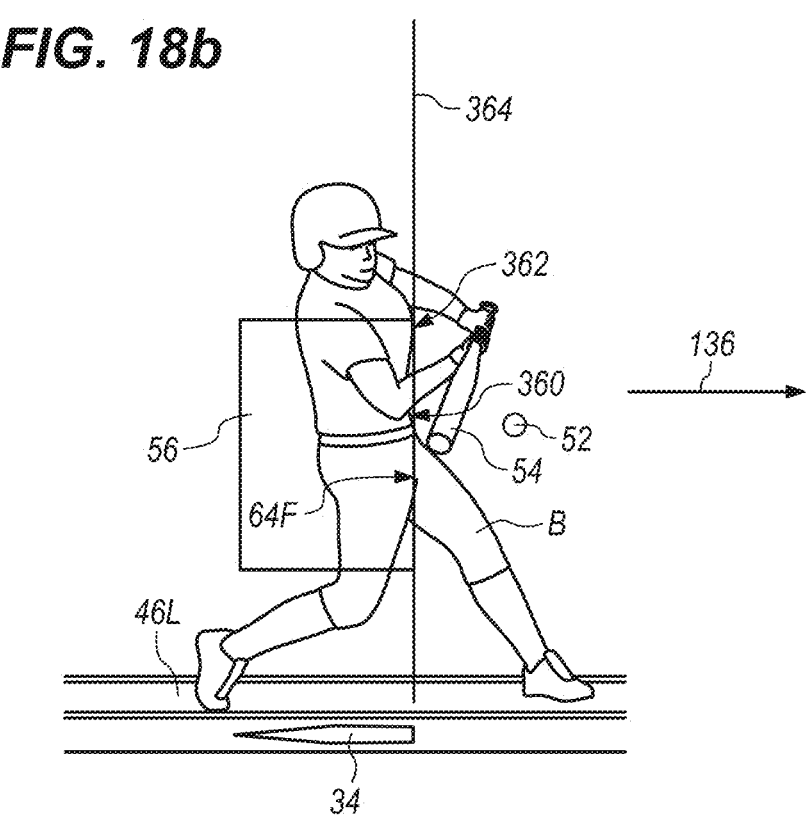

FIGS. 18*a* and 18*b* (collectively "FIG. 18") depict the home-plate region in BB/SB implementation 300 showing the action of bat 54 during a swing. FIG. 18 assists in understanding how a bat-passage procedure implementing the object-passage procedure is performed by movement analyzer 222 to automatically determine whether bat 54 passed a specified location 360 on the body of batter B to produce a "swinging strike" under determination GG. Specified body location 360 on batter B in the example of FIG. 18 is the front of the batter's body, specifically the front of the batter's torso from shoulders to hips. Item 362 in FIG. 18 is a variable-position leading torso area closer to pitcher P, and thus closer to the center of pitcher's mound 28, than any other torso area at any point during the swing.

FIG. 18*a* shows the position of bat 54 as batter B is starting the swing that causes part of bat 54 to move toward pitcher P. Bat 54 moves generally opposite to pitched ball 52 as it closely approaches strike zone 56. Leading torso area 362 is along one side, the left side in this example, of the front of the batter's torso.

FIG. 18*b* shows the position of bat 54 immediately after part of bat 54 has passed the front of the batter's body when ball 52 is close to strike zone 56. The batter's body has rotated so that the front of the batter's body generally faces pitcher P and thereby is closer to pitcher P than the back or either side of the batter's body. Because torso area 362 is closer to pitcher P than any other torso area during the swing, area 362 has moved forward and rotated around the batter's torso so as to be the frontmost area of specified body location 360 formed with the front of the batter's body.

The bat-passage procedure begins with analyzer 222 establishing an imaginary movable vertical spatial-relationship plane 364 extending perpendicular to zone-to-pitcher direction 136 through torso area 362 of batter B. Spatial-relationship plane 364 is depicted as a straight line in FIG. 18. Plane 364 moves to mimic any movement of torso area 362 in direction 136 or the direction opposite direction 136.

Analyzer 222 uses the tracking and other-entry capabilities to determine whether part of bat 54 passed spatial-relationship plane 364 in direction 136 as ball 52 moved toward strike zone 56. In particular, tracking article-info collector 232 collects incoming tracking article-location data 226 of imagery of zone 56, batter B, ball 52, and bat 54. Tracking processor 234 examines principal outgoing article-location data 186 provided by collector 232 to determine if ball 52 is moving toward zone 56 and provides the ball-movement determination in tracked-data signal 242. Other-entry processor 236 examines other outgoing article-location data 240 provided by collector 232 to determine whether part of bat 54 passed plane 364 in direction 136 and provides the bat-passage determination in other-entry signal 244. Results processor 238 combines the ball-movement and bat-passage determinations in signals 242 and 244 to determine whether part of bat 54 passed plane 364 in direction 136 as ball 52 moved toward zone 56. If part of bat 54 so passed plane 364, analyzer 222 determines that a "swinging strike" occurred under determination GG.

The part of bat 54 can be at least part of the barrel of bat 54. Although specified body location 360 is the front of the batters body in the example of FIG. 18, location 360 can alternatively be the frontmost area on the batter's front hip. In that case, torso area 362 is specifically a hip area closer to pitcher P than any other hip area during a swing.

Results indicator 224 provides indication sound 230A as an audible consequence sound indicating a "strike" call, e.g., the word "strike" in English, when ball 52 passed through or/and by strike zone 56 for results-signal determinations of "called strike" (only when at least part of ball 52 passed through zone 56), "foul-tip strike", "missed-bunt strike" for either "missed-bunt strike" definition, and "swinging strike" for any "swinging strike" definition including the plate-clearing and body-passing definitions. Sound 230A is similarly provided as an audible consequence sound indicating a "ball" call, usually the word "ball" in English, when ball 52 passes through or/and by zone 56 for results-signal determinations of basic "ball" (only when ball 52 passed by zone 56) and "hit-infield ball". Sound 230A is usually provided at time delay $\Delta t_d$ approximately equal to the shortest delay of home-plate umpire U in making a "ball" or "strike" call after ball 52 reaches a vertical plane passing through front zonal boundary 64F but no more than 1 s after ball 52 reaches that plane.

Sound 230A for such a ball/strike call can be provided to home-plate umpire U in such a way, e.g., via an earpiece, that only umpire U can readily hear sound 230A. If so, umpire U repeats sound 230A for others, including batter B and pitcher P, to hear. Umpire U may also visually indicate the ball/strike call.

Analyzer 222 uses the tracking capability in determining the dynamic characteristics of linear and angular velocities for ball 52 at selected points along ball trajectory 106. The selected points usually include the point where trajectory 106 begins as ball 52 leaves the pitcher's pitching hand and the point where trajectory 106 intersects front zone-meeting plane 140 or/and, if bat 54 contacts ball 52, the trajectory point immediately before bat-to-ball contact. The characteristics may include rotational speed and rotational direction of ball 52 at the selected points as well as data, such as break angle and/or break movement each at a vertical plane through front zonal boundary 64F, characterizing the curvature of trajectory 106.

If bat 54 contacts ball 52, analyzer 222 determines linear and angular velocities of ball 52 at a ball trajectory point immediately after bat-to-ball contact. Analyzer 222 usually converts the post-contact ball velocities into contact exit speed and launch angle relative to surface 112. Analyzer 222 may also determine the speed of bat 54 at a point on the contact site. The ball/bat dynamic-characteristics information is stored in results memory 250 and selectively presented visually via indication imaging 230V and audibly via indication sound 230A.

Analyzer 222 is preferably programmed with mathematical attributes of model trajectories for a plurality of different types of pitches that can be made with ball 52. The different pitch types variously include four-seam fastball, two-seam fastball, cutter, sinker, splitter, curveball, knuckle curve, slider, slurve, knuckleball, forkball, changeup, circle changeup, and palmball for both left-handed and right-handed pitchers. The model trajectories are defined at least in terms of linear and angular velocities of ball 52 at selected points along the trajectories and are preferably tailored to the linear and angular velocity characteristics of the trajectories of pitches made with ball 52 by whomever acts as pitcher P. The linear and angular velocities for each different pitch type are defined by suitable ranges of velocity values at the selected points along the pitch's trajectory or at least suitable minimum or maximum velocity values at the selected points.

Analyzer 222 identifies the type of pitch for ball 52 according to a pitch-type identification procedure that entails (i) determining, as ball 52 moves along trajectory 106, the ball's linear and angular velocities at selected trajectory points respectively largely matching those in the model trajectories and (ii) comparing the linear and angular velocity values for ball 52 at those points with the respective linear and angular velocity values in the model trajectories at the respectively matching points to identify a particular one of the model trajectories as largely most closely matching trajectory 106. Analyzer 222 supplies results code signal 228 at a code value for the identified type of pitch. Results memory 250 stores the identified pitch type. Indication imaging 230V often presents a simulation of the identified pitch type.

FURTHER VARIATIONS

While the invention has been described with reference to particular embodiments, this description is solely for the purpose of illustration and is not to be construed as limiting the scope of the invention claimed below. For instance, movement analyzer 162 or 222 may respond to the determinations of the temporary locations of lower/upper zonal boundaries 120 and 122 by determining whether at least a specific amount, rather than at least part, of principal object 104 entered spatial zone 108.

Zone-control body 110 in the whole-body simulation can be limited to changing shape according to a set of body shape-change constraints as object 104 moves toward zone 108. Whole-body boundary determiner 160B otherwise performs the shape-examination procedure as described above.

The purview of movement-exam system 202 can be expanded to deal with situations beyond those described above, e.g., BB/SB situations involving interference by catcher C or/and ball 52 hitting batter B. System 202 can be employed as a training device for enabling batters to become familiar with strike-zone boundaries 60, 62, and 64 as applicable to those batters and for enabling pitchers to become familiar with boundaries 60, 62, and 64 as applicable to various batters especially as a function of batter height. System 202 can be used for amusement, e.g., at carnivals, fairs, and amusement parks. These uses also apply to movement-exam system 102, the expansion of system 102, and the compression of system 202. Various modifications may thus be made by those skilled in the art without departing from the true scope of the invention as defined in the appended claims.

I claim:

1. A movement-examination system for an object-movement region in which each of at least one designated physical body feature of a variable-shape zone-control body is timewise variably spaced apart from a body reference situs in a boundary-determination direction perpendicular to opposite first and second zonal boundaries of a three-dimensional variable-shape spatial zone having first and second zonal boundaries at respective temporary first and second boundary locations, the system comprising:

a boundary determiner for:

employing a variable-shape spatial-zone simulation of the zone, a reference-situs simulation of the situs, and a variable-shape body simulation of the body, the spatial-zone simulation having first and second simulated spatial boundaries that respectively simulate the first and second zonal boundaries, the body simulation having (i) a simulated feature for each body feature and (ii) a plurality of potential body shapes for the body, the simulated feature for each body feature for each potential body shape being simulated at a specified distance from the reference-situs simulation in the boundary-determination direction;

collecting whole-body data of imagery of the body; and processing the whole-body data by a shape-examination procedure that comprises (i) comparing the imagery of the body in the whole-body data to the potential body shapes to determine a particular one of the potential body shapes as largely most closely matching the imagery of the body in shape and (ii) determining the locations of the first and second zonal boundaries as a function of the specified distance of each simulated feature of that particular closest body shape from the reference-situs simulation; and a movement analyzer responsive to the determinations of the locations of the first and second zonal boundaries for electronically determining whether at least part of a principal object moving toward the zone entered it, the determiner and analyzer together comprising (a) electronic data-collection apparatus for examining or/and sensing the body and the object, including their locations and movement, to collect data of moving imagery of at least the body and the object and (b) electronic data-processing apparatus for processing the data of moving imagery to electronically determine (i) the locations of the first and second zonal boundaries as a function of the specified distance of each simulated feature of the particular closest body shape from the reference-situs simulation and (ii) whether at least part of the object entered the zone in response to the determinations of the locations of the first and second zonal boundaries.

2. The system as in claim 1 wherein the whole-body data includes data of imagery of each body feature.

3. The system as in claim 1 wherein the zone is spaced vertically apart from the situs, the first and second zonal boundaries respectively being lower and upper zonal boundaries, the simulated feature for each body feature for each potential body shape being simulated at a specified vertical distance from the reference-situs simulation.

4. The system as in claim 1 wherein the system is programmed with size and shape characteristics of the object, compares size and shape of any moving article within the system's purview to the size and shape characteristics of the object, and treats the article as the object if the comparison indicates that the article is the object.

5. The system as in claim 3 wherein the whole-body data includes data of imagery of each body feature.

6. The system as in claim 3 wherein:
the zone is situated above a regional surface of the object-movement region; and
the data-collection apparatus comprises a video camera network which comprises a plurality of video cameras each having a field of view, the cameras of the video camera network including an above-surface video camera (i) situated above the regional surface opposite the body relative to the zone so as to be farther from the body than from the zone and (ii) generating moving imagery capturing the zone, the body, and the object when it is unobstructedly within the above-surface camera's field of view, the data of moving imagery collected by the data-collection apparatus comprising data of the moving imagery of the above-surface camera.

7. The system as in claim 3 wherein the analyzer electronically determines dynamic characteristics of movement of the object from an object-movement origin along an object trajectory toward the zone, the dynamic characteristics comprising linear and angular velocities of the object at selected points along the trajectory.

8. The system as in claim 3 wherein:
the zone is situated above a regional surface of the object-movement region; and
the data-collection apparatus comprises a video camera situated at least partly below the regional surface, the camera having a field of view originating below the regional surface and directed upward image-wise such that the camera generates moving imagery capturing the zone and the object when it is unobstructedly within the camera's field of view, the data of moving imagery collected by the data-collection apparatus comprising data of the moving imagery of the camera.

9. The system as in claim 6 wherein the cameras of the video camera network further include an additional video camera situated at least partly below the regional surface, the additional camera's field of view originating below the regional surface and directed upward image-wise such that the additional camera generates moving imagery capturing the zone and the object when it is unobstructedly within the additional camera's field of view, the data of moving imagery collected by the data-collection apparatus further including data of the moving imagery of the additional camera.

10. The system as in claim 6 wherein the cameras of the video camera network further include a video camera situated above the regional surface for at least tracking the object as it moves toward the zone.

11. The system as in claim 6 wherein the analyzer processes at least the moving imagery of the above-surface camera to electronically determine within the system's purview whether at least part of the object entered the zone.

12. The system as in claim 9 wherein the analyzer processes at least the moving imagery of the above-surface and additional cameras to electronically determine within the system's purview whether at least part of the object entered the zone.

13. The system as in claim 9 wherein the additional camera's field of view also originates below the zone.

14. The system as in claim 7 wherein the analyzer electronically determines mathematical attributes of the trajectory as a function of the linear and angular velocities along the trajectory at the selected points and classifies it into one of a plurality of different types of potential trajectories for the object.

15. The system as in claim 8 wherein the camera's field of view also originates below the zone.

16. The system as in claim 4 wherein the system is programmed with size and shape characteristics of an additional object, compares size and shape of the article to the size and shape characteristics of the additional object, and treats the article as the additional object if the comparison indicates that the article is the additional object.

17. The system as in claim 16 wherein the system electronically determines within its purview whether the additional object contacted the principal object.

18. The system as in claim 16 wherein the analyzer electronically determines whether at least part of the additional object entered the zone.

* * * * *